US012562141B2

(12) United States Patent
Mase et al.

(10) Patent No.: US 12,562,141 B2
(45) Date of Patent: Feb. 24, 2026

(54) DISPLAY DEVICE, DISPLAY SYSTEM, AND DISPLAY DRIVING METHOD

(71) Applicant: Sony Semiconductor Solutions Corporation, Kanagawa (JP)

(72) Inventors: Kota Mase, Tokyo (JP); Taro Ichitsubo, Tokyo (JP); Atsuto Moriwaki, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 143 days.

(21) Appl. No.: 18/559,455

(22) PCT Filed: May 23, 2022

(86) PCT No.: PCT/JP2022/021117
§ 371 (c)(1),
(2) Date: Nov. 7, 2023

(87) PCT Pub. No.: WO2022/255147
PCT Pub. Date: Dec. 8, 2022

(65) Prior Publication Data
US 2024/0242696 A1 Jul. 18, 2024

(30) Foreign Application Priority Data
Jun. 3, 2021 (JP) .................................. 2021-093716

(51) Int. Cl.
G09G 5/377 (2006.01)
G06F 3/01 (2006.01)

(52) U.S. Cl.
CPC ............. G09G 5/377 (2013.01); G06F 3/013 (2013.01)

(58) Field of Classification Search
CPC ......... G09G 5/377; G09G 5/227; G09G 5/391
See application file for complete search history.

(56) References Cited

U.S. PATENT DOCUMENTS

| 10,649,217 B1 | 5/2020 | Ghazaryan |
| 2014/0347363 A1 | 11/2014 | Kaburlasos |

(Continued)

FOREIGN PATENT DOCUMENTS

| GB | 2563960 A | 1/2019 |
| JP | 2019197224 A | 11/2019 |

(Continued)

OTHER PUBLICATIONS

International Search Report (PCT/ISA/210), International Application No. PCT/JP2022/021117, dated Jul. 12, 2022.

*Primary Examiner* — Antonio A Caschera
(74) *Attorney, Agent, or Firm* — Michael Best & Friedrich LLP

(57) ABSTRACT

A display device according to the present disclosure includes: a reception circuit that is configured to receive a piece of first image data and a piece of second image data, the piece of first image data representing an entire image having a first resolution, the piece of second image data representing a first partial image having a second resolution higher than the first resolution, and the first partial image corresponding to a portion of the entire image; a display section including a plurality of pixels; and a display drive circuit that is configured to perform first driving and second driving, the first driving in which the plurality of pixels is driven in units of a first number of pixels on the basis of the piece of first image data, the second driving in which two or more pixels provided in a region corresponding to the first partial image of the plurality of pixels are driven in units of a second number of pixels on the basis of the piece of second image data, and the second number being smaller than the first number.

20 Claims, 49 Drawing Sheets

(56)  References Cited

U.S. PATENT DOCUMENTS

| | | | |
|---|---|---|---|
| 2018/0137602 A1 | 5/2018 | Spitzer | |
| 2018/0357752 A1 | 12/2018 | Ho | |
| 2019/0237021 A1 | 8/2019 | Peng | |
| 2019/0287495 A1 | 9/2019 | Mathur | |
| 2020/0258482 A1 | 8/2020 | Morein | |
| 2020/0341545 A1 | 10/2020 | Babu | |
| 2020/0365108 A1 | 11/2020 | Morein | |

FOREIGN PATENT DOCUMENTS

| | | | |
|---|---|---|---|
| JP | 2020021083 A | 2/2020 | |
| JP | 2020523688 A | 8/2020 | |
| KR | 20130083929 A | 7/2013 | |
| KR | 20190003334 A | 1/2019 | |
| WO | 2012077238 A1 | 6/2012 | |
| WO | 2020116348 A1 | 6/2020 | |

[ FIG. 2 ]
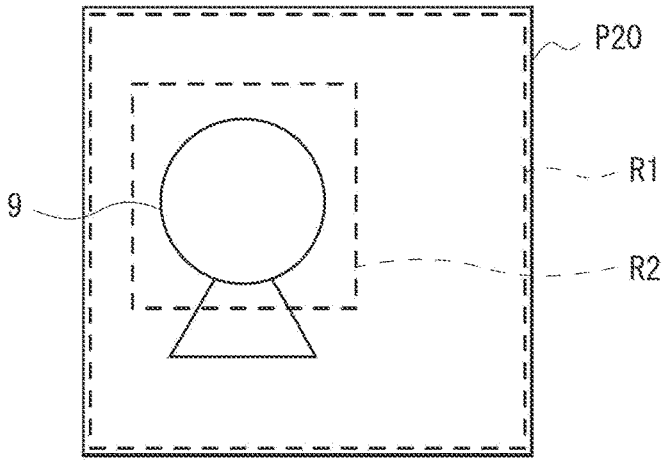
[ FIG. 3 ]
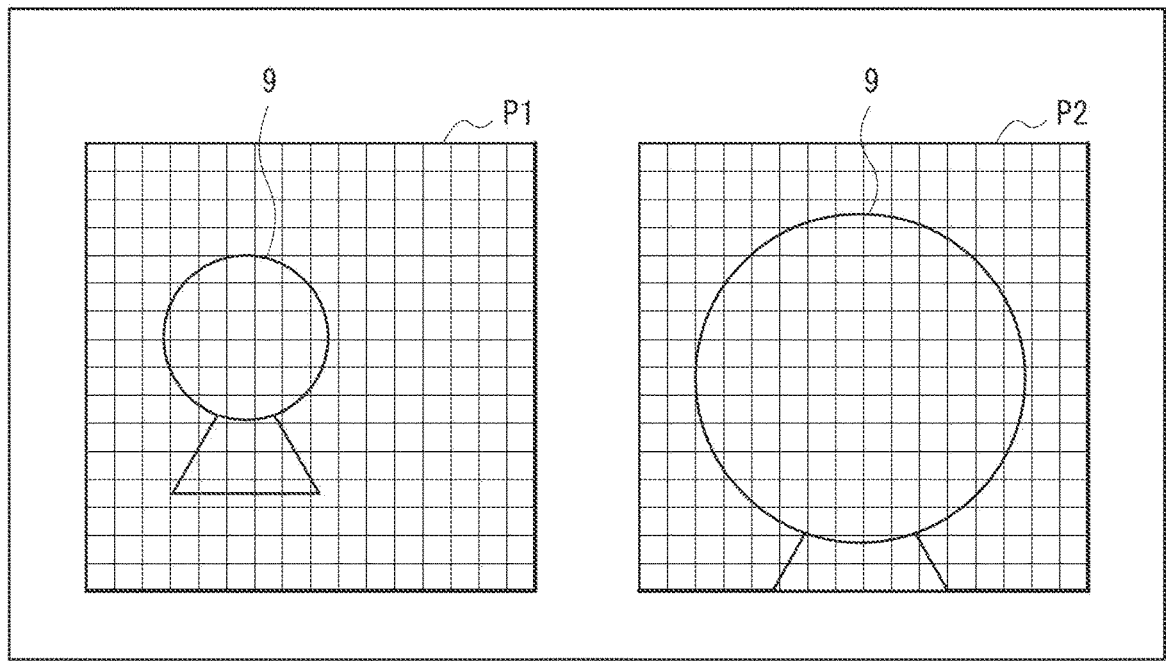

[ FIG. 4A ]
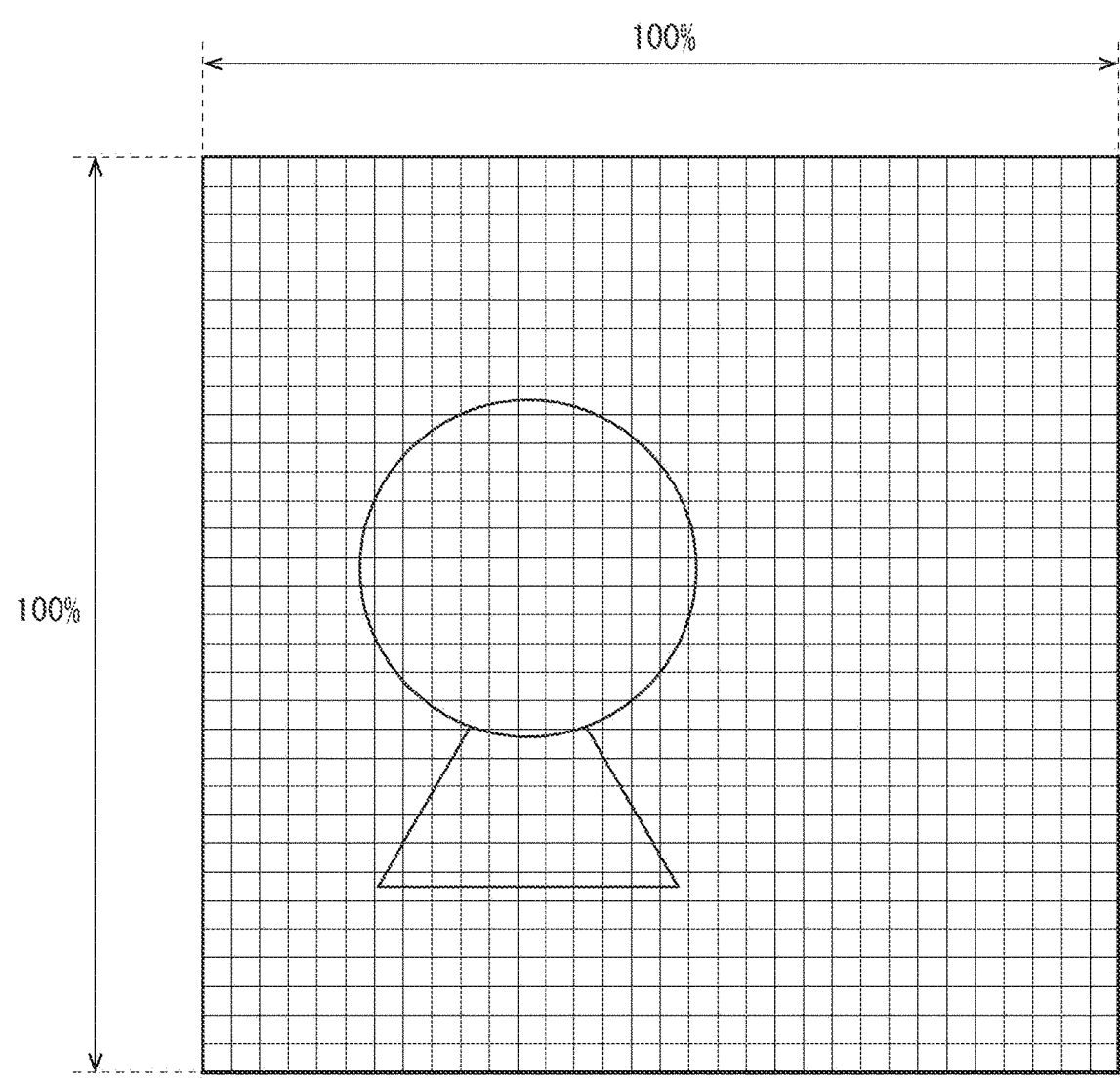

[ FIG. 4B ]
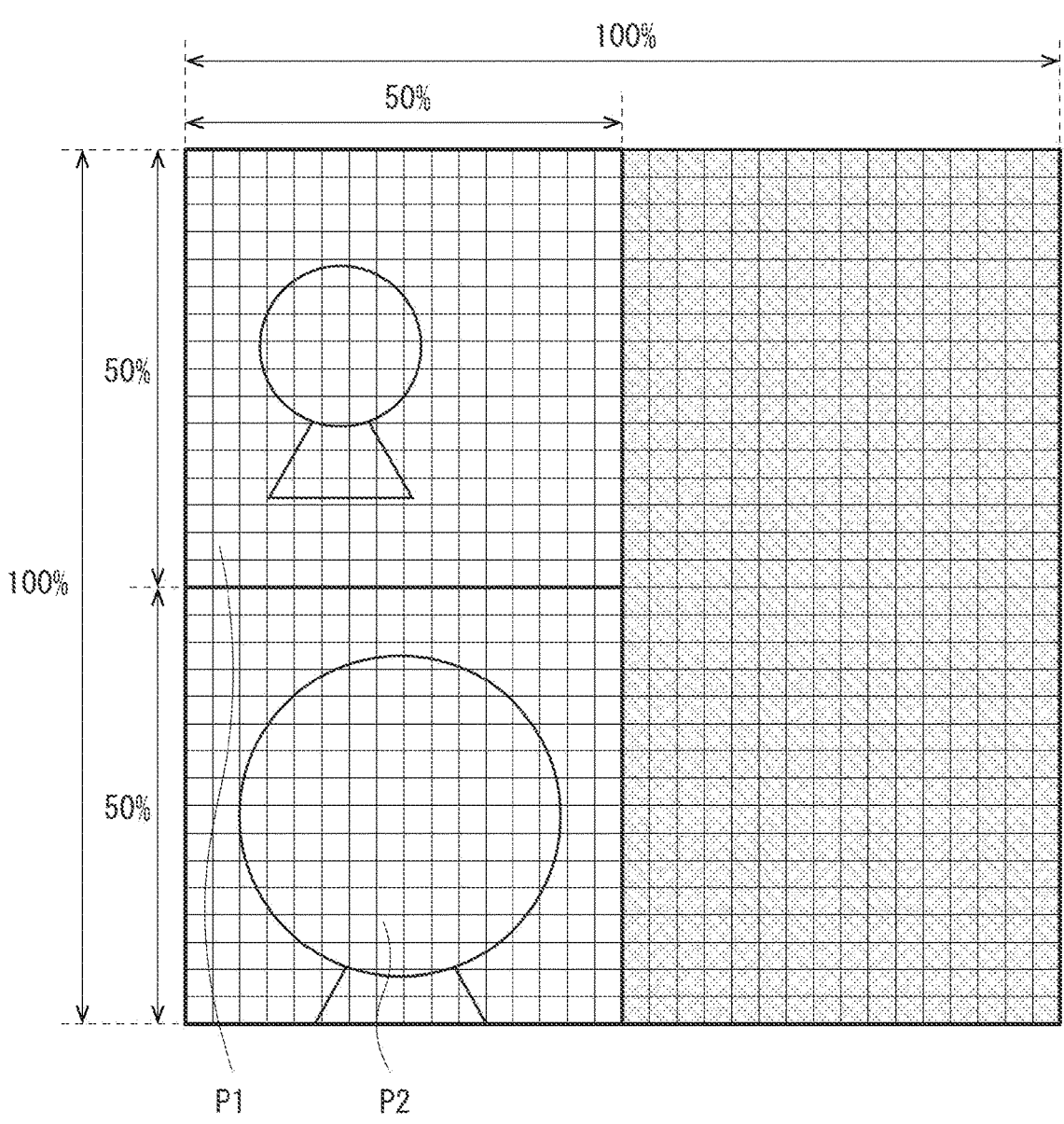

[ FIG. 5 ]
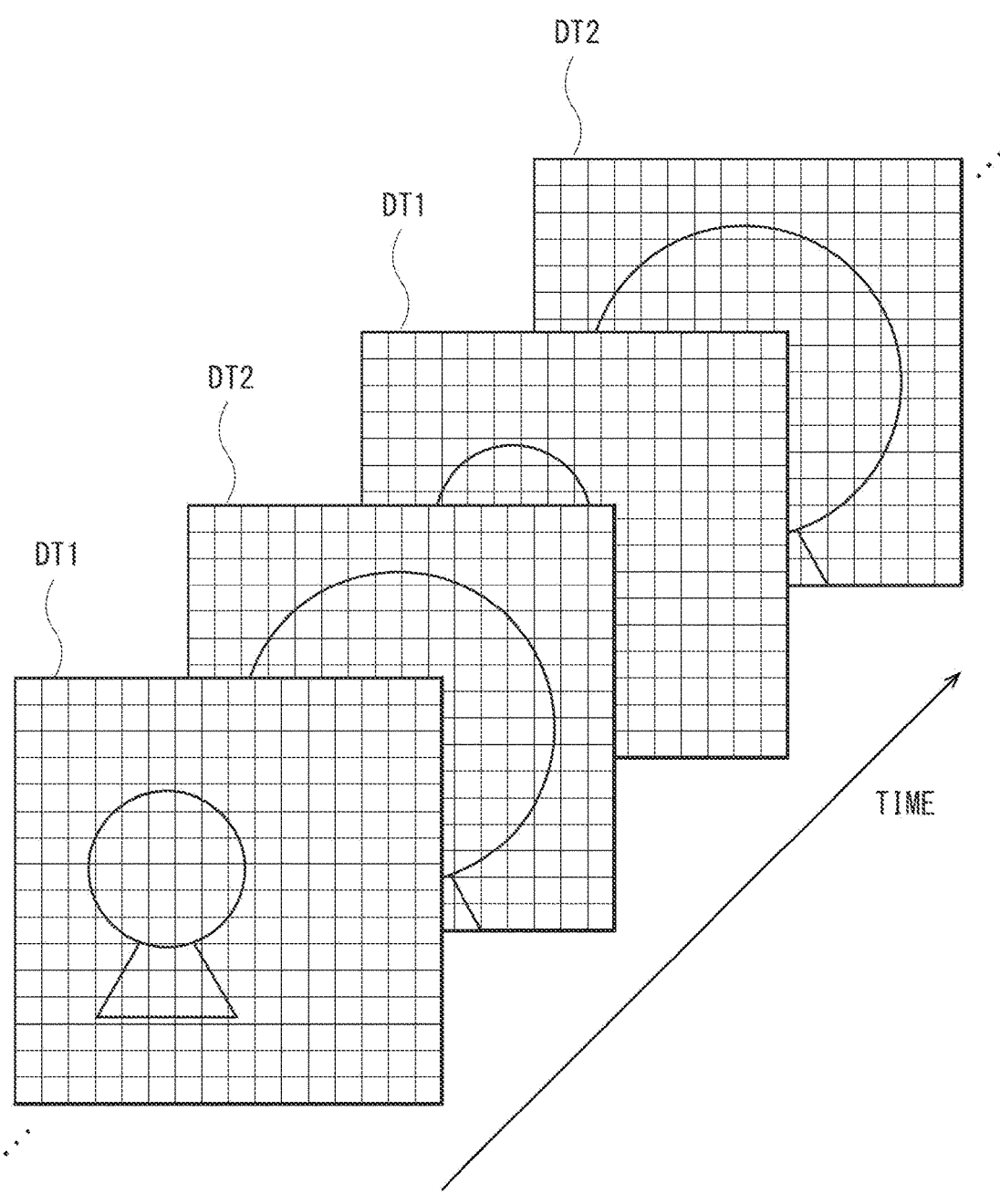

[ FIG. 6 ]
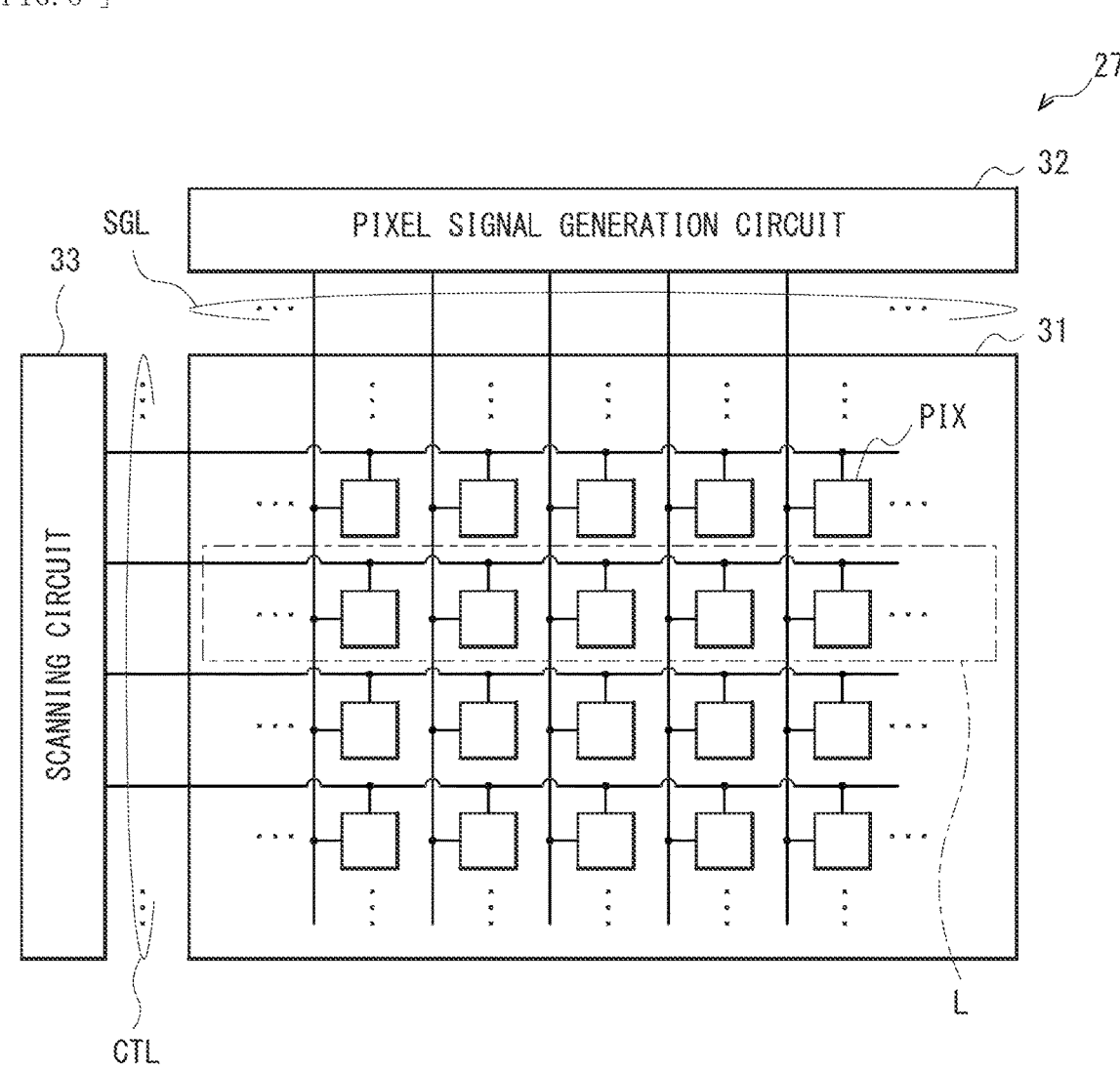

[ FIG. 9 ]
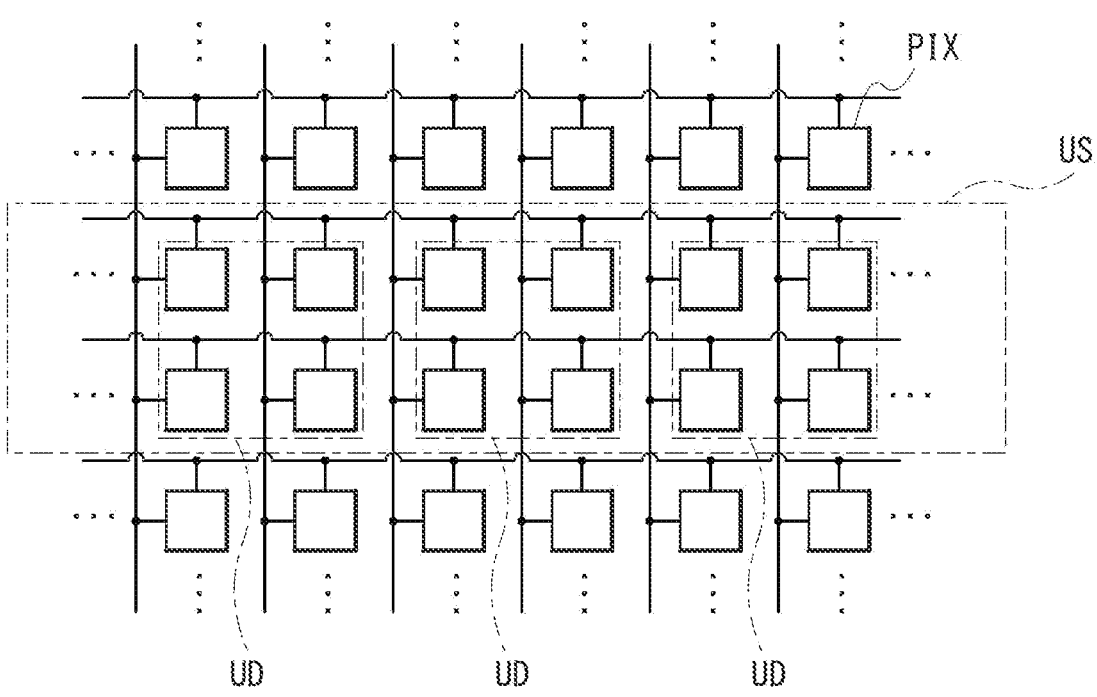
[ FIG. 10 ]
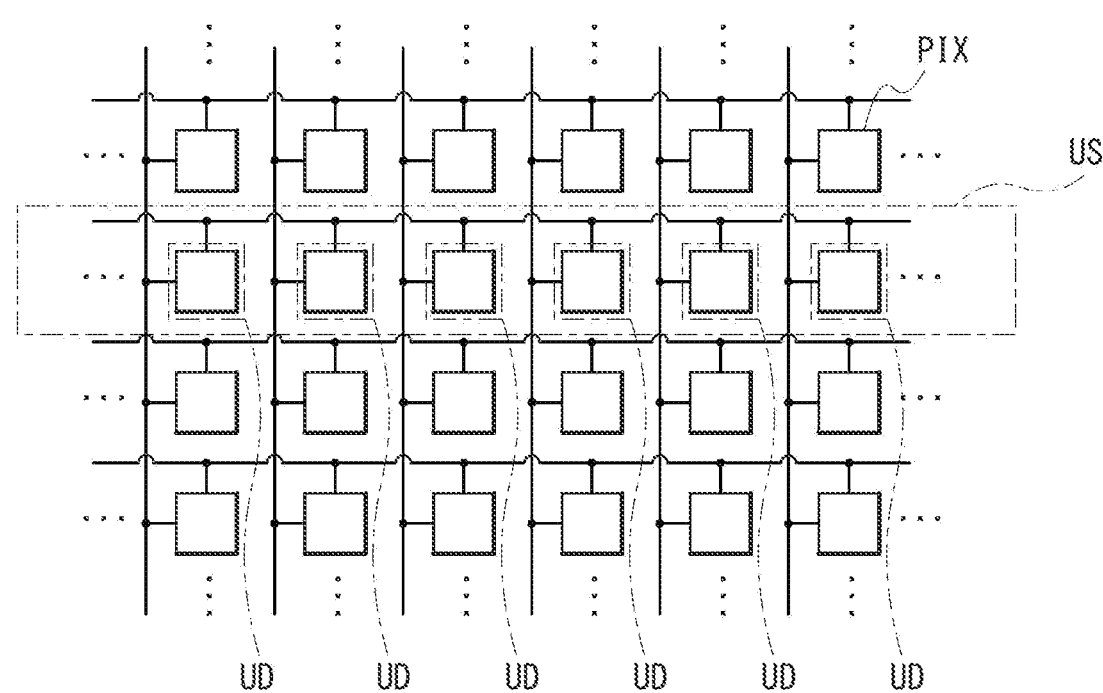

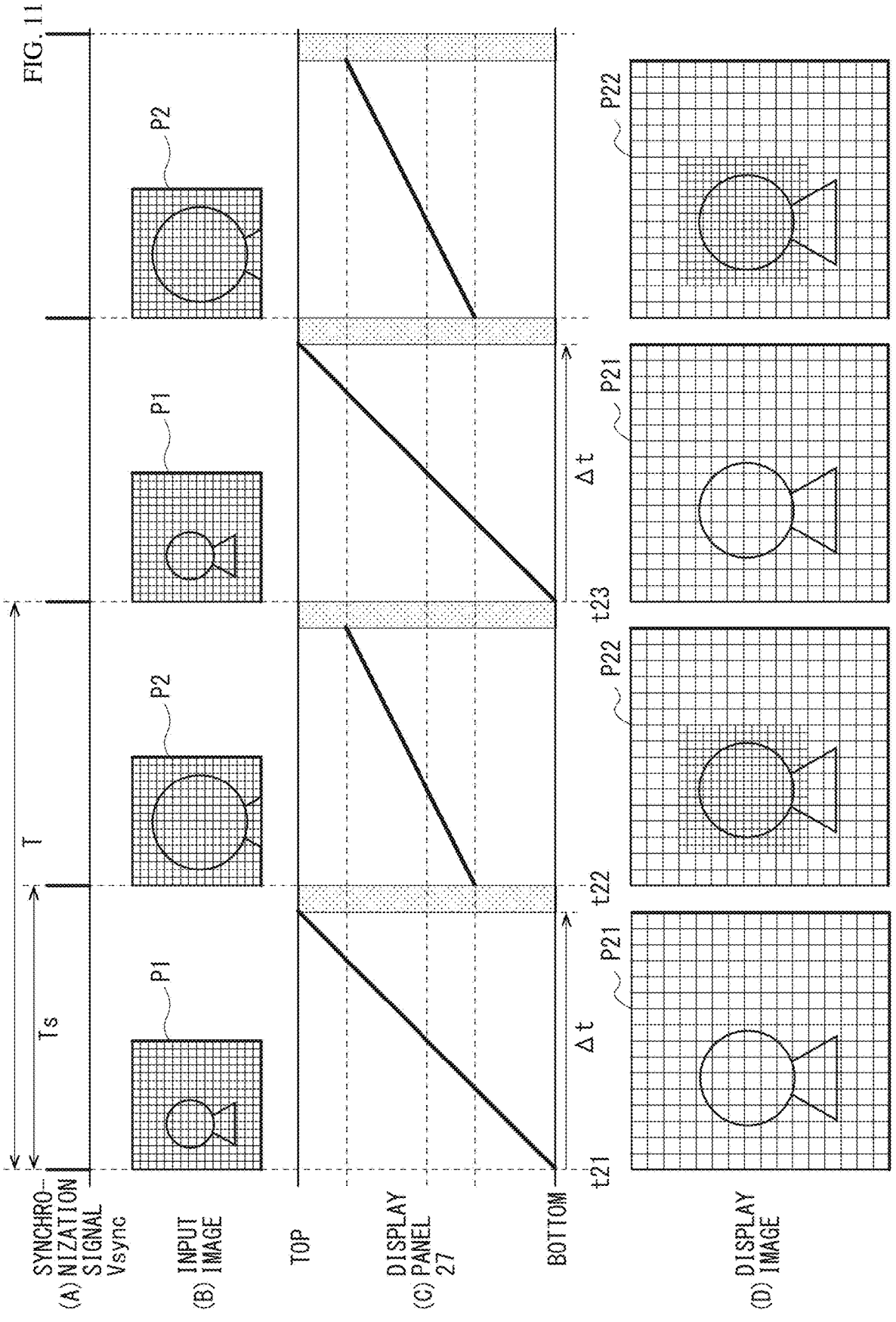

[ FIG. 13 ]

[ FIG. 15 ]
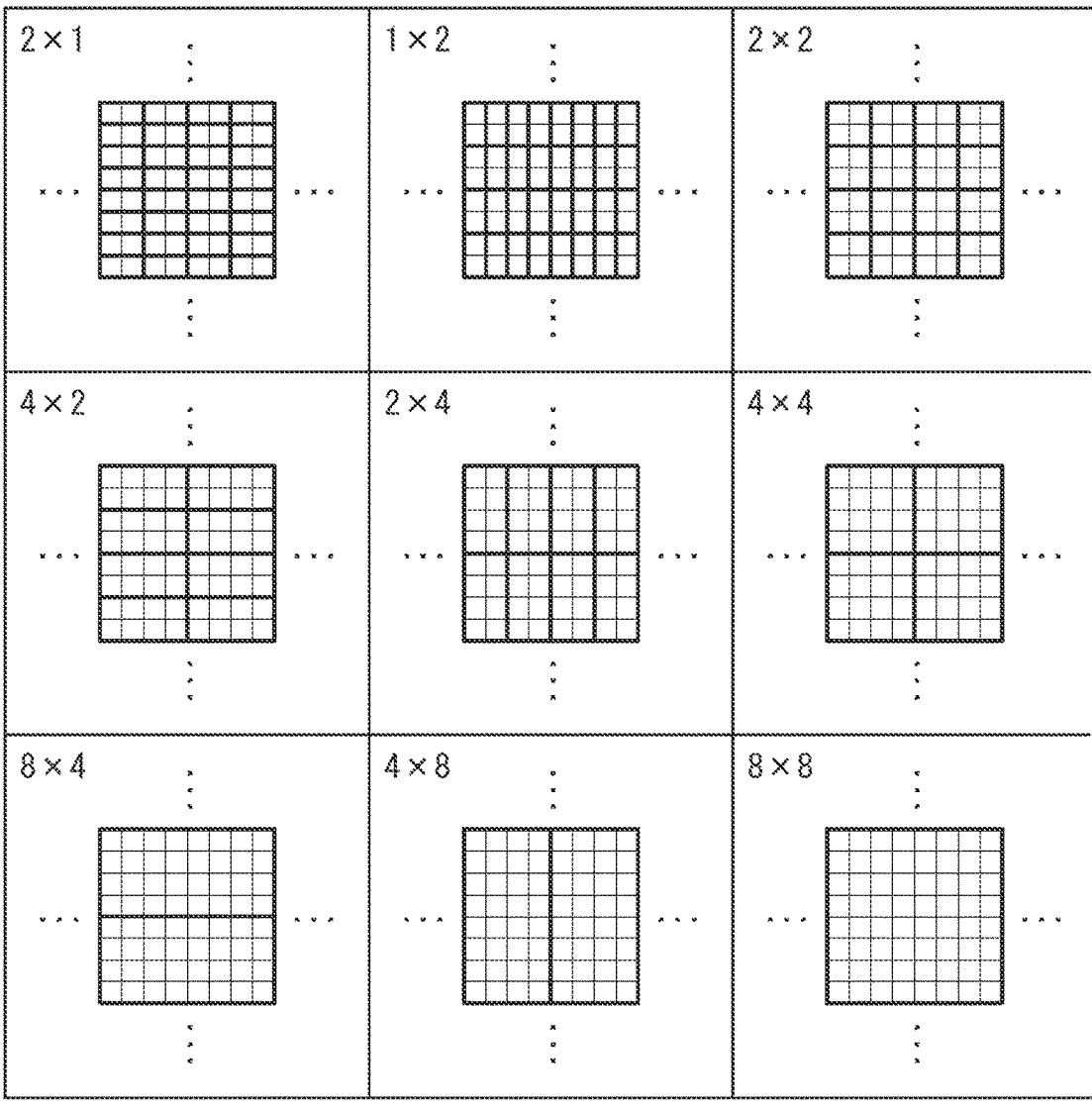

[ FIG. 16 ]

| DRIVE UNIT | HORIZONTAL DIRECTION | VERTICAL DIRECTION | BAND USAGE RATE |
|---|---|---|---|
| 1 × 1 | 1 | 1 | 100% |
| 2 × 1 | 2 | 1 | 50% |
| 1 × 2 | 1 | 2 | 50% |
| 2 × 2 | 2 | 2 | 25% |
| 4 × 2 | 4 | 2 | 12.5% |
| 2 × 4 | 2 | 4 | 12.5% |
| 4 × 4 | 4 | 4 | 6.25% |
| 8 × 4 | 8 | 4 | 3.13% |
| 4 × 8 | 4 | 8 | 3.13% |
| 8 × 8 | 8 | 8 | 1.56% |

[ FIG. 17 ]
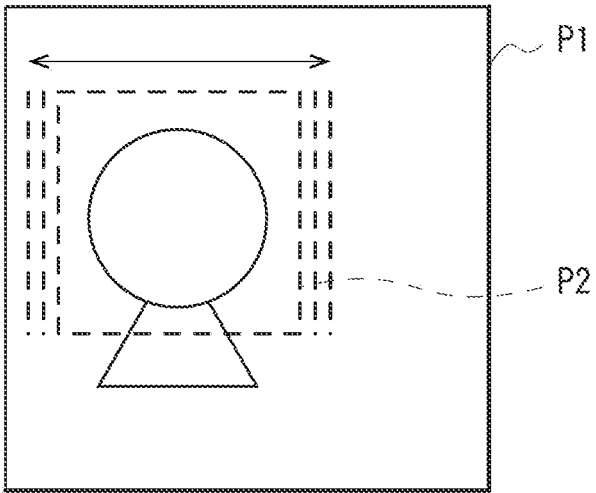
[ FIG. 18 ]
| HORIZONTAL PIXEL NUMBER RATIO | VERTICAL PIXEL NUMBER RATIO | BAND USAGE RATE |
|---|---|---|
| 100% | 50% | 100% |
| 95% | 50% | 95% |
| 90% | 50% | 90% |
| 85% | 50% | 85% |
| 80% | 50% | 80% |
| 75% | 50% | 75% |
| 70% | 50% | 70% |
| 65% | 50% | 65% |
| 60% | 50% | 60% |
| 55% | 50% | 55% |
| 50% | 50% | 50% |

[ FIG. 19 ]
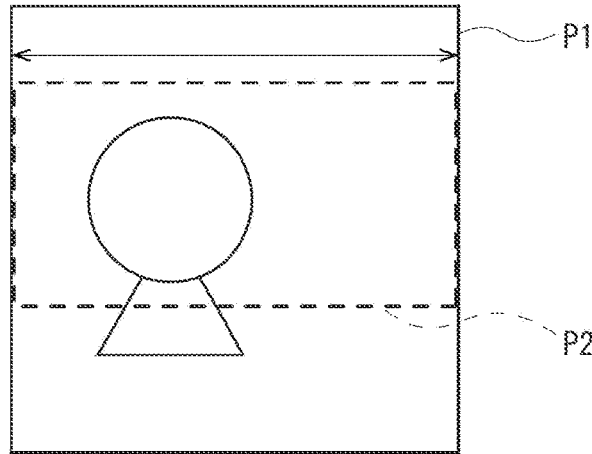
[ FIG. 20 ]

[ FIG. 22 ]
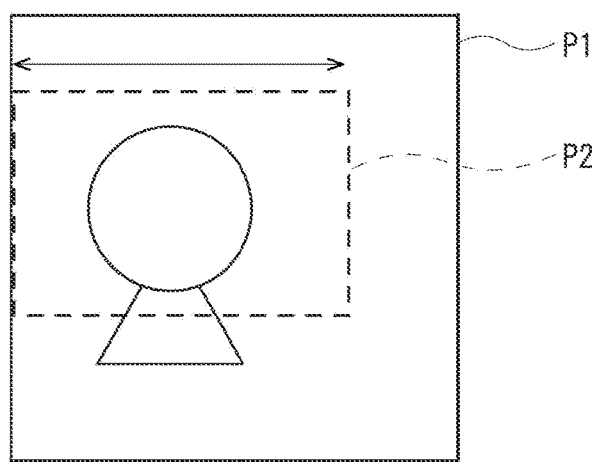
[ FIG. 23 ]

[ FIG. 25 ]
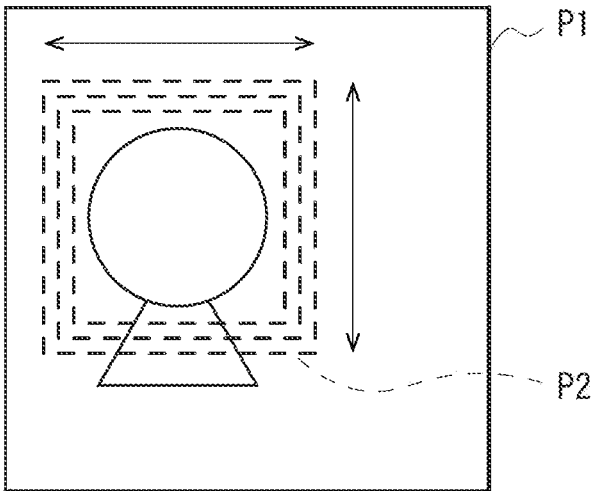
[ FIG. 26 ]
| HORIZONTAL PIXEL NUMBER RATIO | VERTICAL PIXEL NUMBER RATIO | BAND USAGE RATE |
|---|---|---|
| 80% | 80% | 128% |
| 75% | 75% | 113% |
| 70% | 70% | 98% |
| 65% | 65% | 85% |
| 60% | 60% | 72% |
| 55% | 55% | 61% |
| 50% | 50% | 50% |
| 45% | 45% | 50% |
| 40% | 40% | 50% |
| 35% | 35% | 50% |
| 30% | 30% | 50% |

[ FIG. 27 ]
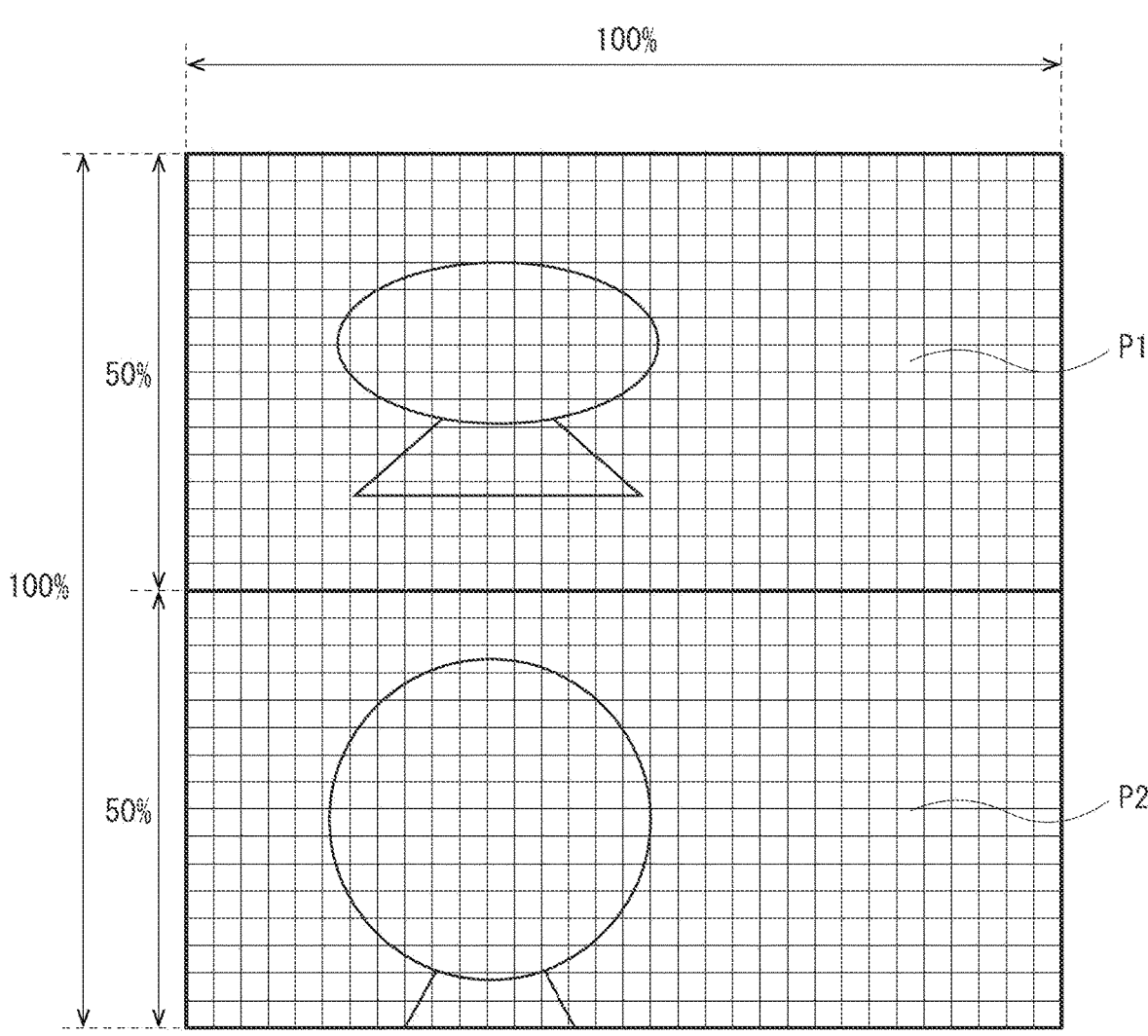

| SUB-FRAME NUMBER | HORIZONTAL PIXEL NUMBER RATIO | VERTICAL PIXEL NUMBER RATIO | BAND USAGE RATE |
|---|---|---|---|
| – | 100% | 100% | 100% |
| 2 | 50% | 50% | 50% |
| 3 | 25% | 25% | 19% |

| | | CASE C1 | | CASE C2 | |
|---|---|---|---|---|---|
| | | PARTIAL IMAGE P2 | ENTIRE IMAGE P1 | PARTIAL IMAGE P2 | ENTIRE IMAGE P1 |
| COLOR SYSTEM | | RGB444 | RGB444 | YUV444 | YUV444 |
| DISPLAY DRIVING | | 1 | 2×2 | 1 | 2×2 |
| IMAGE DATA | | R1 R2 R3 R4 / R5 R6 R7 R8 / R9 R10 R11 R12 / R13 R14 R15 R16 — G1 G2 G3 G4 / G5 G6 G7 G8 / G9 G10 G11 G12 / G13 G14 G15 G16 — B1 B2 B3 B4 / B5 B6 B7 B8 / B9 B10 B11 B12 / B13 B14 B15 B16 | R1 R2 / R3 R4 — G1 G2 / G3 G4 — B1 B2 / B3 B4 | Y1 Y2 Y3 Y4 / Y5 Y6 Y7 Y8 / Y9 Y10 Y11 Y12 / Y13 Y14 Y15 Y16 — U1 U2 U3 U4 / U5 U6 U7 U8 / U9 U10 U11 U12 / U13 U14 U15 U16 — V1 V2 V3 V4 / V5 V6 V7 V8 / V9 V10 V11 V12 / V13 V14 V15 V16 | Y1 Y2 / Y3 Y4 — U1 U2 / U3 U4 — V1 V2 / V3 V4 |
| BAND USAGE RATE | | 50% | | 50% | |

FIG. 42B

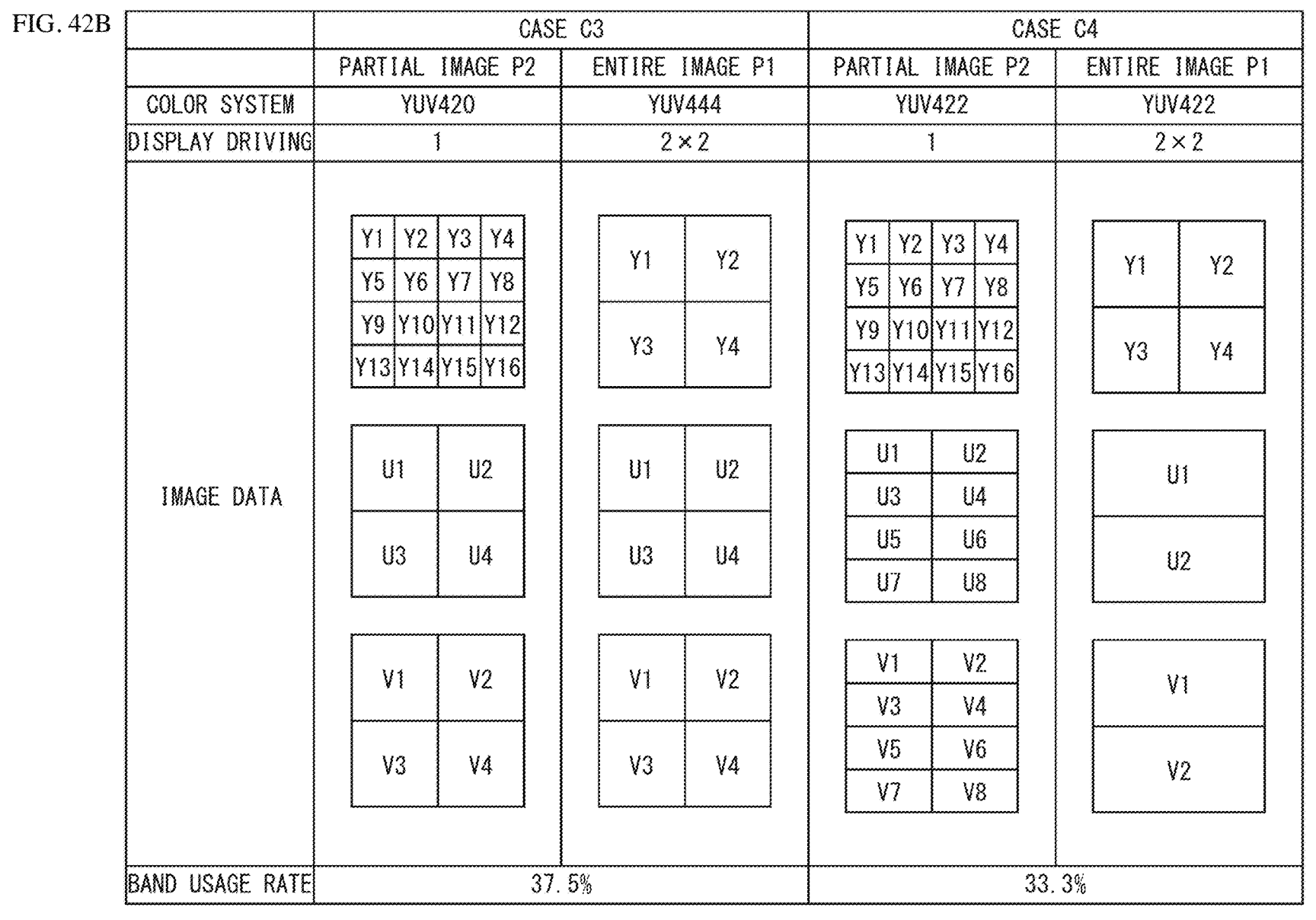

| | CASE C3 | | CASE C4 | |
|---|---|---|---|---|
| | PARTIAL IMAGE P2 | ENTIRE IMAGE P1 | PARTIAL IMAGE P2 | ENTIRE IMAGE P1 |
| COLOR SYSTEM | YUV420 | YUV444 | YUV422 | YUV422 |
| DISPLAY DRIVING | 1 | 2×2 | 1 | 2×2 |
| IMAGE DATA | Y1 Y2 Y3 Y4 / Y5 Y6 Y7 Y8 / Y9 Y10 Y11 Y12 / Y13 Y14 Y15 Y16; U1 U2 / U3 U4; V1 V2 / V3 V4 | Y1 Y2 / Y3 Y4; U1 U2 / U3 U4; V1 V2 / V3 V4 | Y1 Y2 Y3 Y4 / Y5 Y6 Y7 Y8 / Y9 Y10 Y11 Y12 / Y13 Y14 Y15 Y16; U1 U2 U3 U4 / U5 U6 U7 U8; V1 V2 V3 V4 / V5 V6 V7 V8 | Y1 Y2 / Y3 Y4; U1 U2; V1 V2 |
| BAND USAGE RATE | 37.5% | | 33.3% | |

FIG. 42C

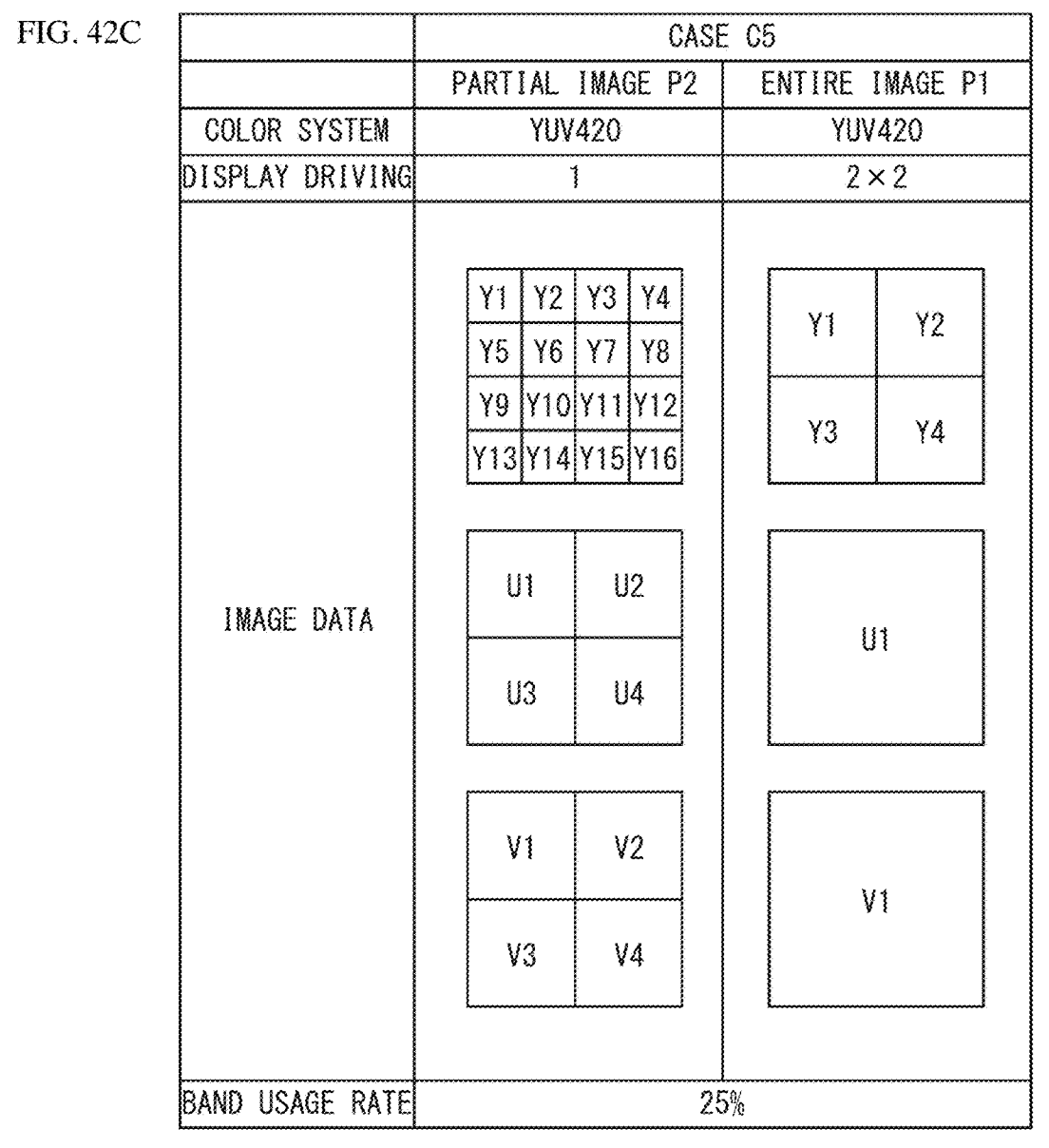

| | | CASE C5 | |
|---|---|---|---|
| | | PARTIAL IMAGE P2 | ENTIRE IMAGE P1 |
| COLOR SYSTEM | | YUV420 | YUV420 |
| DISPLAY DRIVING | | 1 | 2 × 2 |
| IMAGE DATA | | Y1 Y2 Y3 Y4 / Y5 Y6 Y7 Y8 / Y9 Y10 Y11 Y12 / Y13 Y14 Y15 Y16 ; U1 U2 / U3 U4 ; V1 V2 / V3 V4 | Y1 Y2 / Y3 Y4 ; U1 ; V1 |
| BAND USAGE RATE | | 25% | |

[ FIG. 43 ]
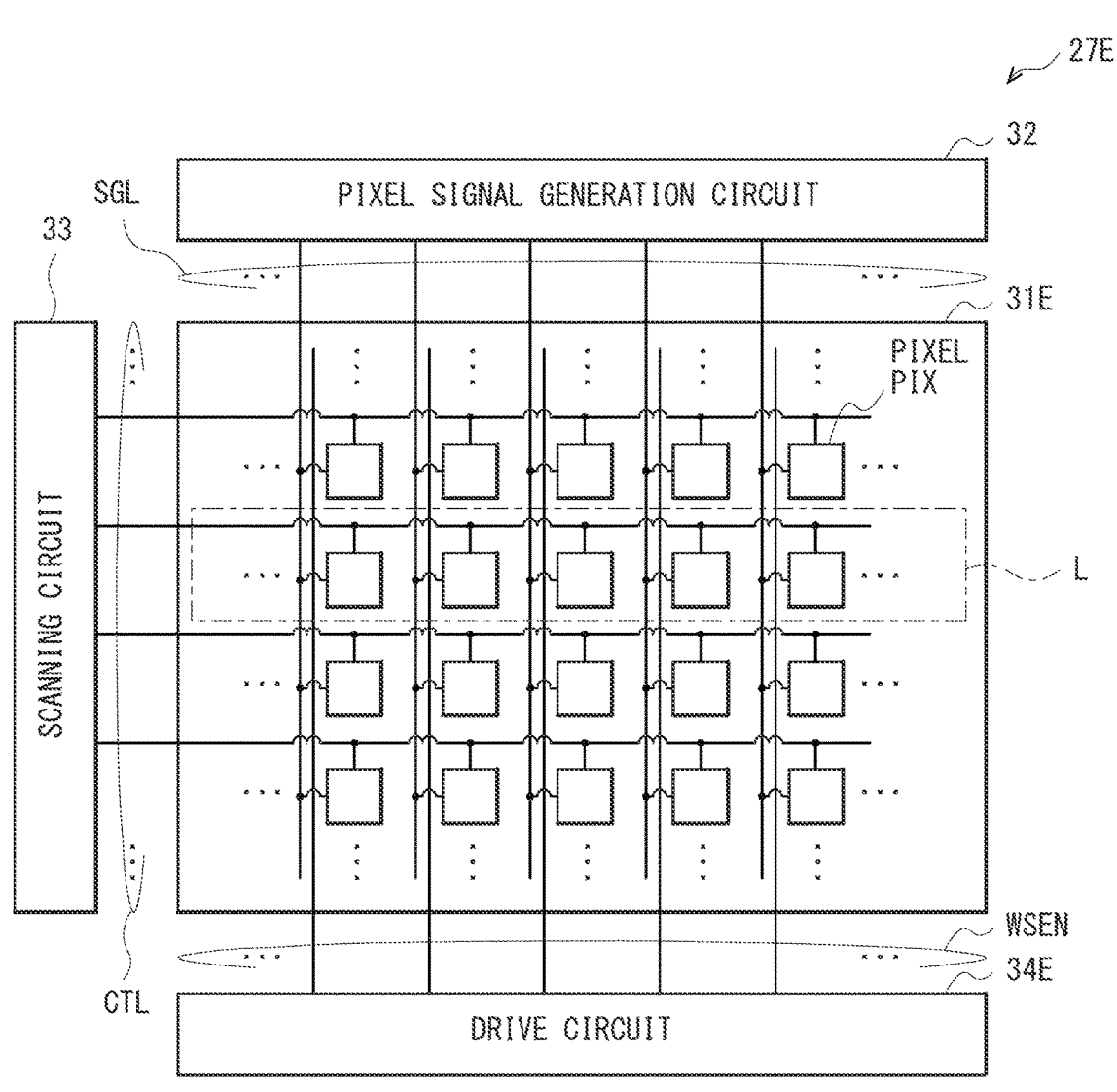

[ FIG. 44 ]
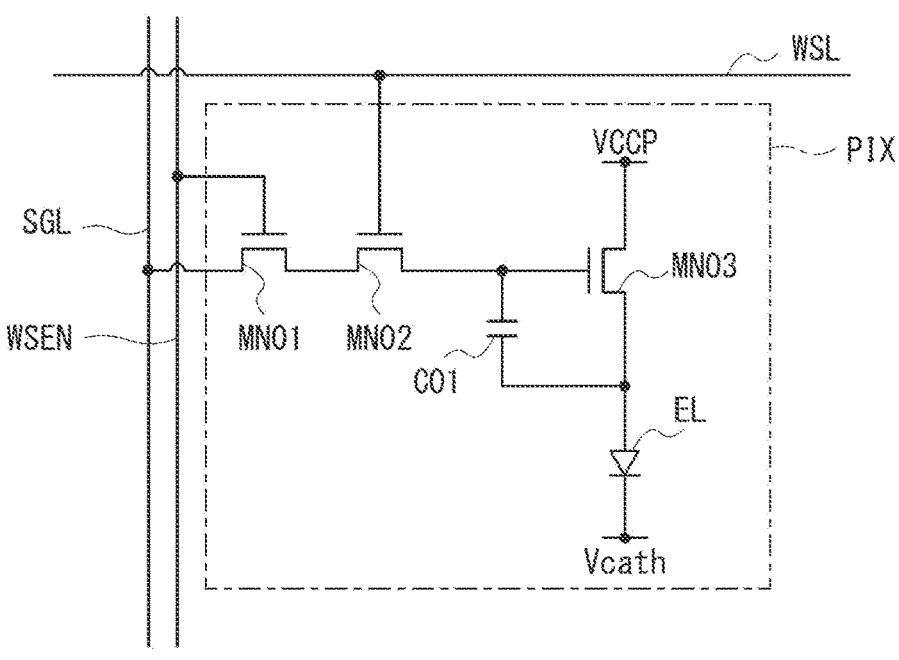
[ FIG. 45 ]
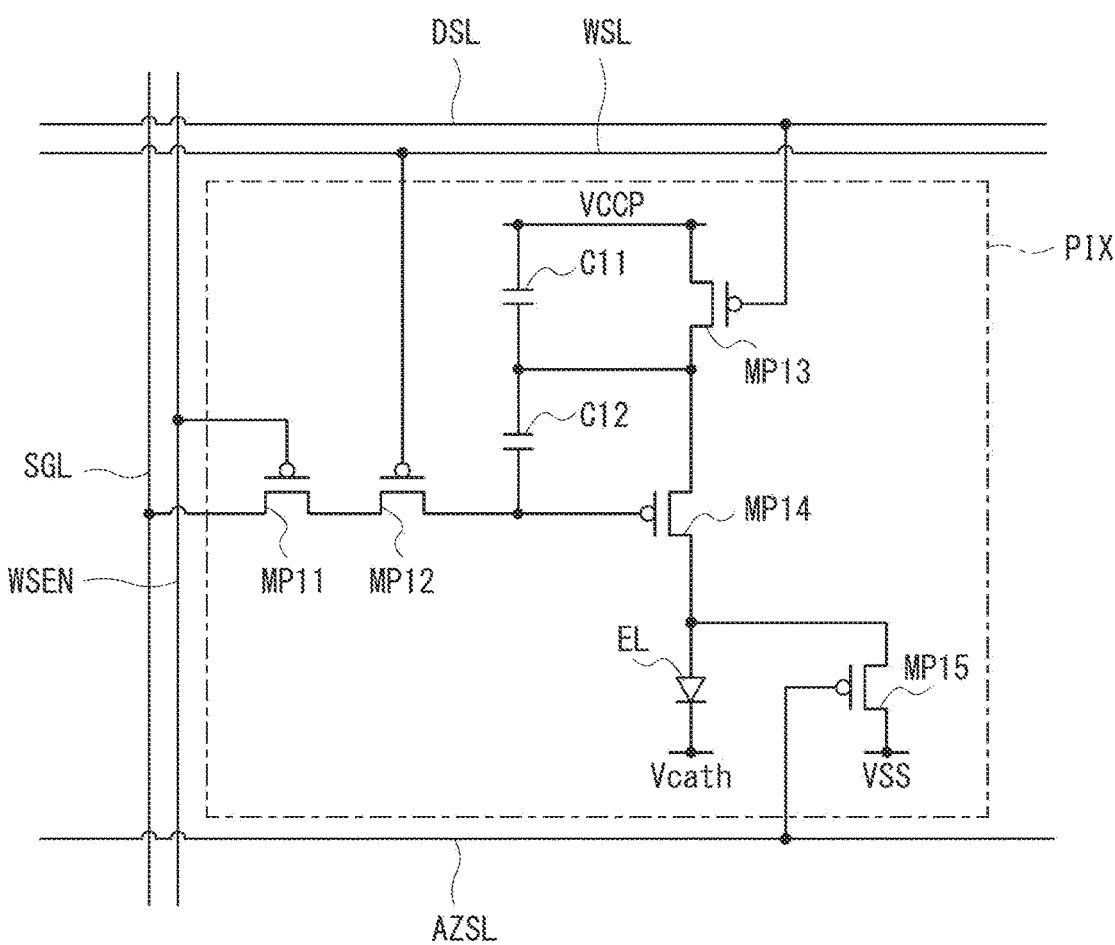

[ FIG. 46 ]
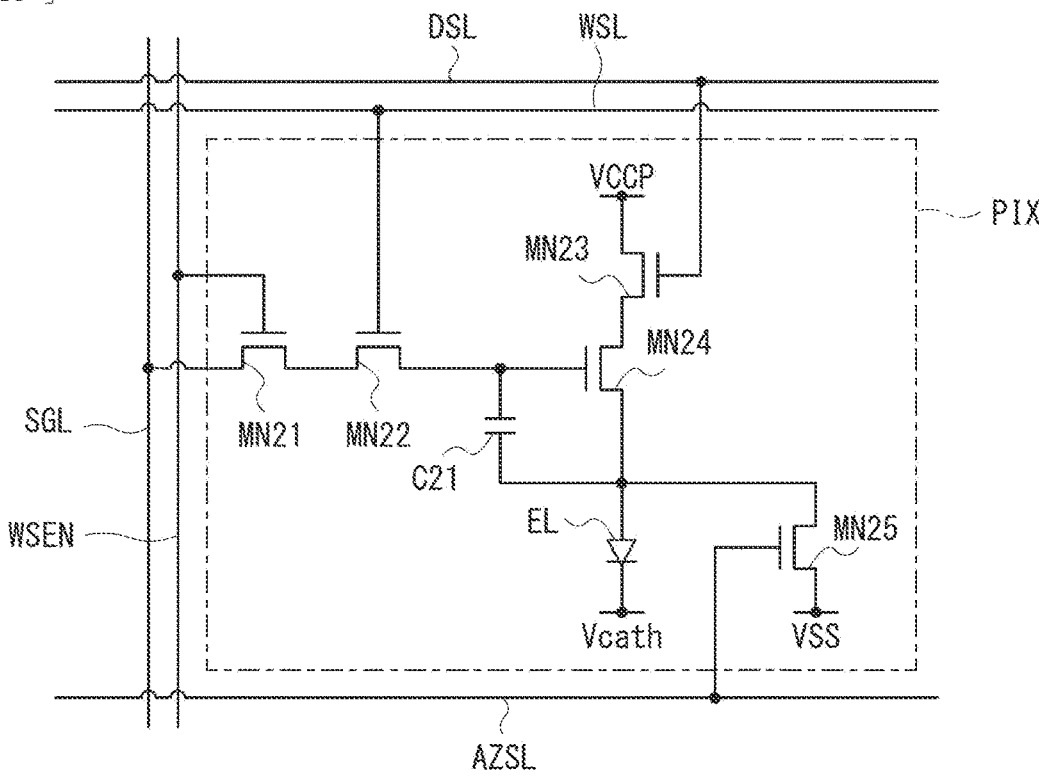
[ FIG. 47 ]
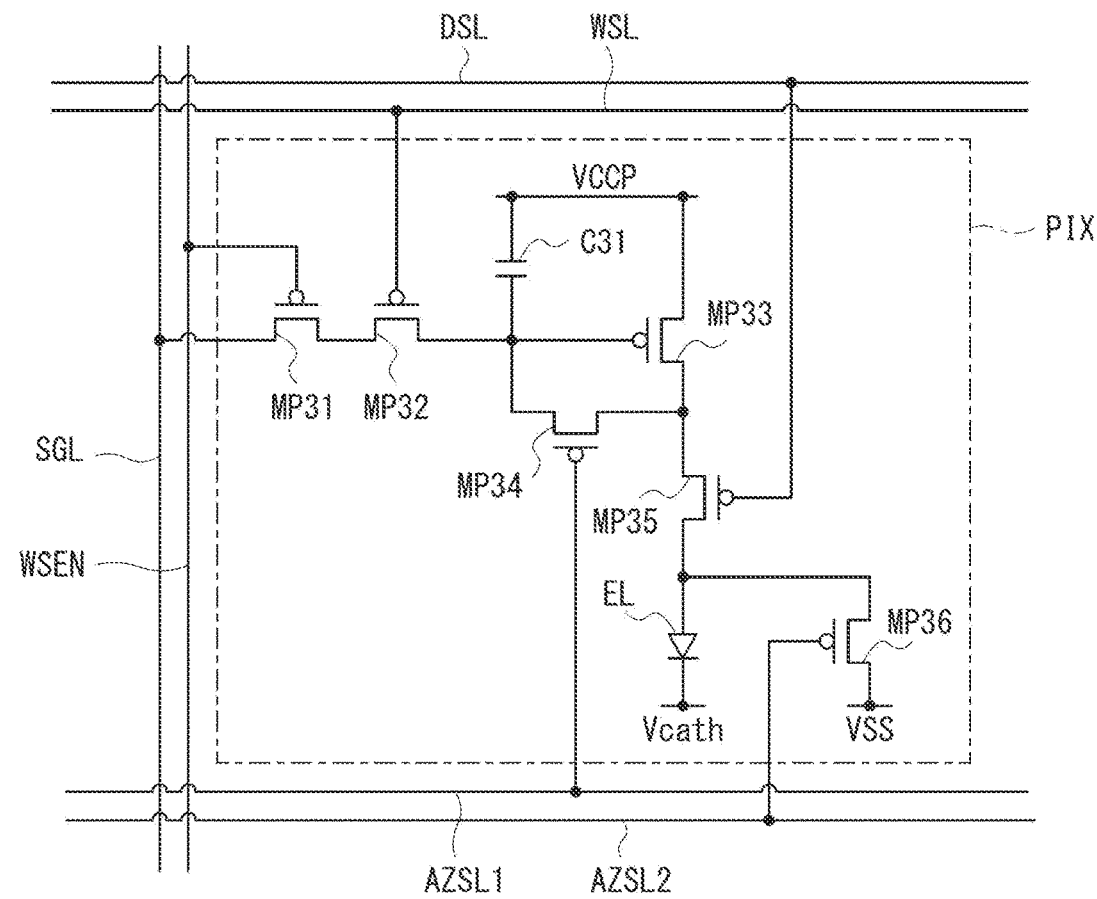

[ FIG. 48 ]
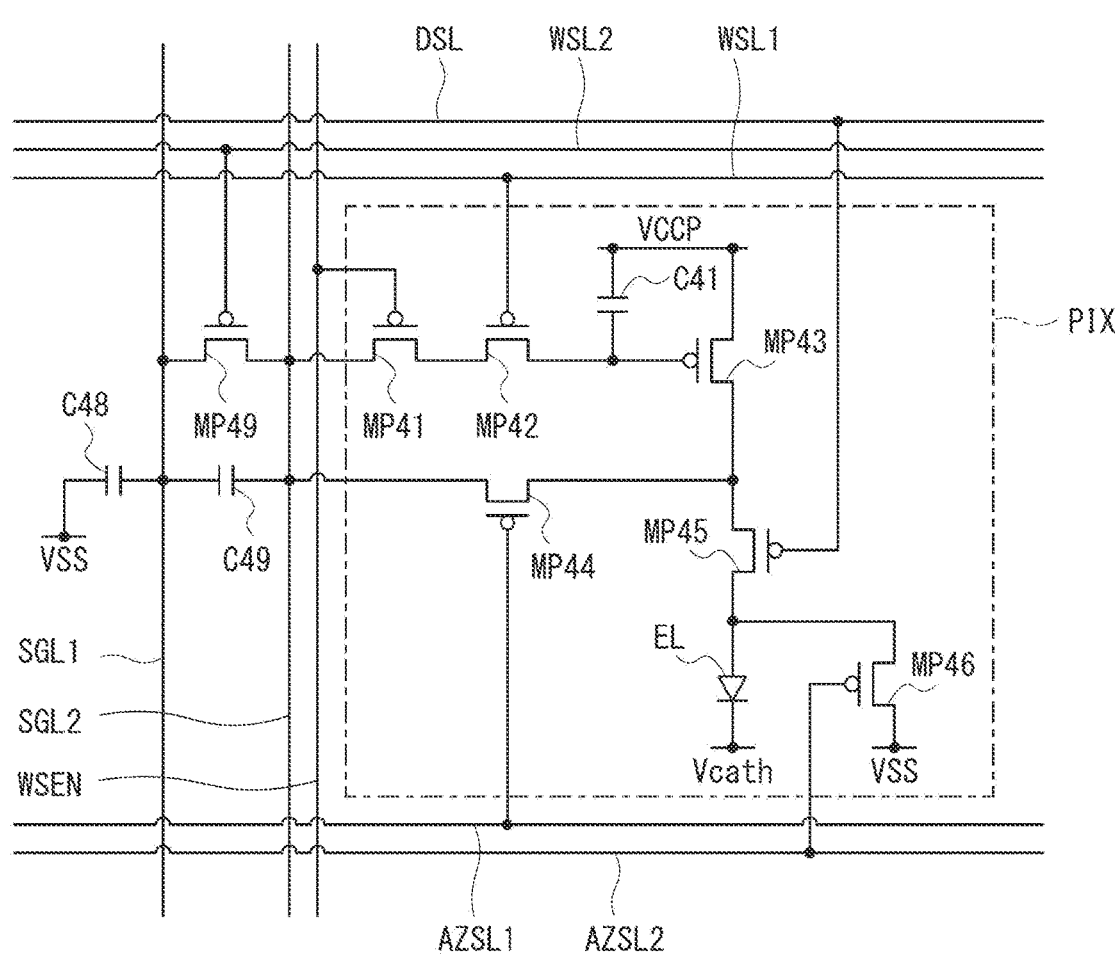

[ FIG. 49 ]
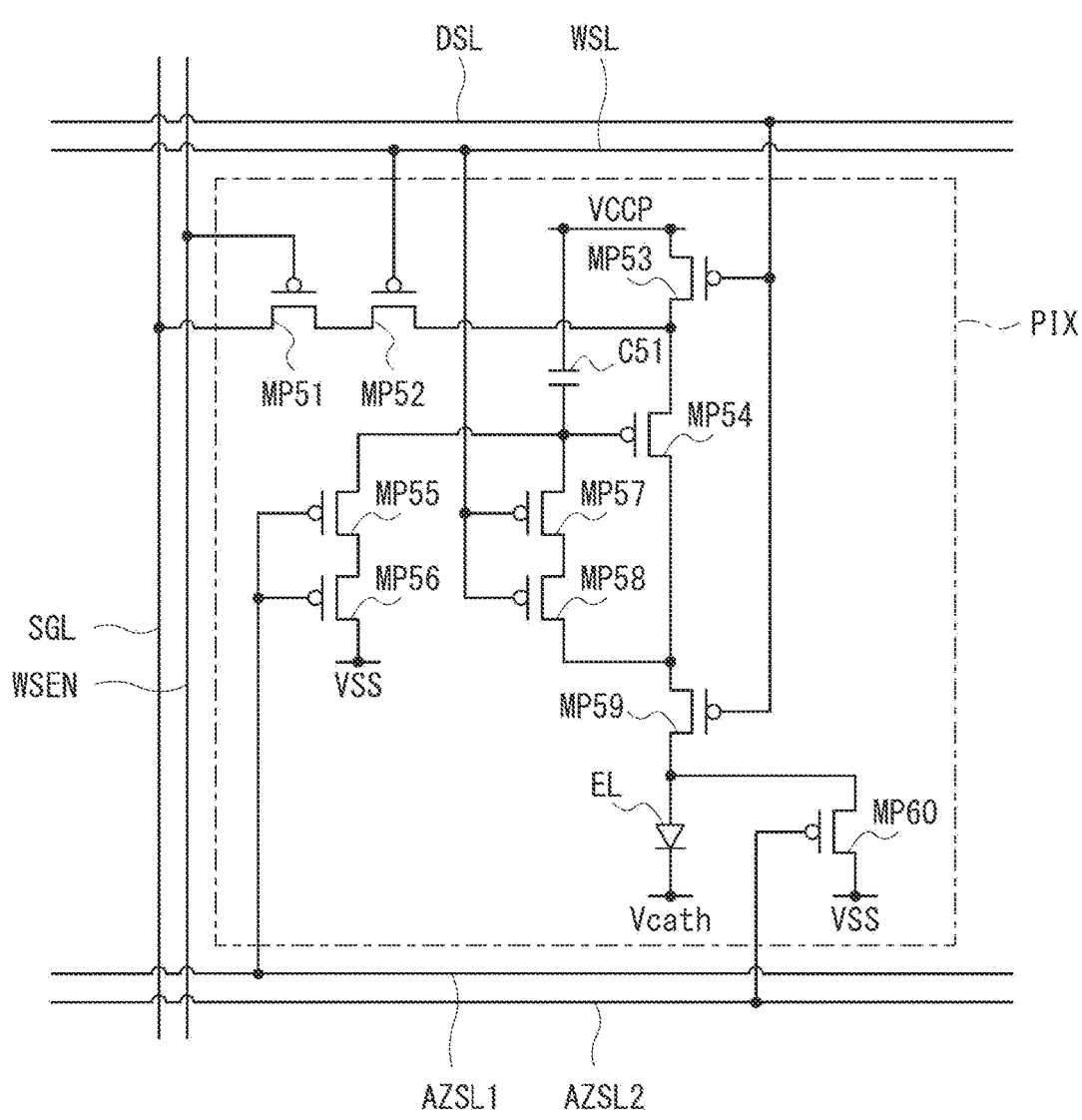

[ FIG. 50 ]
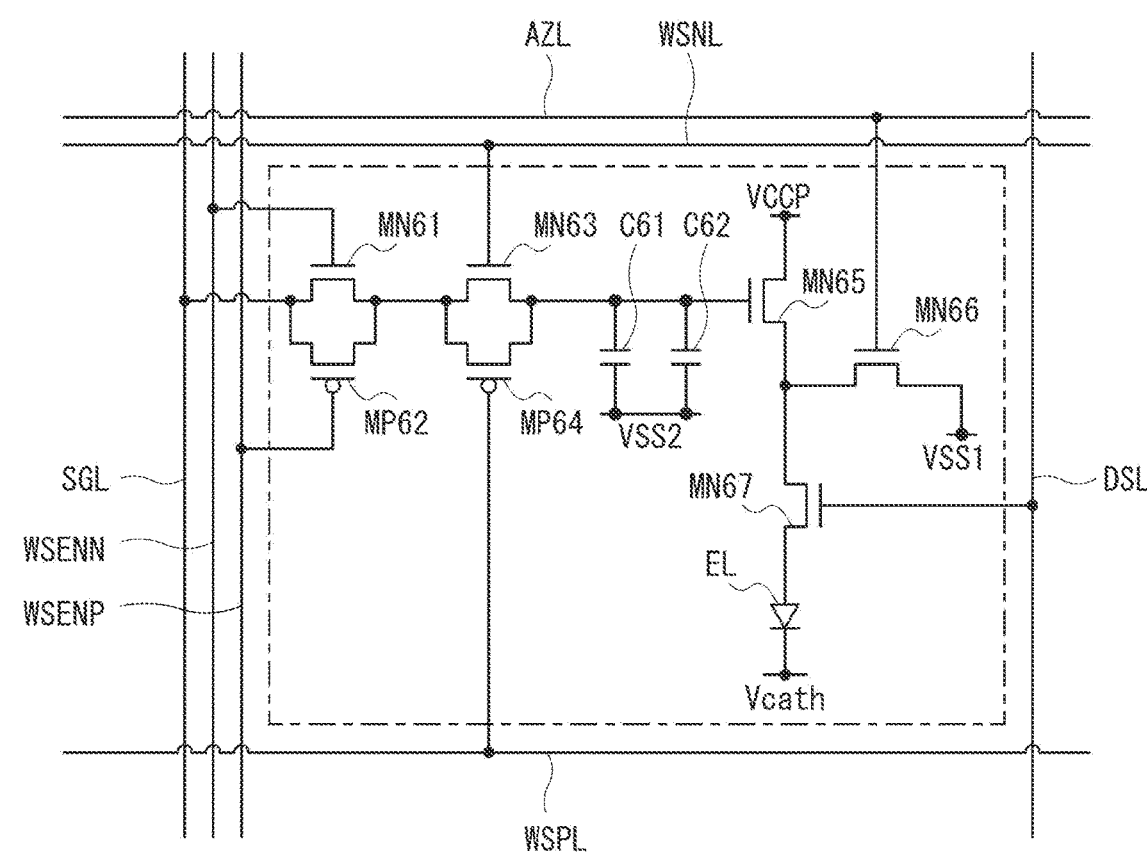

[ FIG. 51 ]
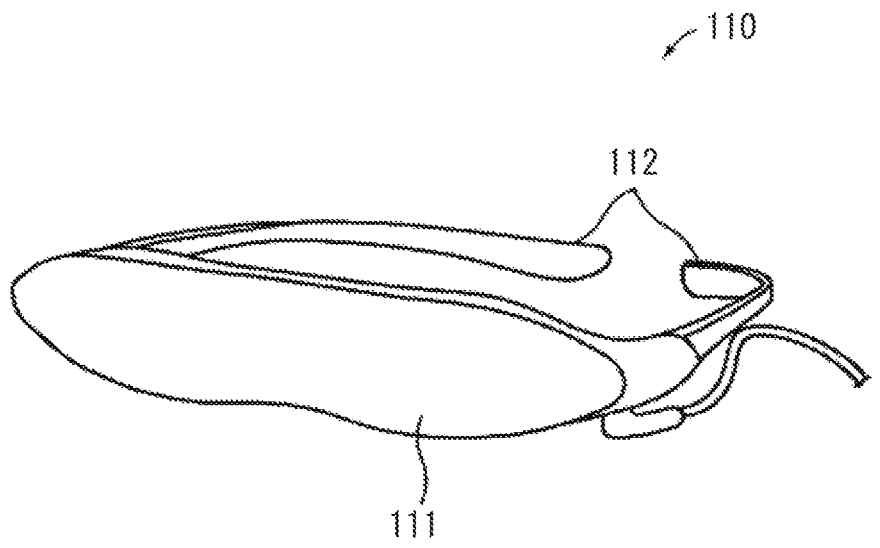
[ FIG. 52 ]
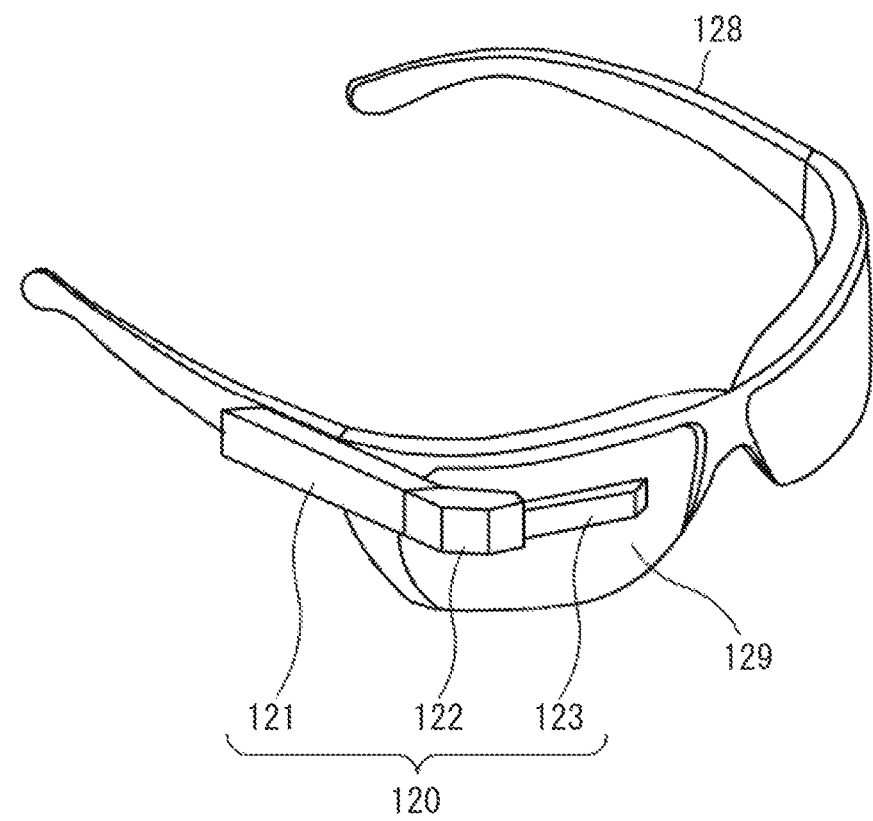

[ FIG. 53A ]
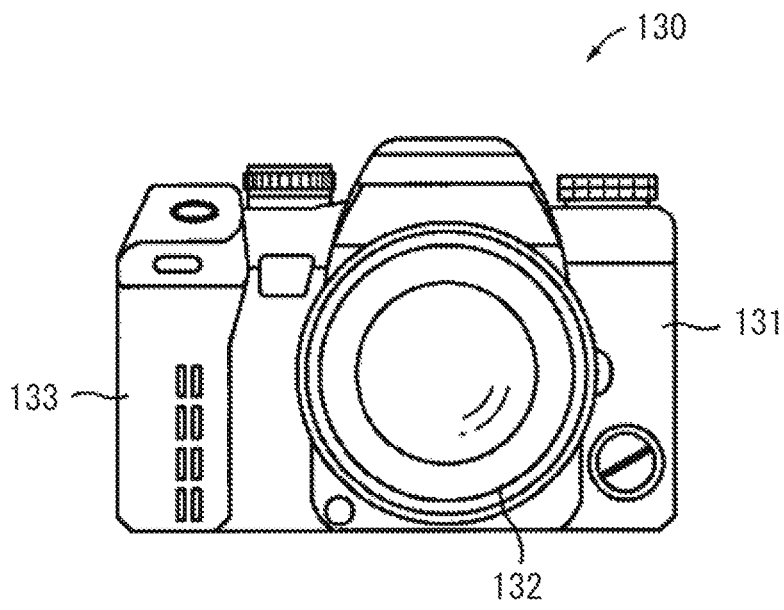
[ FIG. 53B ]
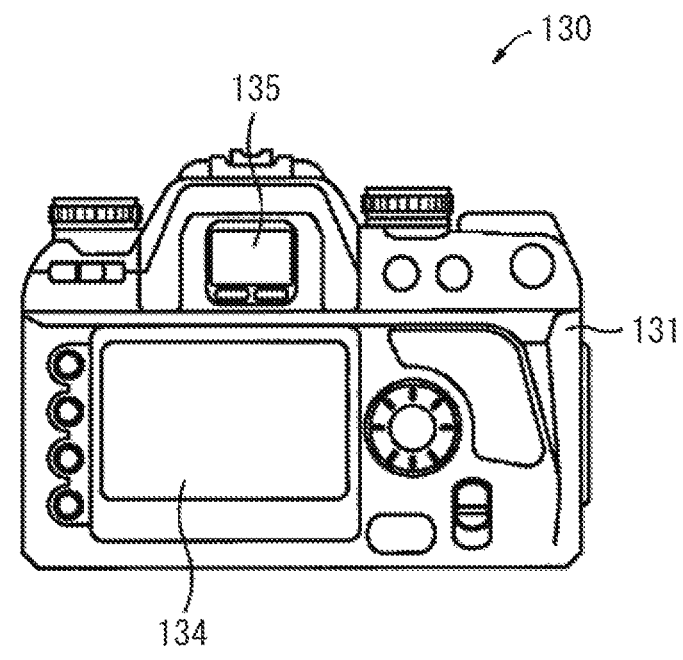

[ FIG. 54 ]
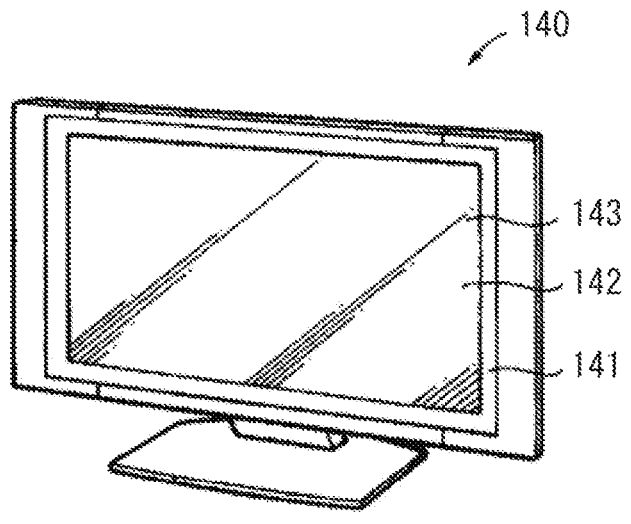
140
143
142
141
[ FIG. 55 ]
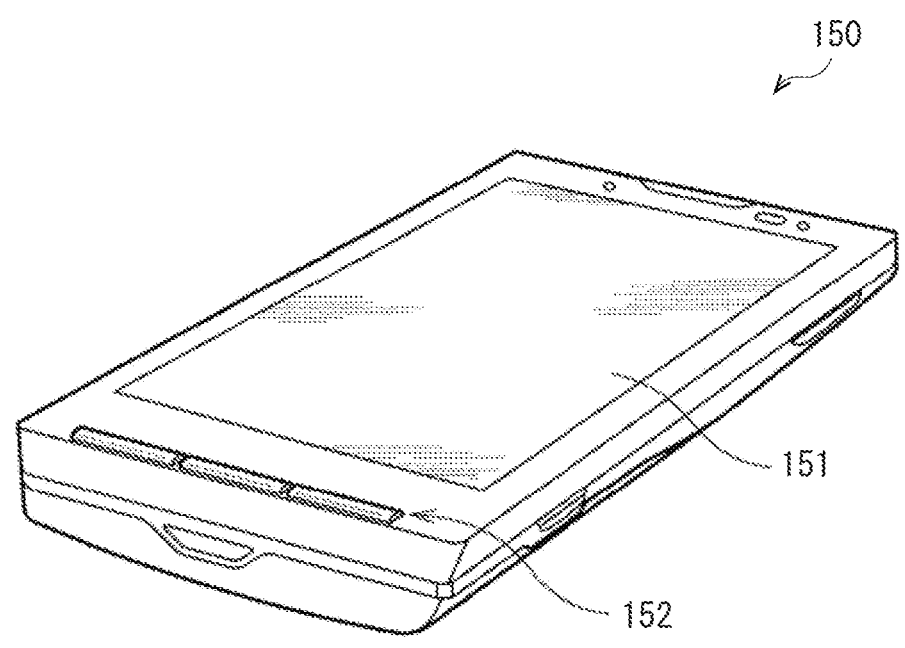
150
151
152

[ FIG. 56A ]
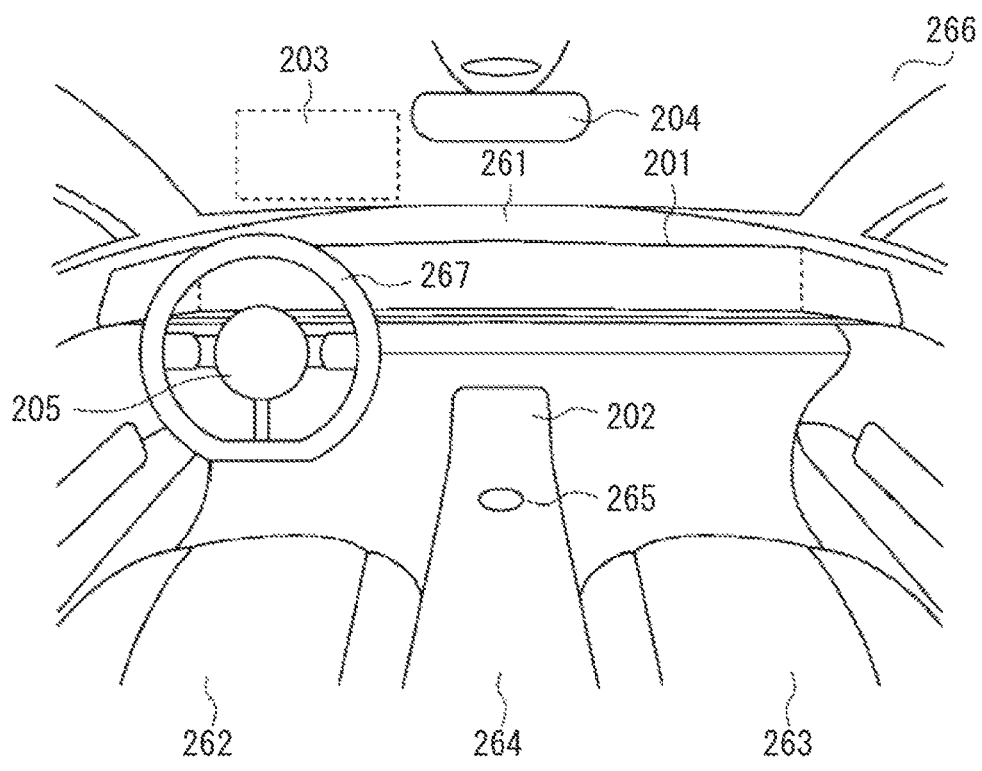
[ FIG. 56B ]
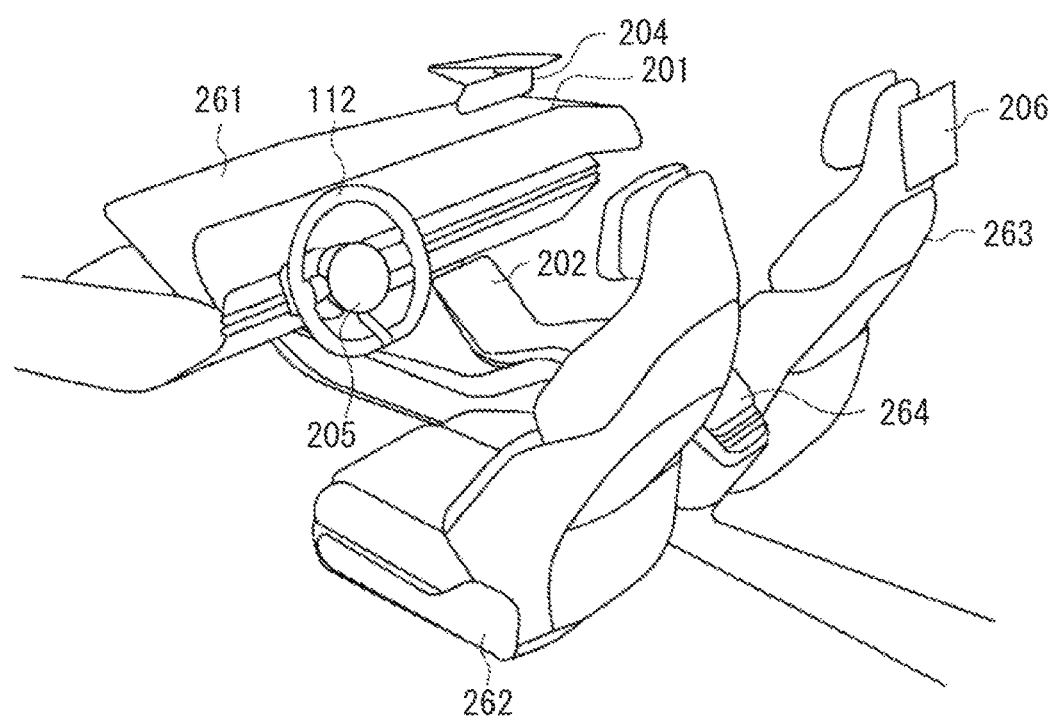

DISPLAY DEVICE, DISPLAY SYSTEM, AND DISPLAY DRIVING METHOD

TECHNICAL FIELD

The present disclosure relates to a display device that displays an image, a display system, and a display driving method.

BACKGROUND ART

For example, there is a display device that generates a frame image on the basis of an entire image having a low resolution and a partial image having a high resolution and displays the generated frame image (for example, PTL 1).

CITATION LIST

Patent Literature

PTL 1: Japanese Unexamined Patent Application Publication No. 2019-197224

SUMMARY OF THE INVENTION

In display devices, high image quality is desired, and a further improvement in image quality is expected.

It is desirable to provide a display device, a display system, and a display driving method that make it possible to enhance image quality.

A display device according to an embodiment of the present disclosure includes a reception circuit, a display section, and a display drive circuit. The reception circuit is configured to be able to receive a piece of first image data and a piece of second image data. The piece of first image data represents an entire image having a first resolution. The piece of second image data represents a first partial image having a second resolution higher than the first resolution. The first partial image corresponds to a portion of the entire image. The display section includes a plurality of pixels. The display drive circuit is configured to be able to perform first driving and second driving. In the first driving, the plurality of pixels is driven in units of a first number of pixels on the basis of the piece of first image data, and in the second driving, two or more pixels provided in a region corresponding to the first partial image of the plurality of pixels are driven in units of a second number of pixels on the basis of the piece of second image data. The second number is smaller than the first number.

A display system according to an embodiment of the present disclosure includes an image generation device and a display device. The image generation device is configured to be able to transmit a piece of first image data and a piece of second image data. The piece of first image data represents an entire image having a first resolution. The piece of second image data represents a first partial image having a second resolution higher than the first resolution. The first partial image corresponds to a portion of the entire image. The display device includes a reception circuit, a display section, and a display drive circuit. The reception circuit is configured to be able to receive the piece of first image data and the piece of second image data. The display section includes a plurality of pixels. The display drive circuit is configured to be able to perform first driving and second driving. In the first driving, the plurality of pixels is driven in units of a first number of pixels on the basis of the piece of first image data. In the second driving, two or more pixels provided in a region corresponding to the first partial image of the plurality of pixels are driven in units of a second number of pixels on the basis of the piece of second image data. The second number is smaller than the first number.

A display driving method according to an embodiment of the present disclosure includes: transmitting a piece of first image data and a piece of second image data, the piece of first image data representing an entire image having a first resolution, the piece of second image data representing a first partial image having a second resolution higher than the first resolution, the first partial image corresponding to a portion of the entire image; receiving the piece of first image data and the piece of second image data; performing first driving in which a plurality of pixels is driven in units of a first number of pixels on the basis of the piece of first image data; and performing second driving in which two or more pixels provided in a region corresponding to the first partial image of the plurality of pixels are driven in units of a second number of pixels on the basis of the piece of second image data, the second number being smaller than the first number.

In the display device, the display system, and the display driving method according to the embodiments of the present disclosure, the reception circuit receives the piece of first image data and the piece of second image data. The piece of first image data is a piece of data representing the entire image having the first resolution. The piece of second image data is a piece of data representing the first partial image having the second resolution higher than the first resolution. The first partial image corresponds to a portion of the entire image. The first driving is performed in which the plurality of pixels is driven in units of the first number of pixels on the basis of the piece of first image data. In addition, the second driving is performed in which two or more pixels provided in the region corresponding the first partial image of the plurality of pixels are driven in units of the second number of pixels on the basis of the piece of second image data. The second number is smaller than the first number.

BRIEF DESCRIPTION OF DRAWINGS

FIG. 2 is an explanatory diagram illustrating an example of a display image of a head-mounted display illustrated in FIG. 1.

FIG. 3 is an explanatory diagram illustrating an example of an entire image and a partial image generated by an image generation device illustrated in FIG. 1.

FIG. 4A is an explanatory diagram illustrating an example of a piece of image data of an entire image according to a reference example.

FIG. 4B is an explanatory diagram illustrating an example of pieces of image data of the entire image and the partial image.

FIG. 5 is an explanatory diagram illustrating an example of pieces of image data to be transmitted by the image generation device illustrated in FIG. 1.

FIG. 6 is a block diagram illustrating a configuration example of a display panel illustrated in FIG. 1.

FIG. 9 is an explanatory diagram illustrating a driving example of pixels.

FIG. 10 is another explanatory diagram illustrating the driving example of the pixels.

FIG. 11 is another explanatory diagram illustrating an example of the display operation in the head-mounted display illustrated in FIG. 1.

FIG. 15 is an explanatory diagram illustrating a driving example of pixels according to another modification example.

FIG. 16 is a table illustrating a characteristic example of a display system according to another modification example.

FIG. 17 is an explanatory diagram illustrating an example of an entire image and a partial image according to another modification example.

FIG. 18 is a table illustrating a characteristic example of a display system according to another modification example.

FIG. 19 is an explanatory diagram illustrating an example of an entire image and a partial image according to another modification example.

FIG. 20 is an explanatory diagram illustrating an example of pieces of image data of the entire image and the partial image according to another modification example.

FIG. 22 is an explanatory diagram illustrating an example of an entire image and a partial image according to another modification example.

FIG. 23 is an explanatory diagram illustrating an example of pieces of image data of the entire image and the partial image according to another modification example.

FIG. 25 is an explanatory diagram illustrating an example of an entire image and a partial image according to another modification example.

FIG. 26 is a table illustrating a characteristic example of a display system according to another modification example.

FIG. 27 is an explanatory diagram illustrating an example of pieces of image data of an entire image and a partial image according to another modification example.

FIG. 38 is a table illustrating a characteristic example of a display system according to another modification example.

FIG. 42A is a table illustrating an operation example of a display system according to another modification example.

FIG. 42B is another table illustrating an operation example of a display system according to another modification example.

FIG. 42C is another table illustrating an operation example of a display system according to another modification example.

FIG. 43 is a block diagram illustrating a configuration example of a display panel according to another modification example.

FIG. 44 is a circuit diagram illustrating a configuration example of a pixel illustrated in FIG. 43.

FIG. 45 is circuit diagram illustrating another configuration example of the pixel illustrated in FIG. 43.

FIG. 46 is a circuit diagram illustrating another configuration example of the pixel illustrated in FIG. 43.

FIG. 47 is a circuit diagram illustrating another configuration example of the pixel illustrated in FIG. 43.

FIG. 48 is a circuit diagram illustrating another configuration example of the pixel illustrated in FIG. 43.

FIG. 49 is a circuit diagram illustrating another configuration example of the pixel illustrated in FIG. 43.

FIG. 50 is a circuit diagram illustrating another configuration example of the pixel illustrated in FIG. 43.

FIG. 51 is a perspective view of an appearance configuration of a head-mounted display according to an application example.

FIG. 52 is a perspective view of an appearance configuration of another head-mounted display according to the application example.

FIG. 53A is a front view of an appearance configuration of a digital still camera according to another application example.

FIG. 53B is a rear view of an appearance configuration of the digital still camera according to another application example.

FIG. 54 is a rear view of an appearance configuration of a television apparatus according to another application example.

FIG. 55 is a rear view of an appearance configuration of a smartphone according to another application example.

FIG. 56A is an explanatory diagram illustrating a configuration example of a vehicle according to another application example.

FIG. 56B is an explanatory diagram illustrating a configuration example of the vehicle according to another application example.

MODES FOR CARRYING OUT THE INVENTION

Some embodiments of the present disclosure are described below in detail with reference to the drawings. It is to be noted that description is given in the following order.
1. Embodiment
2. Application Examples

1. EMBODIMENT

Configuration Example

Figure 1:
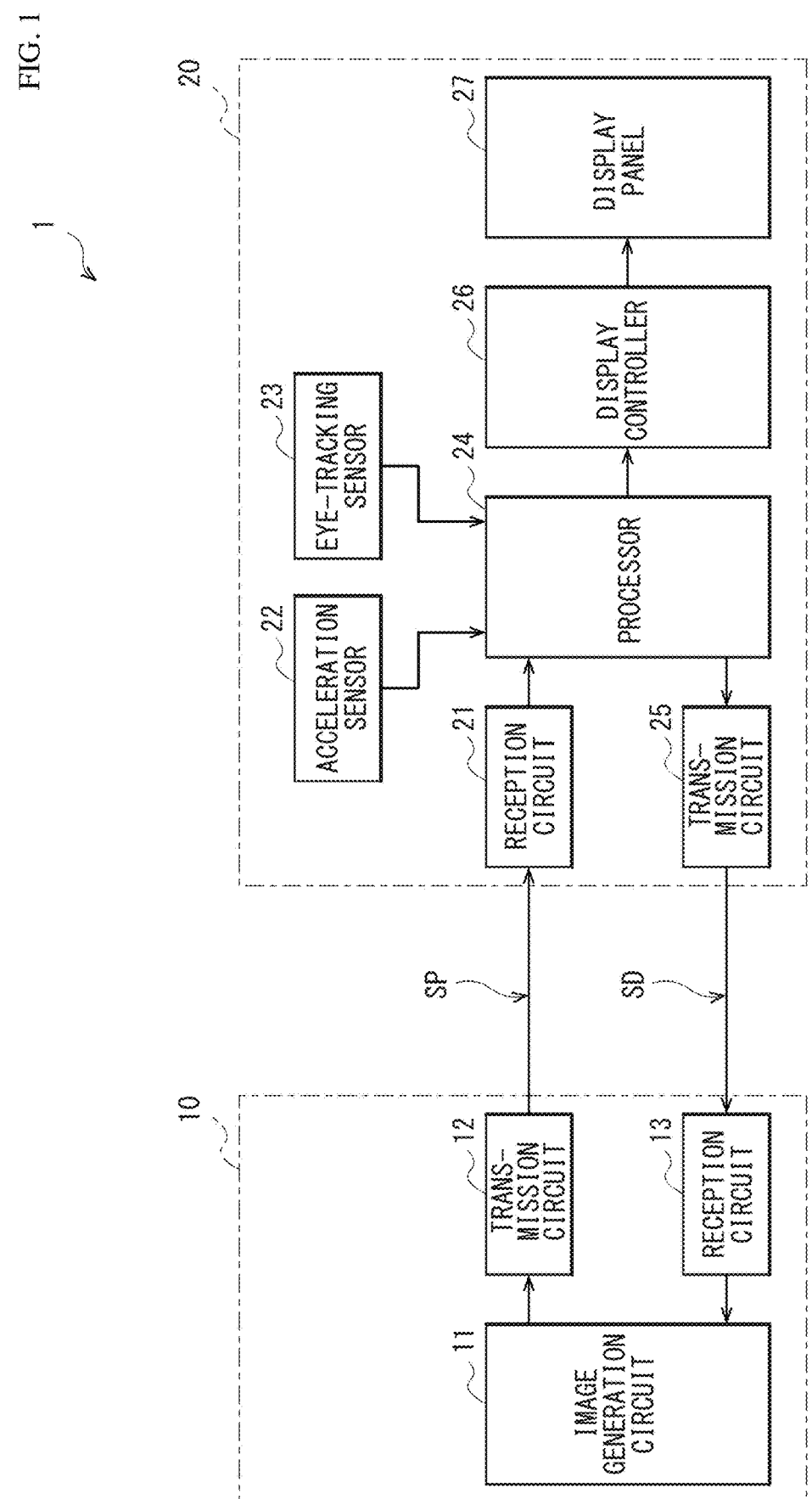
FIG. 1 is a block diagram illustrating a configuration example of a display system according to an embodiment of the present disclosure.

FIG. 1 illustrates a configuration example of a display system (display system 1) according to an embodiment. It is to be noted that a display device and a display driving method according to embodiments of the present disclosure are embodied by the present embodiment, and are therefore described together.

The display system 1 includes an image generation device 10 and a head-mounted display 20. The display system 1 is used for augmented reality (AR) or virtual reality (VR). The display system 1 is configured to perform foveated rendering (Foveated Rendering) in which, in generating an image, a region being gazed at is rendered with a high resolution and another region is rendered with a low resolution. The display system 1 performs communication between the image generation device 10 and the head-mounted display 20 with use of an interface such as HDMI (registered trademark) (High-Definition Multimedia Interface) or MIPI (registered trademark) (Mobile Industry Processor Interface) in this example. It is to be noted that, in this example, this communication is performed by wired communication; however, this communication is not limited thereto, and may be performed by wireless communication.

In the display system 1, the head-mounted display 20 displays an image on the basis of an image signal SP transmitted from the image generation device 10. An acceleration sensor 22 (to be described later) of the head-mounted display 20 detects a motion such as a direction of the head-mounted display 20. In addition, an eye-tracking sensor 23 (to be described later) of the head-mounted display 20 detects the direction of an eye of a user wearing the head-mounted display 20 to thereby detect which portion of a display image the user is looking at. The head-mounted display 20 supplies a detection signal SD including results of such detection to the image generation device 10. The image generation device 10 generates an image (entire image P1) corresponding to the direction of the head-mounted display 20 on the basis of the result of detection by the acceleration sensor 22. In addition, the image generation device 10 generates an image (partial image P2) including a portion at which the user is looking of the entire image P1 on the basis of the result of detection by the eye-tracking sensor 23. A resolution of the partial image P2 in a case where the partial image P2 is displayed on the head-mounted display 20 is higher than a resolution of the entire image P1. Furthermore, the image generation device 10 transmits the image signal SP including a piece of image data DT1 representing the entire image P1 and a piece of image data DT2 representing the partial image P2 to the head-mounted display 20.

The image generation device 10 is configured to generate an image to be displayed on the head-mounted display 20. The image generation device 10 includes an image generation circuit 11, a transmission circuit 12, and a reception circuit 13.

The image generation circuit 11 is configured to generate an image to be displayed on the head-mounted display 20, for example, by performing predetermined processing such as rendering processing. The image generation circuit 11 generates the entire image P1 representing a scenery corresponding to the direction of the head-mounted display 20 in a virtual space on the basis of the result of detection by the acceleration sensor 22 included in a piece of data supplied from the reception circuit 13. In addition, the image generation circuit 11 generates the partial image P2 representing a portion at which the user is looking by the user of the scenery corresponding to the direction of the head-mounted display 20 in the virtual space on the basis of the result of detection by the eye-tracking sensor 23 included in the piece of data supplied from the reception circuit 13.

FIG. 2 illustrates an example of a display image P20 to be displayed on the head-mounted display 20. The display image P20 includes an image of a person 9. In this example, the user wearing the head-mounted display 20 is looking at the image of the person 9. The eye-tracking sensor 23 of the head-mounted display 20 detects the direction of the eye of the user to thereby detect which portion of the display image P20 the user is looking at. The image generation circuit 11 determines a partial region R2 including the portion at which the user is looking of an entire region R1 of the display image P20 on the basis of the result of detection by the eye-tracking sensor 23 included in the piece of data supplied from the reception circuit 13. In this example, a size in a horizontal direction (a lateral direction in FIG. 2) of the partial region R2 is a half of a size in the horizontal direction of the entire region R1, and a size in a vertical direction (a longitudinal direction in FIG. 2) of the partial region R2 is a half of a size in the vertical direction of the entire region R1. In other words, an area of the partial region R2 is ¼ of an area of the entire region R1. The image generation circuit 11 then generates the entire image P1 related to the entire region R1, and generates the partial image P2 related to the partial region R2.

FIG. 3 illustrates an example of the entire image P1 and the partial image P2 generated by the image generation circuit 11. In FIG. 3, a square indicates a pixel in a piece of image data. The entire image P1 is an image having a low resolution of the entire region R1 (FIG. 2). The partial image P2 is an image having a high resolution into which an image of the partial region R2 in the entire image P1 is converted. In this example, each pixel in the entire image P1 corresponds to four pixels PIX (to be described later) in the head-mounted display 20, and each pixel in the partial image P2 corresponds to one pixel PIX in the head-mounted display 20. In this example, the number of pixels in the entire image P1 and the number of pixels in the partial image P2 are equal to each other. Each of the entire image P1 and the partial image P2 is also referred to as a sub-frame image.

FIG. 4A schematically illustrates a piece of image data in a case where only an entire image is displayed without performing foveated rendering. This piece of image data indicates a piece of image data of an entire image having a high resolution usable in a case where each of a plurality of pixel values is written to a corresponding one of a plurality of pixels PIX in the head-mounted display 20. FIG. 4B schematically illustrates pieces of image data of the entire image P1 and the partial image P2 according to the present technology.

As described above, each pixel in the entire image P1 corresponds to four pixels PIX; therefore, the number of pixels in the horizontal direction (horizontal pixel number) of the entire image P1 (FIG. 4B) is 50% of the horizontal pixel number of the entire image having a high resolution illustrated in FIG. 4A, and the number of pixels in the vertical direction (vertical pixel number) of the entire image P1 is 50% of the vertical pixel number of the entire image having a high resolution. In other words, a horizontal pixel number ratio of the entire image P1 is 50%, and a vertical pixel number ratio of the entire image P1 is 50%. Accordingly, an image data amount of the entire image P1 is ¼ of an image data amount of the entire image having a high resolution.

In addition, as described above, the area of the partial region R2 is ¼ of the area of the entire region R1; therefore, the number of pixels in the horizontal direction (horizontal pixel number) of the partial image P2 (FIG. 4B) is 50% of the horizontal pixel number of the entire image having a high resolution illustrated in FIG. 4A, and the number of pixels in the vertical direction (vertical pixel number) of the partial image P2 is 50% of the vertical pixel number of the entire image having a high resolution. In other words, a horizontal pixel number ratio of the partial image P2 is 50%, and a vertical pixel number ratio of the partial image P2 is 50%. Accordingly, an image data mount of the partial region R2 is ¼ of the image data mount of the entire image having a high resolution.

Thus, in this example, the horizontal pixel number ratios of the entire image P1 and the partial image P2 are equal to each other, and the vertical pixel number ratios of the entire image P1 and the partial image P2 are equal to each other. In addition, the total data amount of the entire image P1 and the partial image P2 is a half of the data amount of the entire image having a high resolution.

The image generation circuit 11 generates such an entire image P1 and such a partial image P2. The image generation circuit 11 then supplies a piece of image data of the generated entire image P1, a piece of image data of the partial image P2, and a piece of data about the position of the partial image P2 in the entire image P1 to the transmission circuit 12.

The transmission circuit 12 (FIG. 1) is configured to generate the image signal SP on the basis of pieces of data supplied from the image generation circuit 11 and transmits this image signal SP to the head-mounted display 20. Specifically, the transmission circuit 12 generates a piece of image data TD1 representing the entire image P1 on the basis of the piece of image data of the entire image P1, and generates a piece of image data DT2 representing the partial image P2 on the basis of the piece of image data of the partial image P2 and the piece of data about the position of the partial image P2. The transmission circuit 12 then transmits the image signal SP including the piece of image data DT1 and the piece of image data DT2 to the head-mounted display 20.

FIG. 5 schematically illustrates an example of the image signal SP. The transmission circuit 12 transmits the piece of image data DT1 and the piece of image data DT2 in a time division manner. Specifically, the transmission circuit 12 alternately transmits the piece of image data DT1 representing the entire image P1 and the piece of image data DT2 representing the partial image P2.

The reception circuit 13 (FIG. 1) is configured to receive the detection signal SD transmitted from the head-mounted display 20. The reception circuit 13 then supplies, to the image generation circuit 11, a piece of data about the result of detection by the acceleration sensor 22 and the result of detection by the eye-tracking sensor 23. The piece of data is included in this detection signal SD.

The head-mounted display 20 includes a reception circuit 21, the acceleration sensor 22, the eye-tracking sensor 23, a processor 24, a transmission circuit 25, a display controller 26, and a display panel 27.

The reception circuit 21 is configured to receive the image signal SP transmitted from the image generation device 10. The reception circuit 21 then supplies, to the processor 24, the piece of image data DT1 representing the entire image P1 and the piece of image data DT2 representing the partial image P2 included in this image signal SP.

The acceleration sensor 22 is configured to detect a motion such as the direction of the head-mounted display 20. It is possible for the acceleration sensor 22 to use, for example, a 6-axis inertial sensor. Accordingly, in the display system 1, it is possible to generate the entire image P1 corresponding to the direction of the head-mounted display 20 in the virtual space.

The eye-tracking sensor 23 is configured to detect the direction of the eye of the user wearing the head-mounted display 20. Accordingly, in the display system 1, it is possible to detect which portion of the display image the user is looking at, and it is possible to generate the partial image P2 having a high resolution. The partial image P2 includes the portion at which the user is looking.

The processor 24 is configured to control an operation of the head-mounted display 20, and includes, for example, a CPU (Central Processing Unit), a GPU (Graphics Processing Unit), and the like. Specifically, the processor 24 performs, for example, predetermined image processing on the basis of the pieces of image data DT1 and DT2 supplied from the reception circuit 21, and supplies, to the display controller 26, the piece of image data of the entire image P1 included in the piece of image data DT1, the piece of image data of the partial image P2 included in the piece of image data DT2, and the piece of data about the position of the partial image P2 included in the piece of image data DT2. In addition, the processor 24 supplies the result of detection by the acceleration sensor 22 and the result of detection by the eye-tracking sensor 23 to the transmission circuit 25, and causes the transmission circuit 25 to transmit these results of detection.

The transmission circuit 25 is configured to transmit, to the image generation device 10, the detection signal SD including the result of detection by the acceleration sensor 22 and the result of detection by the eye-tracking sensor 23 that are supplied from the processor 24.

The display controller 26 is configured to control an operation of the display panel 27 on the basis of the piece of image data of the entire image P1, the piece of image data of the partial image P2, and the piece of data about the position of the partial image P2 that are supplied from the processor 24.

The display panel 27 is configured to display an image on the basis of control by the display controller 26. The display panel 27 is an organic EL (Electro Luminescence) display panel in this example. It is to be noted that the display panel 27 is not limited thereto, and may be, for example, a liquid crystal display panel.

FIG. 6 illustrates a configuration example of the display panel 27. The display panel 27 includes a pixel array 31, a pixel signal generation circuit 32, and a scanning circuit 33.

The pixel array 31 includes a plurality of signal lines SGL, a plurality of control lines CTL, and a plurality of pixels PIX.

The plurality of signal lines SGL extends in the vertical direction (the longitudinal direction in FIG. 6) and is provided side by side in the horizontal direction (the lateral direction in FIG. 6). The plurality of signal lines SGL each supplies a pixel signal generated by the pixel signal generation circuit 32 to the pixels PIX.

The plurality of control lines CTL extends in the horizontal direction (the lateral direction in FIG. 6), and is provided side by side in the vertical direction (the longitudinal direction in FIG. 6). The plurality of control lines CTL each supplies a control signal generated by the scanning circuit 33 to the pixels PIX.

The plurality of pixels PIX is arranged in a matrix in the pixel array 31. Each of the plurality of pixels PIX is controlled on the basis of the control signal supplied through the control line CTL, and the pixel signal supplied through the signal line SGL is written to each of the plurality of the pixels PIX. Accordingly, each of the plurality of pixels PIX is configured to emit light with luminance corresponding to the written pixel signal. Th pixels PIX for one row provided side by side in the horizontal direction configure a pixel line L.

The pixel signal generation circuit 32 is configured to generate the pixel signal on the basis of a piece of image data to be displayed, and apply the generated pixel signal to each of the plurality of signal lines SGL.

The scanning circuit 33 is configured to scan the plurality of pixels PIX in units of one or a plurality of pixel lines L as scanning units by generating the control signal and applying the generated control signal to each of the plurality of control lines CTL.

Herein, the reception circuit 21 corresponds to a specific example of a "reception circuit" in the present disclosure. The entire image P1 corresponds to a specific example of an "entire image" in the present disclosure. The piece of image data DT1 corresponds to a specific example of a "piece of first image data" in the present disclosure. The partial image P2 corresponds to a specific example of a "partial image" in the present disclosure. The piece of image data DT2 corresponds to a specific example of a "piece of second image data" in the present disclosure. The pixel array 31 corresponds to a specific example of a "display section" in the present disclosure. The display controller 26, the pixel signal generation circuit 32, and the scanning circuit 33 correspond to specific examples of a "display drive circuit" in the present disclosure. The eye-tracking sensor 23 corresponds to a specific example of a "first sensor" in the present disclosure. The acceleration sensor 22 corresponds to a specific example of a "second sensor" in the present disclosure. The transmission circuit 25 corresponds to a specific example of a "transmission circuit" in the present disclosure.

[Operation and Workings]

Next, description is given of an operation and workings of the display system 1 according to the present embodiment.

(Overview of Entire Operation)

First, description is given of an overview of an entire operation of the display system 1 with reference to FIG. 1. The reception circuit 13 of the image generation device 10 receives the detection signal SD transmitted from the head-mounted display 20, and supplies, to the image generation circuit 11, the piece of data about the result of detection by the acceleration sensor 22 and the result of detection by the eye-tracking sensor 23. The piece of data is included in this detection signal SD. The image generation circuit 11 generates the entire image P1 representing the scenery corresponding to the direction of the head-mounted display 20 in the virtual space on the basis of the result of detection by the acceleration sensor 22 included in the piece of data supplied from the reception circuit 13. In addition, the image generation circuit 11 generates the partial image P2 representing a portion at which the user is looking of the scenery corresponding to the direction of the head-mounted display 20 on the basis of the result of detection by the eye-tracking sensor 23 included in the piece of data supplied from the reception circuit 13. The transmission circuit 12 generates the piece of image data DT1 representing the entire image P1 on the basis of the piece of image data of the entire image P1, and generates the piece of image data DT2 representing the partial image P2 on the basis of the piece of image data of the partial image P2 and the piece of data about the position of the partial image P2. The transmission circuit 12 then transmits the image signal SP including the piece of image data DT1 and the piece of image data DT2 to the head-mounted display 20.

The reception circuit 21 of the head-mounted display 20 receives the image signal SP transmitted from the image generation device 10, and supplies, to the processor 24, the piece of image data DT1 representing the entire image P1 and the piece of image data DT2 representing the partial image P2 that are included in the image signal SP. The processor 24 performs predetermined image processing on the basis of the pieces of image data DT1 and DT2 supplied from the reception circuit 21, and supplies, to the display controller 26, the piece of image data of the entire image P1 included in the piece of image data DT1, the piece of image data of the partial image P2 included in the piece of image data DT2, and the piece of data about the position of the partial image P2. The display controller 26 controls the operation of the display panel 27 on the basis of the piece of image data of the entire image P1, the piece of image data of the partial image P2, and the piece of data about the position of the partial image P2 that are supplied from the processor 24. The display panel 27 displays an image on the basis of control by the display controller 26.

The acceleration sensor 22 detects a motion such as the direction of the head-mounted display 20. The eye-tracking sensor 23 detects the direction of the eye of the user wearing the head-mounted display 20. The processor 24 supplies the result of detection by the acceleration sensor 22 and the result of detection by the eye-tracking sensor 23 to the transmission circuit 25. The transmission circuit 25 transmits, to the image generation device 10, the detection signal SD including the result of detection by the acceleration sensor 22 and the result of detection by the eye-tracking sensor 23 that are supplied from the processor 24.

(Detailed Operation)

The head-mounted display 20 generates the display image P20 on the basis of the piece of image data DT1 and the piece of image data DT2 supplied in a time division manner.

Figure 7:
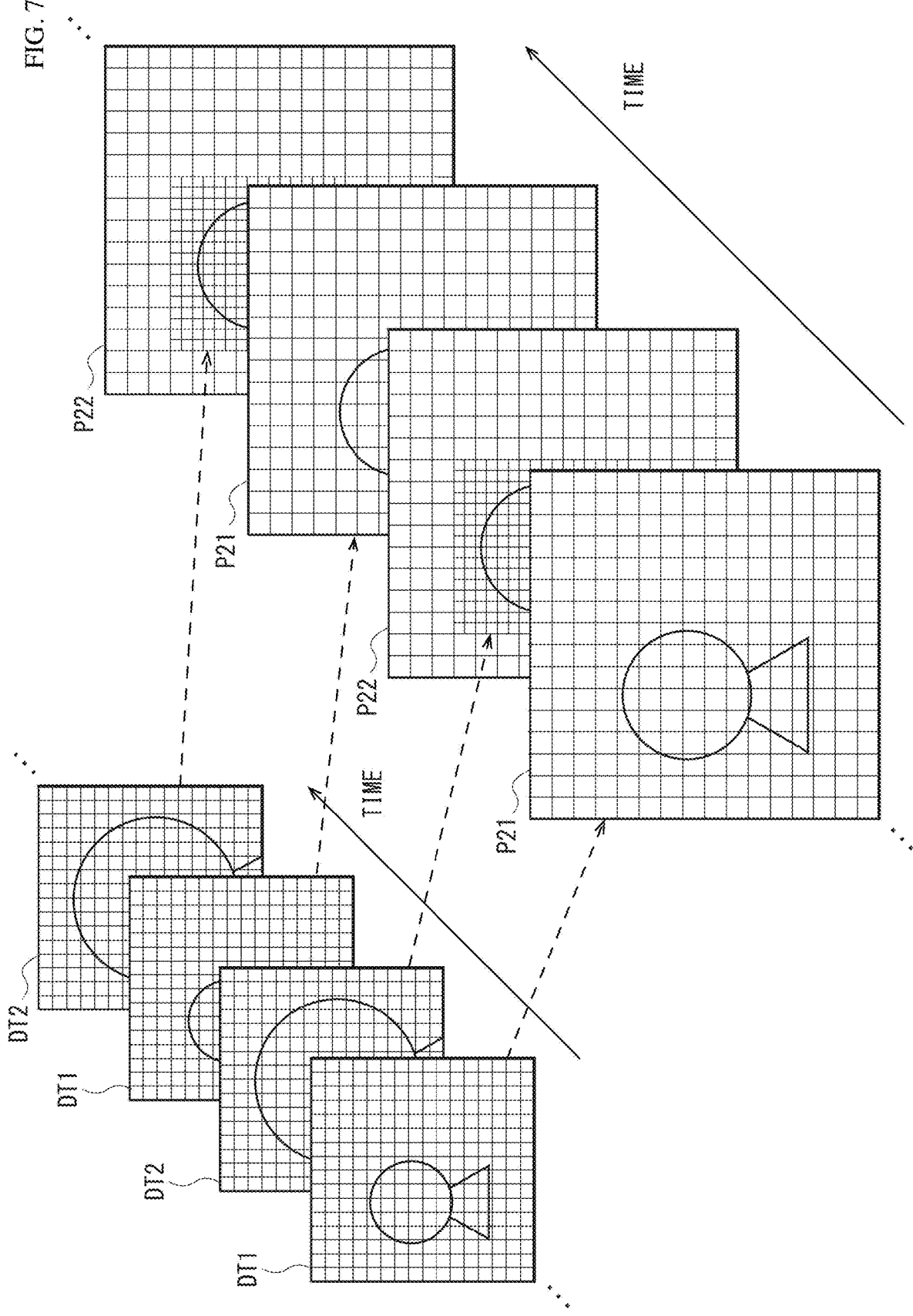
FIG. 7 is an explanatory diagram illustrating an example of a display operation in the display system illustrated in FIG. 1.

FIG. 7 illustrates an example of a display operation in the head-mounted display 20. The head-mounted display 20 alternately receives the piece of image data DT1 representing the entire image P1 and the piece of image data DT2 representing the partial image P2.

In a case where the head-mounted display 20 receives the piece of image data DT1, the display controller 26 performs control to drive the plurality of pixels PIX in the display panel 27 in units of four pixels PIX on the basis of the piece of image data of the entire image P1 included in the piece of image data DT1. Thus, the display panel 27 displays a display image P21 including the entire image P2 having a low resolution.

In a case where the head-mounted display 20 receives the piece of image data DT2, the display controller 26 performs control to drive a plurality of pixels PIX disposed in a region corresponding to the partial image P2 of the plurality of pixels PIX in the display panel 27 in units of one pixel PIX on the basis of the piece of image data of the partial image P2 included in the piece of image data DT2 and the piece of data about the position of the partial image P2. On this occasion, a plurality of pixels PIX in a region other than the region corresponding to the partial image P2 of the plurality of pixels PIX in the display panel 27 maintains display. Thus, the display panel 27 displays a display image P22 including the partial image P2 having a high resolution.

The head-mounted display 20 repeats such an operation in a case of receiving the piece of image data DT1 and such an operation in a case of receiving the piece of image data DT2.

Figure 8:
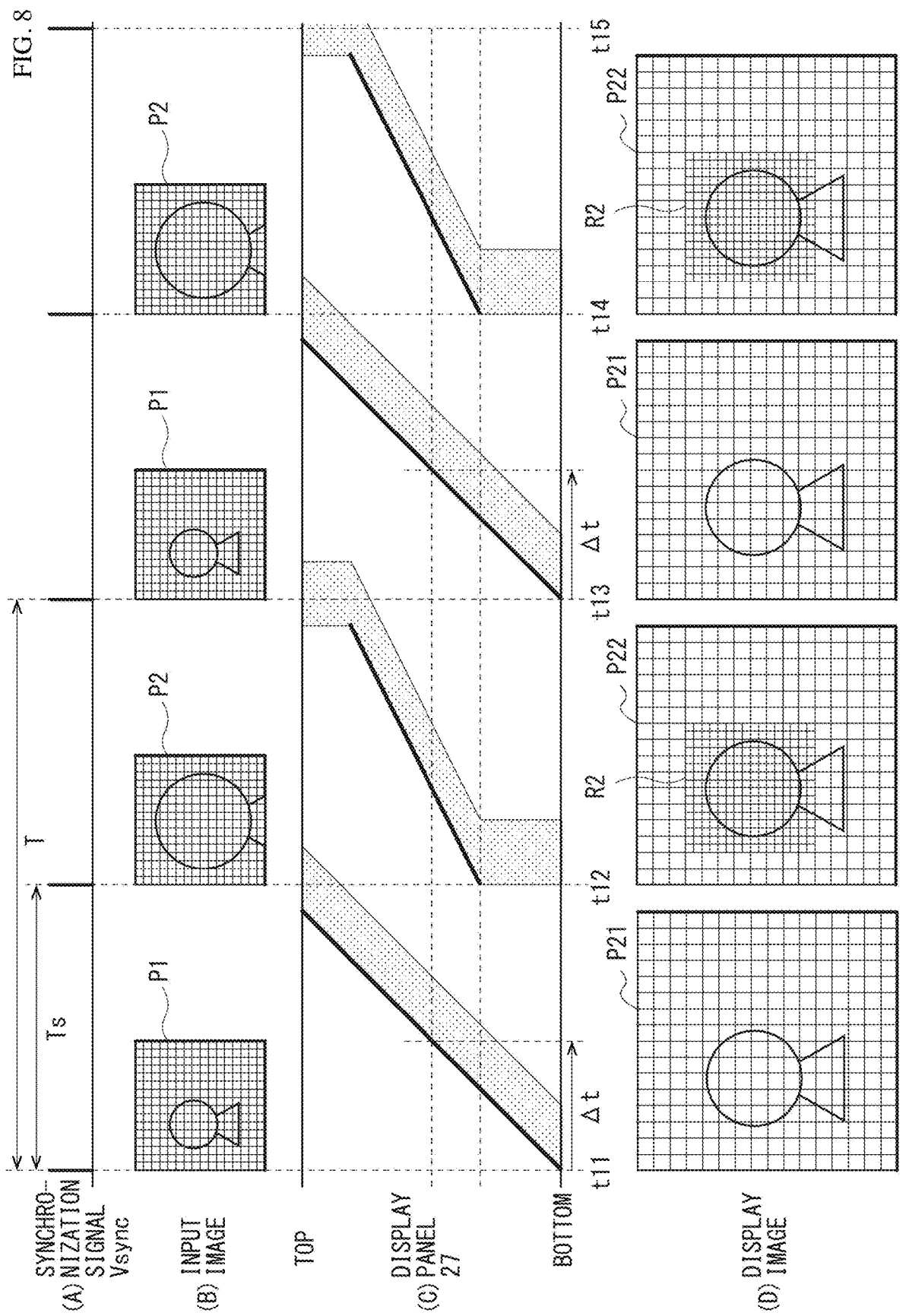
FIG. 8 is an explanatory diagram illustrating an example of a display operation in the head-mounted display illustrated in FIG. 1.

FIG. 8 illustrates an example of a more specific display operation in the head-mounted display 20, where (A) indicates a waveform of a synchronization signal Vsync, (B) indicates an input image, (C) indicates an operation of the display panel 27, and (D) indicates a display image to be displayed on the display panel 27.

A pair of the entire image P1 and the partial image P2 is supplied in a cycle T. In this example, the cycle Tis, for example, 8.3 [msec.] (=1/120 [Hz]). Each of the entire image P1 and the partial image P2 is supplied in a cycle Ts. The cycle Ts is, for example, 4.2 [msec.] (=1/240 [Hz]).

At a timing t11, a pulse of the synchronization signal Vsync is generated ((A) of FIG. 8). In a period from the timing t11 to a timing t12, the reception circuit 21 of the head-mounted display 20 receives the piece of image data DT1 representing the entire image P1 ((B) of FIG. 8). The input image is the entire image P1; therefore, the display controller 26 performs control to drive the plurality of pixels PIX in the display panel 27 in units of four pixels PIX on the basis of the piece of image data of the entire image P1.

FIG. 9 illustrates an operation of driving the pixels PIX. In the display panel 27, the scanning circuit 33 scans the plurality of pixels PIX in scanning units US of two pixel lines L. In addition, the pixel signal generation circuit 32 applies the same pixel signal to two signal lines SGL adjacent to each other. Accordingly, the same pixel signal is written to four pixels PIX in selected two pixel lines L. Thus, the display panel 27 drives the plurality of pixels PIX in units UD of four pixels PIX.

As indicated by a thick line in (C) of FIG. 8, the scanning circuit 33 sequentially performs scanning in scanning units of two pixel lines L from a bottom to a top of the pixel array 31 in this example. This makes it possible to reduce an operation frequency to a half of an operation frequency in a case of sequentially performing scanning in units of one pixel line L, and to reduce power consumption. Then, as indicated by a shaded portion in (C) of FIG. 8, the pixels PIX to which the pixel signal has been written emit light over a predetermined period after the pixel signal is written in this example. Thus, the display panel 27 displays the display image P21 ((D) of FIG. 8).

Next, at the timing t12, a pulse of the synchronization signal Vsync is generated ((A) of FIG. 8). In a period from the timing t12 to a timing t13, the reception circuit 21 of the head-mounted display 20 receives the piece of image data DT2 representing the partial image P2 ((B) of FIG. 8). The input image is the partial image P2; therefore, the display controller 26 performs control to drive a plurality of pixels PIX disposed in a region corresponding to the partial image P2 of the plurality of pixels PIX in the display panel 27 in units of one pixel PIX on the basis of the piece of image data of the partial image P2 and the piece of data about the position of the partial image P2.

FIG. 10 illustrates an operation of driving the pixels PIX. In the display panel 27, the scanning circuit 33 scans the plurality of pixels PIX in scanning units US of one pixel line L. In addition, the pixel signal generation circuit 32 applies each of a plurality of pixel signals to a corresponding one of a plurality of signal lines SGL related to the region corresponding to the partial image P2 of the plurality of signal lines SGL. Thus, each of the plurality of pixel signals is written to a corresponding one of a plurality of pixels PIX related to the region corresponding to the partial image P2 in selected one pixel line L. Meanwhile, a pixel signal is not written to a plurality of pixels PIX related to a region other than the region corresponding to the partial image P2. Thus, the display panel 27 drives the plurality of pixels PIX in units UD of one pixel PIX.

As indicated by a thick line in (C) of FIG. 8, the scanning circuit 33 sequentially performs scanning in the region corresponding to the partial image P2 in the pixel array 31 in scanning units US of one pixel line L. Unlike the period from the timing t11 to the timing t12, in this period, scanning is sequentially performed in scanning units US of one pixel line L; therefore, scanning speed is a half of scanning speed in the period from the timing t11 to the timing t12. This makes it possible, for example, to reduce an operation frequency to a half of an operation frequency in a case of sequentially performing scanning from the bottom to the top of the pixel array 31, and to reduce power consumption. Then, as indicated by a shaded portion in (C) of FIG. 8, the pixels PIX in the pixel line L containing the pixel PIX to which the pixel signal is written emit light over a predetermined period after the pixel signal is written in this example. In addition, the pixels PIX in the pixel line L near the bottom to which the pixel signal is not written emit light in the same period as a period in which the pixel PIX to which the pixel signal is first written emits light, and the pixels PIX in the pixel line L near the top to which the pixel signal is not written emit light in the same period as a period in which the pixel PIX to which the pixel signal is last written emits light. Thus, the display panel 27 displays the display image P22 ((D) of FIG. 8). In the display image P22, an image in a region other than the partial region R2 is written from the timing t11 to the timing t12, and an image in the partial region R2 is written in the period from the timing t12 to the timing t13.

Thus, in a period from the timing t11 to the timing t13, the head-mounted display 20 displays an image on the basis of the pair of the entire image P1 and the partial image P2 included in the piece of image data DT1 and the piece of image data DT2. The head-mounted display 20 first displays the display image P21 on the basis of the entire image P1, and displays the display image P22 on the basis of the partial image P2 by redisplaying an image in the region corresponding to the partial image P2 in the display image P21. The user grasps the entirety of the image by observing the display image P21, and grasps details of the image in the partial region by observing the display image P22. In terms of a latency, a timing of grasping the entirety of the image by the user is important. In this case, a latency of the head-mounted display 20 is, for example, time Δt from the timing t11 at which inputting of the piece of image data DT1 starts until the pixel PIX at a middle position in an up/down direction of the display panel 27 starts emitting light. This
time Δt in this example is about a half of time corresponding
to the cycle Ts. Specifically, for example, in a case where the
cycle Ts is 4.2 [msec.] (=1/240 [Hz]), it is possible to set the
time Δt to about 2 [msec.].

The display system 1 repeats the operation from the
timing tt to the timing t13 even after this. For example, in a
period from the timing t13 to a timing t14, the reception
circuit 21 of the head-mounted display 20 receives the piece
of image data DT1 representing the entire image P1 ((B) of
FIG. 8). The head-mounted display 20 displays the display
image P21 on the basis of the piece of image data DT1 in a
similar manner to the operation in the period from the timing
t11 to the timing t12 ((C) and (D) of FIG. 8). In addition, in
a period from the timing t14 to a timing t15, the reception
circuit 21 of the head-mounted display 20 receives the piece
of image data DT2 representing the partial image P2 ((B) of
FIG. 8). The head-mounted display 20 displays the display
image P22 on the basis of the piece of image data DT2 in a
similar manner to the operation in the period from the timing
t12 to the timing t13 ((C) and (D) of FIG. 8).

FIG. 11 illustrates an example of another display opera-
tion in the head-mounted display 20. In this example, a light
emission operation indicated by a shaded portion in (C) of
FIG. 11 is different from the example in FIG. 8. In other
words, in the example in FIG. 8, the display panel 27 emits
light in accordance with a line-sequential scanning timing;
however, in this example, the pixels PIX in an entire region
emit light at the same timing.

For example, in a period from a timing t21 to a timing t22,
the reception circuit 21 of the head-mounted display 20
receives the piece of image data DT1 representing the entire
image P1 ((B) of FIG. 11). The input image is the entire
image P1; therefore, the display controller 26 performs
control to drive the plurality of pixels PIX in the display
panel 27 in units of four pixels PIX on the basis of the piece
of image data of the entire image P1.

The scanning circuit 33 sequentially performs scanning in
scanning units US of two pixel lines L from the bottom to
the top of the pixel array 31 in this example ((C) of FIG. 11).
Then, as indicated by a shaded portion in (C) of FIG. 11, at
a timing at which the pixel signals are written to all the
pixels PIX in the display panel 27, the plurality of pixels PIX
emits light at the same timing over a predetermined period.
Thus, the display panel 27 displays the display image P21
((D) of FIG. 11).

For example, in a period from the timing t22 to a timing
t23, the reception circuit 21 of the head-mounted display 20
receives the piece of image data DT2 representing the partial
image P2 ((B) of FIG. 11). The input image is the partial
image P2; therefore, the display controller 26 performs
control to drive a plurality of pixels PIX disposed in the
region corresponding to the partial image P2 of the plurality
of pixels PIX in the display panel 27 in units of one pixel
PIX on the basis of the piece of image data of the partial
image P2 and the piece of data about the position of the
partial image P2.

The scanning circuit 33 sequentially scans a plurality of
pixels PIX related to the region corresponding to the partial
image P2 of the plurality of pixels PIX in scanning units US
of one pixel line L ((C) of FIG. 11). Then, as indicated by
a shaded portion in (C) of FIG. 11, from the timing at which
the pixel signals are written to all the pixels PIX in the
display panel 27 onward, the plurality of pixels PIX emits
light at the same timing over a predetermined period. Thus,
the display panel 27 displays the display image P22 ((D) of
FIG. 11).

Thus, in a period from the timing t21 to the timing t23, the
head-mounted display 20 displays an image on the basis of
the pair of the entire image P1 and the partial image P2
included in the piece of image data DT1 and the piece of
image data DT2. In this case, the latency of the head-
mounted display 20 is, for example, time Δt from the timing
t11 at which inputting of the piece of image data DT1 starts
until a half of the display panel 27 is scanned. This time Δt
in this example is about the same as the time corresponding
to the cycle Ts. Specifically, for example, in a case where the
cycle Ts is 4.2 [msec.] (=1/240 [Hz]), it is possible to set the
time Δt to about 4 [msec.].

As described above, the display system 1 receives a piece
of first image data (image data DT1) representing the entire
image P1 having a low resolution, and a piece of second
image data (image data DT2) representing the partial image
P2 having a high resolution that corresponds to a portion of
the entire image P1. First driving and second driving are
then performed. In the first driving, the plurality of pixels
PIX is driven in units of four pixels PIX on the basis of the
piece of first image data (image data DT1). In the second
driving, two or more pixels provided in the region corre-
sponding to the partial image P2 of the plurality of pixels
PIX are driven in units of one pixel PIX on the basis of the
piece of second image data (image data DT2). Accordingly,
it is possible for the display system 1 to first display the
display image P21 on the basis of the entire image P1, and
to display the display image P22 on the basis of the partial
image P2 by redisplaying an image in the region correspond-
ing to the partial image P2 of the display image P21. The
user grasps the entirety of the image by observing the
display image P21, and grasps details of the image in the
partial region P2 by observing the display image P22. This
makes it possible, for example, to shorten the time Δt from
a timing at which inputting of the piece of image data DT1
starts until the pixel PIX at a middle position in the up/down
direction of the display panel 27 starts emitting light, which
makes it possible to shorten the latency. As a result, it is
possible to enhance image quality in the display system 1.

In addition, the display system 1 performs the second
driving in which two or more pixels provided in the region
corresponding to the partial image P2 of the plurality of
pixels PIX are driven in units of one pixel PIX on the basis
of the piece of second image data (image data DT2). This
makes it possible to display a portion at which the user is
looking with a high resolution in the display system 1, which
makes it possible to enhance image quality.

In addition, the display system 1 receives the piece of first
image data (image data DT1) representing the entire image
P1 having a low resolution and the piece of second image
data (image data DT2) representing the partial image P2
having a high resolution that corresponds to a portion of the
entire image P1. Accordingly, in the display system 1, as
illustrated in FIG. 4B, it is possible to make the image data
amount of the piece of image data DT1 and the image data
amount of the piece of image data DT2 smaller than the
image data amount of the entire image having a high
resolution. In the display system 1, this makes it possible to
reduce a transmission band in signal transmission of the
image signal SP from the image generation device 10 to the
head-mounted display 20.

In addition, in the display system 1, it is possible to reduce
the transmission band in such a manner, which makes it
possible to transmit the piece of image data DT1 and the
piece of image data DT2 in a short time. As a result, in the
display system 1, it is possible to increase a frame rate,
which makes it possible to enhance image quality.

In addition, the display system 1 performs the first driving in which the plurality of pixels PIX is driven in units of four pixels PIX on the basis of the piece of first image data (image data DT1), and the second driving in which two or more pixels provided in the region corresponding to the partial image P2 of the plurality of pixels PIX are driven in units of one pixel PIX on the basis of the piece of second image data (image data DT2). Accordingly, unlike in a case where the entire image P1 and the partial image P2 are combined in advance and a combined image is displayed, a frame memory is not necessarily provided in the display system 1. In a case where the frame memory is not provided in such a manner, for example, it is possible to simplify a circuit configuration, and, for example, it is possible to reduce cost.

Effects

As described above, in the present embodiment, a piece of first image data representing an entire image having a low resolution, and a piece of second image data representing a partial image having a high resolution that corresponds to a portion of the entire image are received. Then, first driving and second driving are performed. In the first driving, a plurality of pixels is driven in units of four pixels on the basis of the piece of first image data. In the second driving, two or more pixels provided in a region corresponding to the partial image of the plurality of pixels are driven in units of one pixel on the basis of the piece of second image data. This makes it possible to enhance image quality.

In the present embodiment, the second driving is performed in which two or more pixels provided in the region corresponding to the partial image of the plurality of pixels are driven in units of one pixel on the basis of the piece of second image data, which makes it possible to enhance image quality.

In the present embodiment, the piece of first image data representing the entire image having a low resolution, and the piece of second image data representing the partial image having a high resolution that corresponds to a portion of the entire image are received, which makes it possible to enhance image quality.

Modification Example 1

In the present embodiment, the image generation circuit 11 generates the partial image P2 on the basis of the result of detection by the eye-tracking sensor 23, but this is not limitative. The present modification example is described in detail below.

Figure 12:
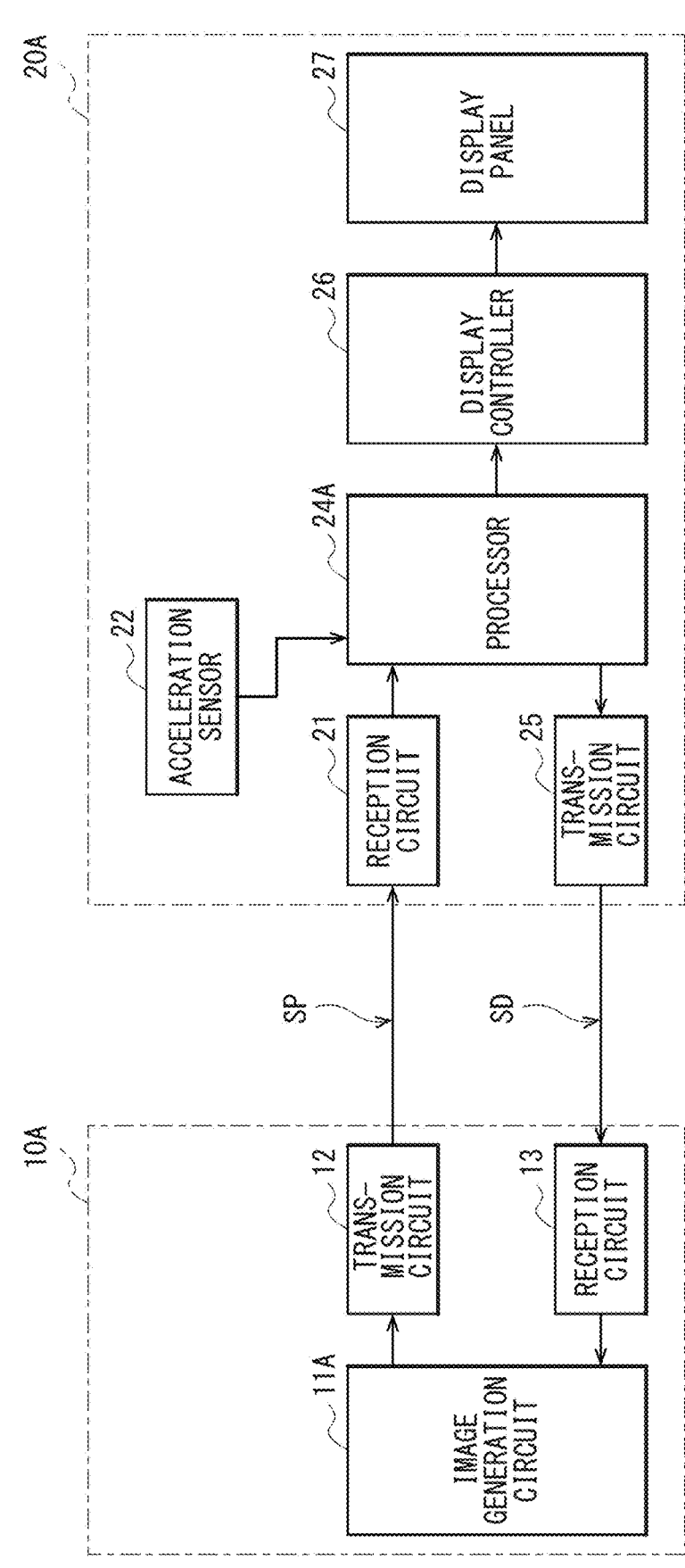
FIG. 12 is a block diagram illustrating an example of a configuration example of a display system according to a modification example.

FIG. 12 illustrates a configuration example of a display system 1A. The display system 1A includes an image generation device 10A and a head-mounted display 20A.

The image generation device 10A includes an image generation circuit 11A. The image generation circuit 11A generates the entire image P1 representing a scenery corresponding to the direction of the head-mounted display 20 in a virtual space on the basis of a result of detection by the acceleration sensor 22 included in a piece of data supplied from the reception circuit 13. In addition, the image generation circuit 11A generates the partial image P2 including a portion where an image changes in the entire image P1.

Figure 13:
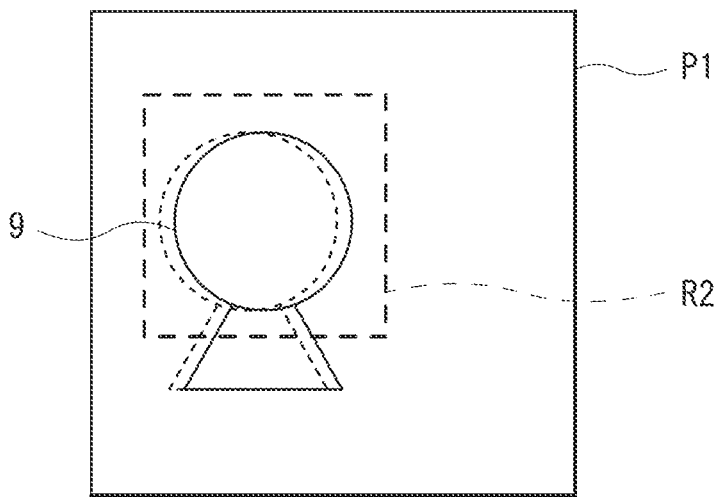
FIG. 13 is an explanatory diagram illustrating an example of a display image of a head-mounted display illustrated in FIG. 12.

FIG. 13 illustrates an example of the entire image P1. In this example, an image of the person 9 is moving in the entire image P1. The image generation circuit 11A determines the partial region R2 including a changing image on the basis of the entire image P1. The image generation circuit 11A then generates the partial image P2 related to the partial region R2. In other words, there is a high possibility that the user looks at a changing portion of the display image; therefore, the image generation circuit 11A generates the partial image P2 about the changing portion. The image generation circuit 11A then supplies a piece of image data of the generated entire image P1, a piece of image data of the partial image P2, and a piece of data about the position of the partial image P2 in the entire image P1 to the transmission circuit 12.

The head-mounted display 20A (FIG. 12) includes the reception circuit 21, the acceleration sensor 22, a processor 24A, the transmission circuit 25, the display controller 26, and the display panel 27. In other words, in the head-mounted display 20A according to the present modification example, the eye-tracking sensor 23 is omitted, and the processor 24 is changed to the processor 24A. The processor 24A performs, for example, predetermined image processing on the basis of the pieces of image data DT1 and DT2 supplied from the reception circuit 21, and supplies, to the display controller 26, the piece of image data of the entire image P1 included in the piece of image data DT1, the piece of image data of the partial image P2 included in the piece of image data DT2, and the piece of data about the position of the partial image P2 included in the piece of image data DT2. In addition, the processor 24A supplies the result of detection by the acceleration sensor 22 to the transmission circuit 25, and causes the transmission circuit 25 to transmit these results of detection.

Modification Example 2

Figure 14:
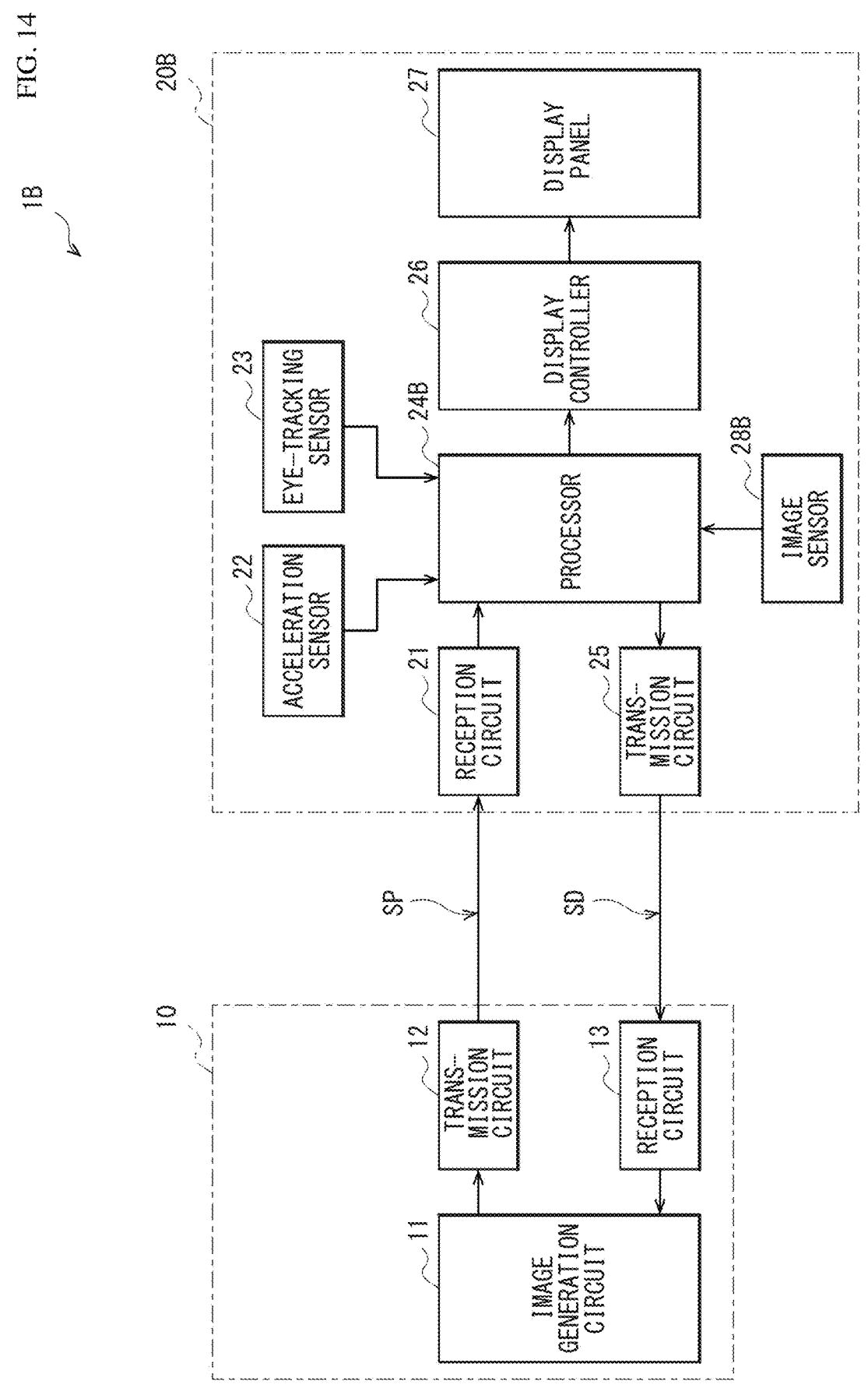
FIG. 14 is a block diagram illustrating a configuration example of a display system according to another modification example.

In the embodiment described above, the image generated by the image generation circuit 11 is displayed, but this is not limitative. For example, like a display system 1B illustrated in FIG. 14, so-called video see-through may be implemented by also displaying an image captured by an image sensor 28B. The display system 1B includes a head-mounted display 20B. The head-mounted display 20B includes the image sensor 28B and a processor 24B.

The image sensor 28B is configured to capture, for example, an image of a front side of the user wearing the head-mounted display 20B. The processor 24B performs predetermined image processing on the basis of the pieces of image data DT1 and DT2 supplied from the reception circuit 21 and the captured image generated by the image sensor 28B, and supplies, to the display controller 26, a piece of image data of an entire image, a piece of image data of a partial image, and a piece of data about the position of the partial image.

Modification Example 3

In the embodiment described above, in a case where the entire image P1 is displayed, the plurality of pixels PIX in the display panel 27 is driven in units of four pixels PIX, but this is not limitative. Instead of this, for example, as illustrated in FIGS. 15 and 16, it is possible to drive the plurality of pixels PIX in units of any of various numbers of pixels PIX. For example, the pixels PIX may be driven in units of two (2×1) pixels PIX provided side by side in the horizontal direction, may be driven in units of eight (4×2) pixels including four pixels PIX in the horizontal direction and two pixels PIX in the vertical direction, or may be driven in units of 32 (8×4) pixels PIX including eight pixels PIX in the horizontal direction and four pixels in the vertical direction. Alternatively, for example, the pixels PIX may be driven in units of two (1×2) pixels PIX provided side by side in the vertical direction, may be driven in units of eight (2×4) pixels PIX including two pixels in the horizontal direction and four pixels PIX in the vertical direction, or may be driven in units of 32 (4×8) pixels including four pixels PIX in the horizontal direction and eight pixels PIX in the vertical direction. Alternatively, for example, the pixels PIX may be driven in units of four (2×2) pixels PIX including two pixels PIX in the horizontal direction and two pixels PIX in the vertical direction, may be driven in units of sixteen (4×4) pixels PIX including four pixels PIX in the horizontal direction and four pixels PIX in the vertical direction, or may be driven in units of 64 (8×8) pixels PIX in eight pixels PIX in the horizontal direction and eight pixels PIX in the vertical direction. It is to be noted that, in this example, the pixels PIX are driven in units of an even number of pixels PIX, but this is not limitative. For example, the pixels PIX may be driven in units of an odd number of pixels PIX.

Driving the pixels PIX in units of a plurality of pixels PIX in such a manner makes it possible to reduce a transmission band. In other words, assuming that a band usage rate in a case where the pixels PIX are driven in units of one pixel PIX is 100%, for example, in a case where the pixels PIX are driven in units of four (2×2) pixels PIX as with the embodiment described above, the number of pixels in the entire image P1 becomes ¼, which causes the band usage rate to become 25%. In addition, for example, in a case where the pixels PIX are driven in units of 16 (4×4) pixels PIX, the number of pixels in the entire image P1 becomes ¹⁄₁₆, which causes the band usage rate to become 6.25%.

The user grasps the entirety of the image by observing the display image P21, and grasps details of the image in the partial region R2 being gazed at by observing the display image P22. The user is not gazing at the entire image P1 in such a manner; therefore, even if the pixels PIX are driven in units of a plurality of pixels PIX, it is difficult to perceive a decrease in image quality. Accordingly, in the display system according to the present modification example, for example, appropriately setting the number of pixels PIX as a drive unit makes it possible to reduce the transmission band while suppressing a decrease in image quality.

Modification Example 4

In the embodiment described above, as illustrated in FIG. 4B, the horizontal pixel number ratio of the partial image P2 is 50%, and the vertical pixel number ratio of the partial image P2 is 50%, but this is not limitative. Instead of this, it is possible to set the horizontal pixel number ratio and the vertical pixel number ratio of the partial image P2 to any of various values.

For example, as illustrated in FIGS. 17 and 18, the horizontal pixel number ratio of the partial image P2 may be larger than the vertical pixel number ratio in consideration of a human's visual field being wide in the lateral direction.

Figure 21:
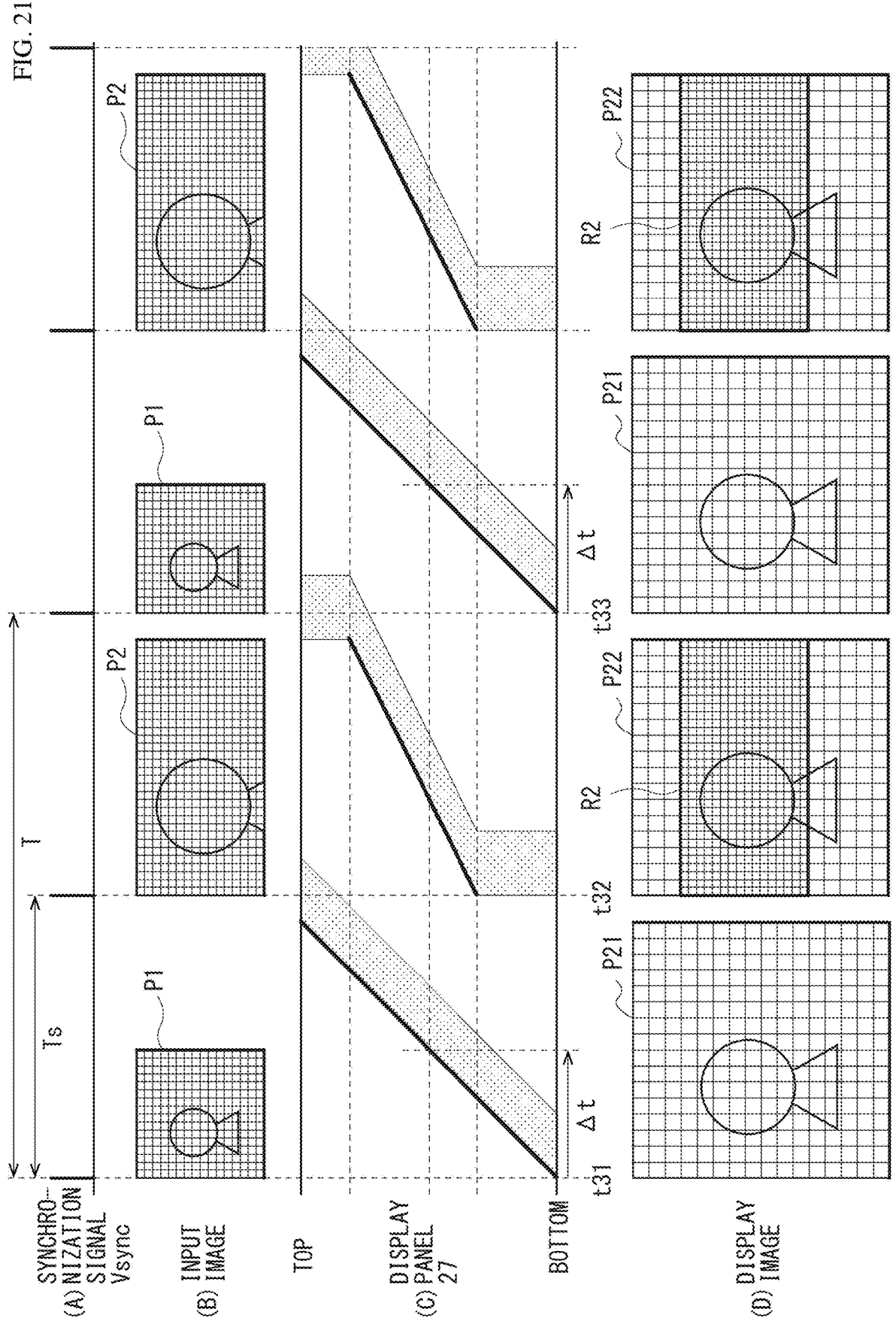
FIG. 21 is an explanatory diagram illustrating an example of a display operation in a head-mounted display according to another modification example.

FIGS. 19 to 21 illustrate an example in which the horizontal pixel number ratio of the partial image P2 is 100% and the vertical pixel number ratio is 50%. FIG. 19 illustrates the entire image P1 and the partial image P2. FIG. 20 schematically illustrates pieces of image data of the entire image P1 and the partial image P2. FIG. 21 illustrates an example of a display operation.

As illustrated in FIG. 20, the number of pixels in the horizontal direction (horizontal pixel number) of the partial image P2 is 100% of the horizontal pixel number of an entire image having a high resolution, and the number of pixels in the vertical direction (vertical pixel number) of the partial image P2 is 50% of the vertical pixel number of the entire image having a high resolution. Meanwhile, the entire image P1 is similar to that in the embodiment described above (FIG. 4B).

As illustrated in FIG. 21, in a period from a timing t31 to a timing t32, the reception circuit 21 of the head-mounted display 20 receives the piece of image data DT1 representing the entire image P1 as illustrated in FIG. 20 ((B) of FIG. 21). As with the case of the embodiment described above (FIGS. 8 and 9), this head-mounted display 20 displays the display image P21 on the basis of the piece of image data DT1 ((C) and (D) of FIG. 21). In addition, in a period from the timing t32 to a timing t33, the reception circuit 21 receives the piece of image data DT2 representing the partial image P2 as illustrated in FIG. 20 ((B) of FIG. 21). As with the case of the embodiment described above (FIGS. 8 and 10), this head-mounted display 20 displays the display image P22 on the basis of the piece of image data DT2 ((C) and (D) of FIG. 21).

As illustrated in FIG. 21, in the display system, in the period from the timing t31 to the timing t32, the piece of image data DT1 representing the entire image P1 is transmitted, and in the period from the timing t32 to the timing t33, the piece of image data DT2 representing the partial image P2 is transmitted. As illustrated in FIG. 20, the image data amount of the partial image P2 is larger than the image data amount of the entire image P1; therefore, the transmission band is determined by the piece of image data DT2 representing the partial image P2. Accordingly, in a case where the horizontal pixel number ratio of the partial image P2 is 100% and the vertical pixel number ratio is 50% in such a manner, the band usage rate is 100%, as illustrated in FIG. 18.

Figure 24:
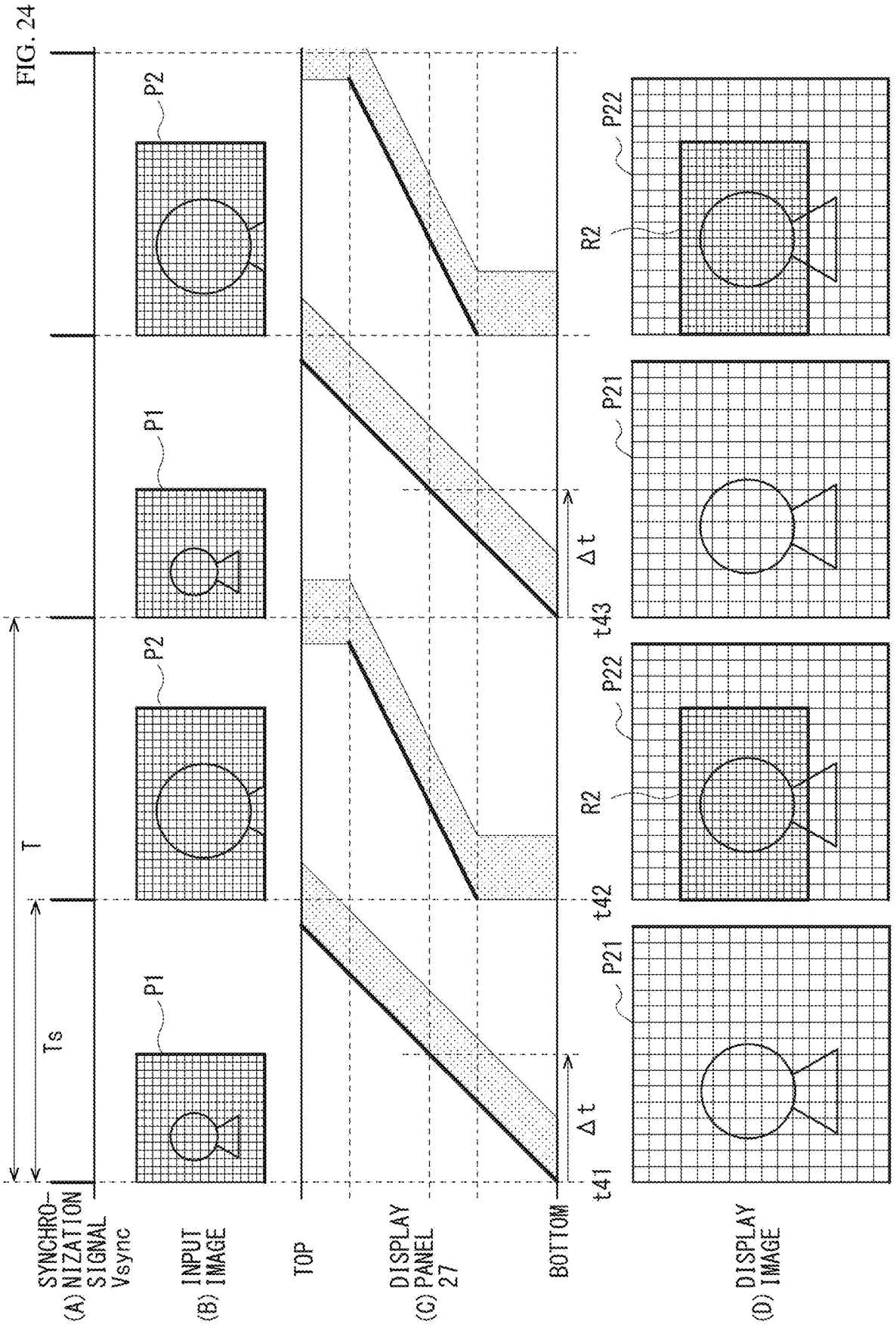
FIG. 24 is an explanatory diagram illustrating an example of a display operation in a head-mounted display according to another modification example.

FIGS. 22 to 24 illustrate an example in which the horizontal pixel number ratio of the partial image P2 is 75% and the vertical pixel number ratio is 50%. FIG. 19 illustrates the entire image P1 and the partial image P2. FIG. 20 schematically illustrates pieces of image data of the entire image P1 and the partial image P2. FIG. 21 illustrates an example of an display operation.

As illustrated in FIG. 23, the number of pixels in the horizontal direction (horizontal pixel number) of the partial image P2 is 75% of the horizontal pixel number of the entire image having a high resolution, and the number of pixels in the vertical direction (vertical pixel number) of the partial image P2 is 50% of the vertical pixel number of the entire image having a high resolution. Meanwhile, the entire image P1 is similar to that in the embodiment described above (FIG. 4B).

As illustrated in FIG. 24, in a period from a timing t41 to a timing t42, the reception circuit 21 of the head-mounted display 20 receives the piece of image data DT1 representing the entire image P1 as illustrated in FIG. 23 ((B) of FIG. 24). As with the case of the embodiment described above (FIGS. 8 and 9), this head-mounted display 20 displays the display image P21 on the basis of the piece of image data DT1 ((C) and (D) of FIG. 24). In addition, in a period from the timing t42 to a timing t43, the reception circuit 21 receives the piece of image data DT2 representing the partial image P2 as illustrated in FIG. 23 ((B) of FIG. 24). As with the case of the embodiment described above (FIGS. 8 and 10), this head-mounted display 20 displays the display image P22 on the basis of the piece of image data DT2 ((C) and (D) of FIG. 24).

Even in this example, as illustrated in FIG. 23, the image data amount of the partial image P2 is larger than the image data amount of the entire image P1; therefore, the transmission band is determined by the piece of image data DT2 representing the partial image P2. Accordingly, in a case where the horizontal pixel number ratio of the partial image P2 is 75% and the vertical pixel number ratio is 50% in such a manner, the band usage rate is 75%, as illustrated in FIG. 18. In this example, it is possible to reduce the transmission band.

In the above examples, the horizontal pixel number ratio of the partial image P2 is larger than the vertical pixel number ratio, but this is not limitative. Instead of this, for example, the vertical pixel number ratio of the partial image P2 may be larger than the horizontal pixel number ratio.

In addition, for example, as illustrated in FIGS. 25 and 26, for example, while the horizontal pixel number ratio and the vertical pixel number ratio of the partial image P2 are equal to each other, the horizontal pixel number ratio and the vertical pixel number ratio may be changed.

It is to be noted that, in the example illustrated in FIGS. 19 to 21, in the period from the timing t31 to the timing t32, there is a spare transmission band. It is possible to effectively use such a spare transmission band in the period from the timing t31 to the timing t32, and it is possible to enhance resolution of the entire image P1 as described below.

Figure 28:
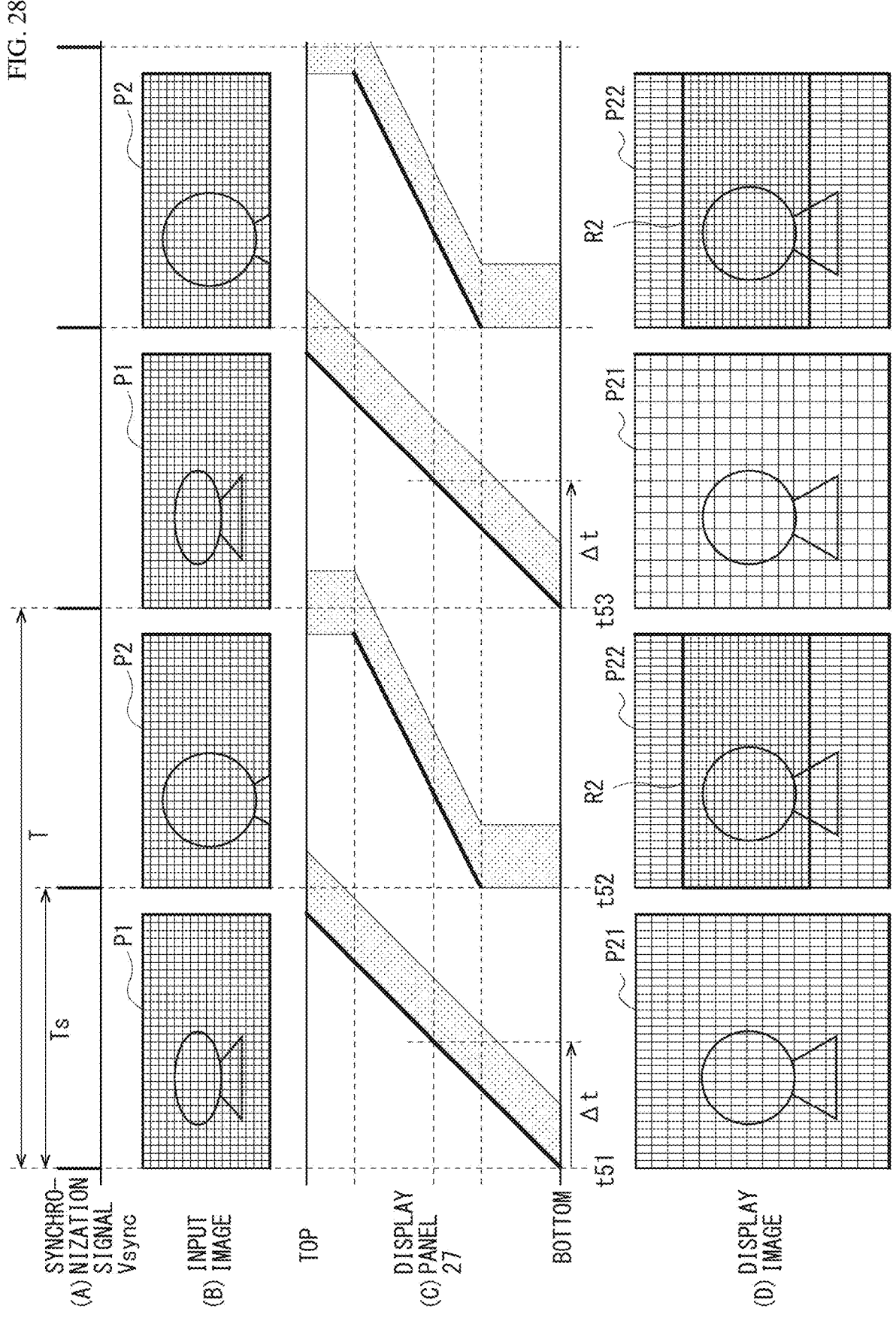
FIG. 28 is an explanatory diagram illustrating an example of a display operation in a head-mounted display according to another modification example.
Figure 29:
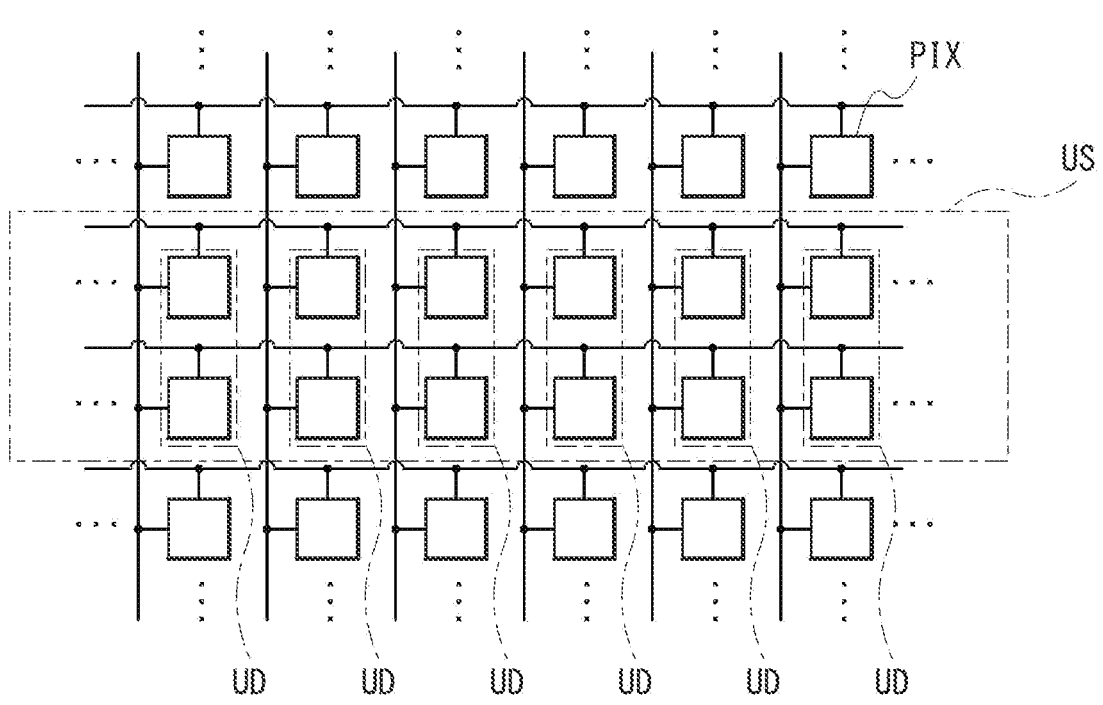
FIG. 29 is an explanatory diagram illustrating a driving example of pixels according to another modification example.

FIGS. 27 to 29 illustrate an example in which the resolution of the entire image P1 is enhanced in a case where horizontal pixel number ratio of the partial image P2 is 100% and the vertical pixel number ratio is 50%. FIG. 27 schematically illustrates the pieces of image data of the entire image P1 and the partial image P2. FIG. 28 illustrates an example of a display operation. FIG. 29 illustrates an operation of driving the pixels PIX.

As illustrated in FIG. 27, the number of pixels in the horizontal direction (horizontal pixel number) of the entire image P1 is 100% of the horizontal pixel number of the entire image having a high resolution, and the number of pixels in the vertical direction (vertical pixel number) of the entire image P1 is 50% of the vertical pixel number of the entire image having a high resolution. In this example, the resolution in the horizontal direction of the entire image P1 is enhanced to twice as high as that in the example in FIG. 20.

As illustrated in FIG. 28, in a period from a timing t51 to a timing t52, the reception circuit 21 of the head-mounted display 20 receives the piece of image data DT1 representing the entire image P1 as illustrated in FIG. 27 ((B) of FIG. 28). The input image is the entire image P1; therefore, the display controller 26 performs control to drive the plurality of pixels PIX in the display panel 27 in units of two pixels PIX on the basis of the piece of image data of the entire image P1.

As illustrated in FIG. 29, in the display panel 27, the scanning circuit 33 scans the plurality of pixels PIX in scanning units US of two pixel lines L. In addition, the pixel signal generation circuit 32 applies each of a plurality of pixel signals to a corresponding one of the plurality of signal lines SGL. Accordingly, the same pixel signal is written to two pixels PIX in selected two pixel lines L. Thus, the display panel 27 drives the plurality of pixels PIX in units UD of two pixels PIX.

As indicated by a thick line in (C) of FIG. 28, the scanning circuit 33 sequentially performs scanning in scanning units of two pixel lines L from the bottom to the top of the pixel array 31 in this example. Then, as indicated by a shaded portion in (C) of FIG. 28, the pixels PIX to which the pixel signal has been written emit light over a predetermined period after the pixel signal is written in this example. Thus, the display panel 27 displays the display image P21 ((D) of FIG. 28).

In addition, in a period from the timing t52 to a timing t53, the reception circuit 21 receives the piece of image data DT2 representing the partial image P2 as illustrated in FIG. 27 ((B) of FIG. 28). As with the case of the embodiment described above (FIGS. 8 and 10), the head-mounted display 20 displays the display image P22 on the basis of the piece of image data DT2 ((C) and (D) of FIG. 28).

Modification Example 5

Figure 30:
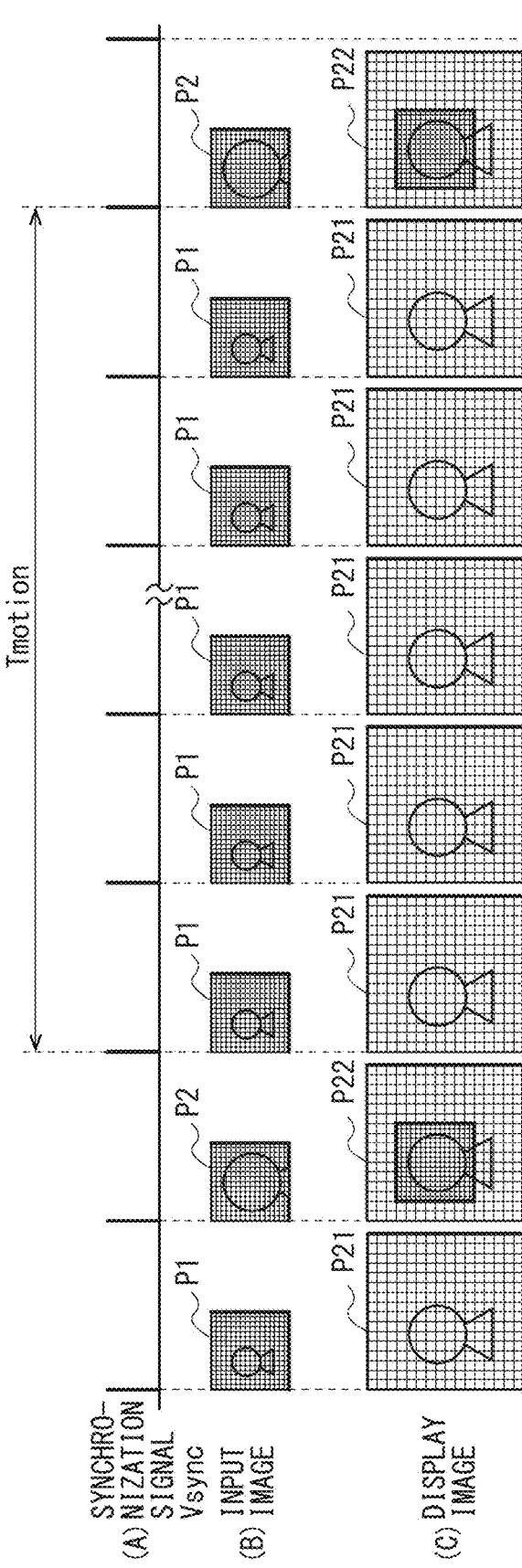
FIG. 30 is an explanatory diagram illustrating an operation example of a display system according to another modification example.

In the embodiment described above, the piece of image data DT1 representing the entire image P1 and the piece of image data DT2 representing the partial image P2 are alternately transmitted, but this is not limitative. For example, as illustrated in FIG. 30, a piece of image data to be transmitted may be changed on the basis of a result of detection by the acceleration sensor 22 and a result of detection by the eye-tracking sensor 23. In this display system 1, basically, the piece of image data DT1 representing the entire image P1 and the piece of image data DT2 representing the partial image P2 are alternately transmitted. In this example, in a period Tmotion, the user significantly changes a head direction. The acceleration sensor 22 detects a motion such as the direction of the head-mounted display 20. The transmission circuit 25 of the head-mounted display 20 then transmits the detection signal SD including a result of detection by the acceleration sensor 22 to the image generation device 10. The reception circuit 13 of the image generation device 10 receives this detection signal SD, and the image generation circuit 11 continues to repeatedly generate the entire image P1 in the period Tmotion in which the direction of the head-mounted display 20 continues to change, on the basis of the result of detection by the acceleration sensor 22. The transmission circuit 12 generates the piece of image data DT1 representing the entire image P1 on the basis of the piece of image data of the entire image P1, and transmits the image signal SP including the piece of image data DT1. In other words, the transmission circuit 12 of the image generation device 10 continues to repeatedly transmit the piece of the image data DT1 representing the entire image P1 in the period Tmotion. The reception circuit 21 of the head-mounted display 20 receives the piece of image data DT1. The head-mounted display 20 then displays the display image P21 including the entire image P1 on the basis of the piece of image data DT1. In other words, the head-mounted display 20 continues to repeatedly display the display image P21 including the entire image P1 in the period Tmotion. Then, in a case where the user stops the head direction, the period Tmotion ends, and the display system 1 alternately transmits the piece of image data DT1 representing the entire image P1 and the piece of image data DT2 representing the partial image P2. Thus, in a case where the user moves his head, it is possible to look at the display image P21 including the entire image P1 corresponding to motion of the head within a short latency, which makes it possible to reduce a possibility that the user feels sick.

It is to be noted that, in this example, in a case where the user significantly changes the head direction, the display system 1 repeatedly transmits the piece of image data DT1 representing the entire image P1, but this is not limitative. Instead of this, for example, in a case where the user significantly changes a portion at which the user looks of the display image, the piece of image data DT1 representing the entire image P1 may be repeatedly transmitted. In this case, the display system 1 repeatedly transmits the piece of image data DT1 representing the entire image P1 on the basis of the result of detection by the eye-tracking sensor 23.

Modification Example 6

In the embodiment described above, one piece of image data DT1 and one piece of image data DT2 are alternately transmitted, but this is not limitative. For example, one piece of image data DT1 and a plurality of pieces of image data DT2 may be alternately transmitted. In addition, the number of pieces of image data DT2 may be changeable. An example in which one piece of image data DT1 and three pieces of image data DT2 are alternately transmitted is described in detail below.

Figure 31:
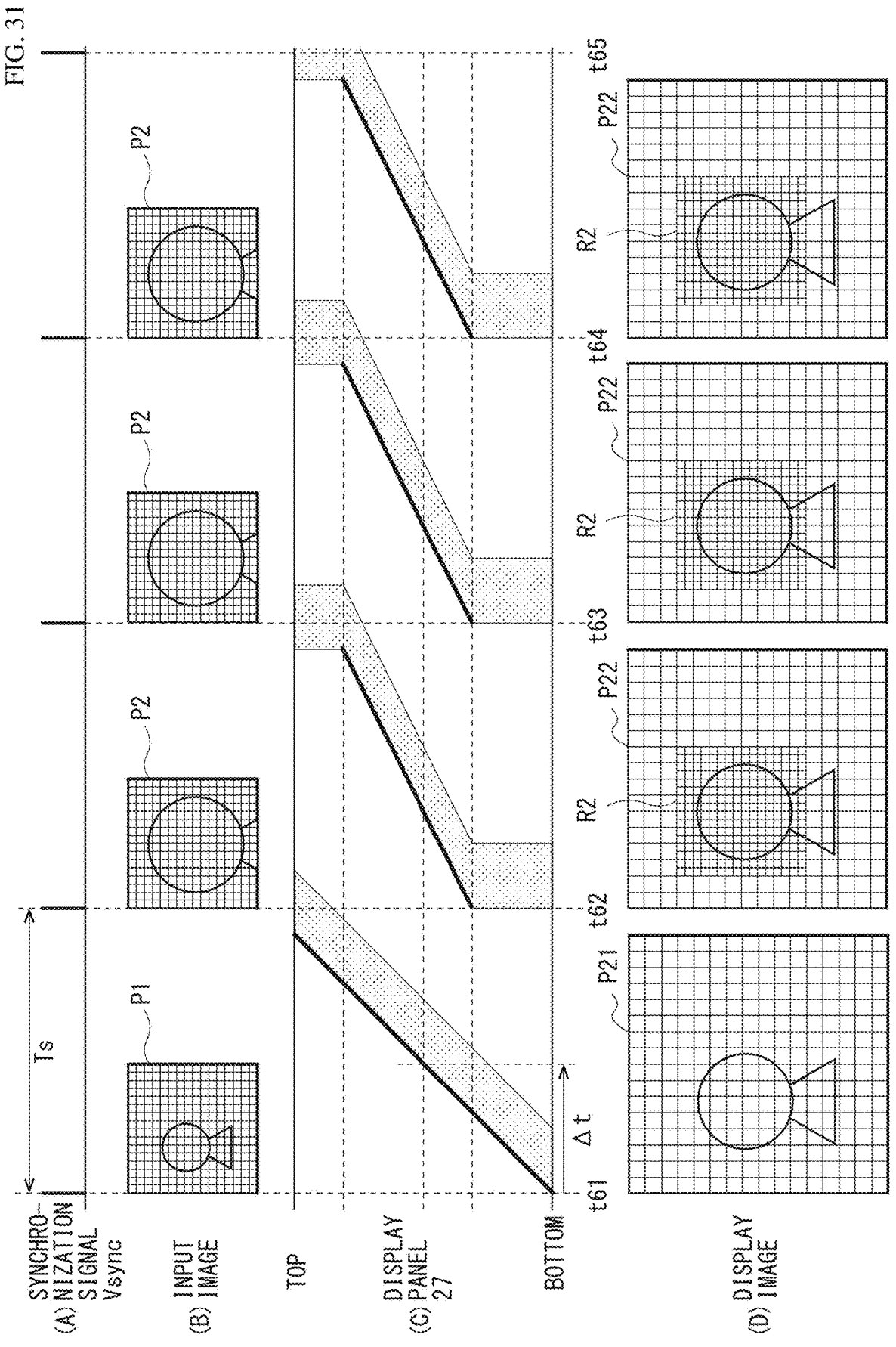
FIG. 31 is an explanatory diagram illustrating an example of a display operation in a head-mounted display according to another modification example.

FIG. 31 illustrates an example of a display operation in the head-mounted display 20 according to the present modification example, where (A) indicates a waveform of the synchronization signal Vsync, (B) indicates an input image, (C) indicates an operation of the display panel 27, and (D) indicates a display image to be displayed on the display panel 27. Each of the entire image P1 and the partial image P2 is suppled in the cycle Ts. The cycle Ts is, for example, 4.2 [msec.] ($=\frac{1}{240}$ [Hz]).

In a period from a timing t61 to a timing t62, the reception circuit 21 of the head-mounted display 20 receives the piece of image data DT1 representing the entire image P1 ((B) of FIG. 31). As with the case of the embodiment described above (FIGS. 8 and 9), the head-mounted display 20 displays the display image P21 on the basis of the piece of image data DT1 ((C) and (D) of FIG. 31). In addition, in a period from the timing t62 to a timing t63, the reception circuit 21 receives a piece of image data DT2 representing the partial image P2 ((B) of FIG. 31). As with the case of the embodiment described above (FIGS. 8 and 10), the head-mounted display 20 displays the display image P22 on the basis of this piece of image data DT2((C) and (D) of FIG. 31). In addition, in a period from the timing t63 to a timing t64, the reception circuit 21 receives a piece of image data DT2 representing the partial image P2 ((B) of FIG. 31). As with the case of the embodiment described above (FIGS. 8 and 10), the head-mounted display 20 displays the display image P22 on the basis of this piece of image data DT2 ((C) and (D) of FIG. 31). In addition, in a period from the timing t64 to a timing t65, the reception circuit 21 receives a piece of image data DT2 representing the partial image P2 ((B) of FIG. 31). As with the case of the embodiment described above (FIGS. 8 and 10), the head-mounted display 20 displays the display image P22 on the basis of this piece of image data DT2 ((C) and (D) of FIG. 31).

Figure 32:
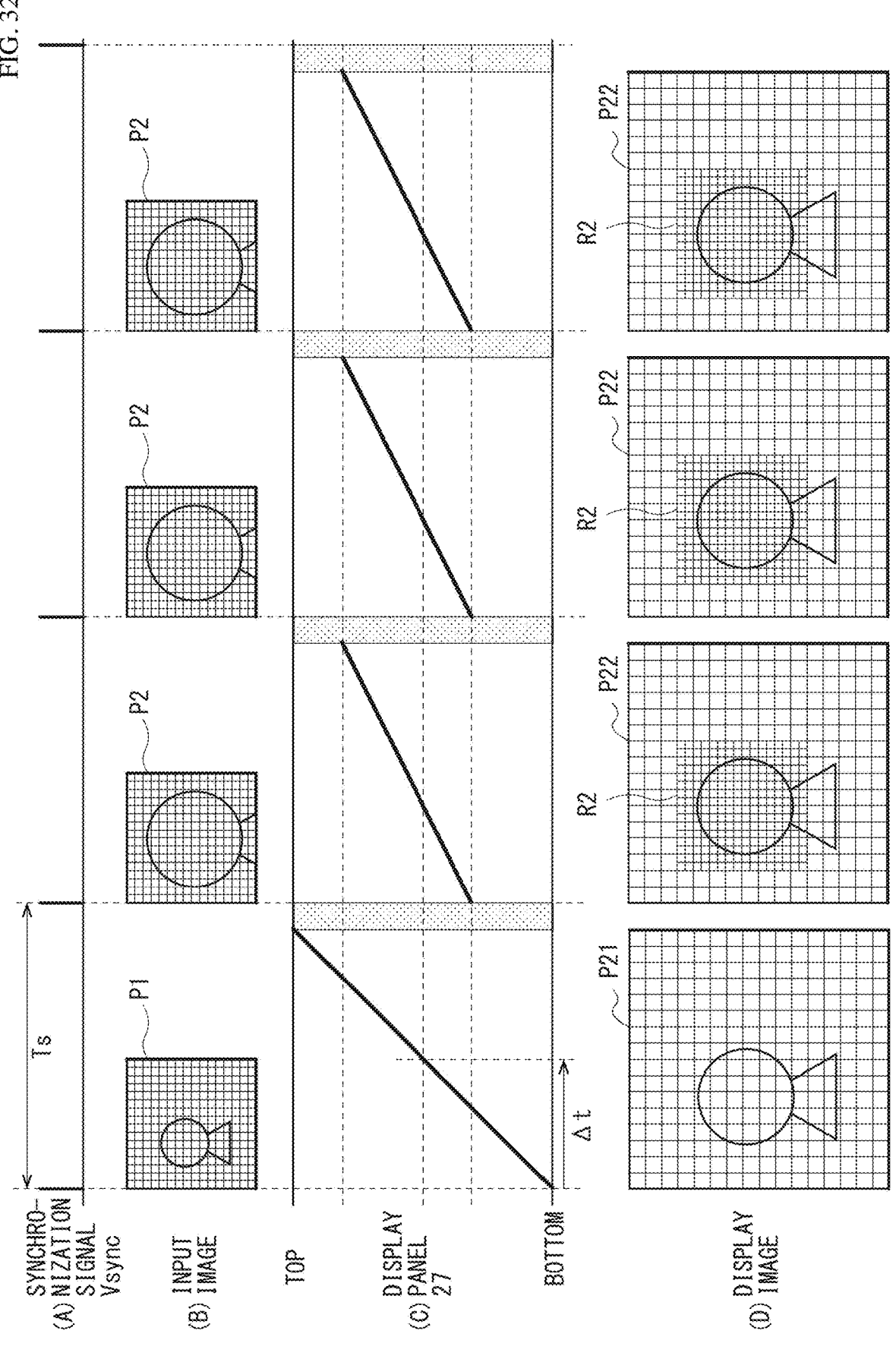
FIG. 32 is an explanatory diagram illustrating an example of a display operation in a head-mounted display according to another modification example.

FIG. 32 illustrates an example of another display operation in the head-mounted display 20 according to the present modification example. In this example, as with the example in FIG. 11, in the display panel 27, the pixels PIX in the entire region emit light at the same timing.

In the present modification example, the frequency of generation of the partial image P2 is high, as compared with the case of the embodiment described above in which the entire image P1 and the partial image P2 are alternately generated. It is not necessary for the image generation circuit 11 to perform rendering processing on an image outside the partial image P2 in generating the partial image P2. Accordingly, in the present modification example, it is possible to further reduce power consumption. In addition, for example, it is possible for the image generation circuit 11 to reduce the number of times of generation of the partial image P2 in a case where three partial images P2 are made the same image, which makes it possible to reduce power consumption.

Modification Example 7

In the embodiment described above, two sub-frames (the entire image P1 and the partial image P2) are provided, but this is not limitative. Instead of this, three or more sub-frames may be provided. An example in which three sub-frames are provided is described in detail below.

The image generation circuit 11 according to the present modification example generates the entire image P1 representing a scenery corresponding to the direction of the head-mounted display 20 in a virtual space on the basis of a result of detection by the acceleration sensor 22 included in a piece of data supplied from the reception circuit 13. In addition, the image generation circuit 11 generates partial images P2 and P3 each representing a portion at which the user is looking of the scenery corresponding to the direction of the head-mounted display 20 in the virtual space on the basis of a result of detection by the eye-tracking sensor 23 included in a piece of data supplied from the reception circuit 13.

Figure 33:
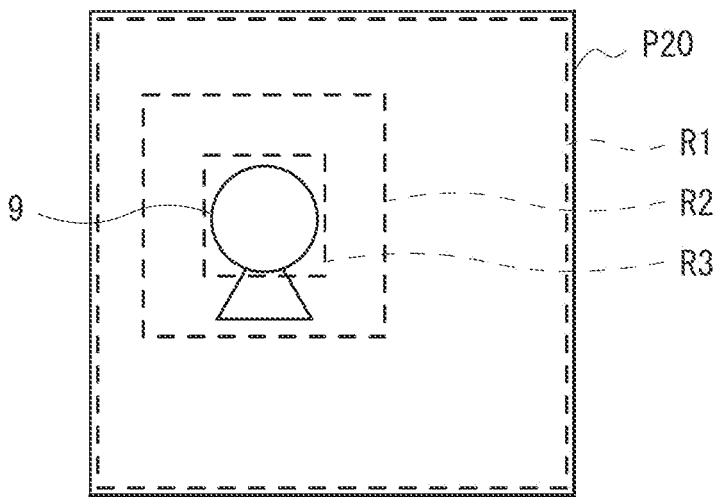
FIG. 33 is an explanatory diagram illustrating an example of a display image of a head-mounted display according to another modification example.

FIG. 33 illustrates an example of the display image P20 displayed on the head-mounted display 20. The image generation circuit 11 determines partial regions R2 and R3 including a portion at which the user is looking of the entire region R1 of the display image P20 on the basis of the result of detection by the eye-tracking sensor 23 included in the piece of data supplied from the reception circuit 13. In this example, the size in the horizontal direction (the lateral direction in FIG. 33) of the partial region R2 is a half of the size in the horizontal direction of the entire region R1, and the size in the vertical direction (the longitudinal direction in FIG. 33) of the partial region R2 is a half of the size in the vertical direction of the entire region R1. In other words, the area of the partial region R2 is ¼ of the area of the entire region R1. In addition, in this example, a size in the horizontal direction of the partial region R3 is a half of the size in the horizontal direction of the partial region R2, and a size in the vertical direction of the partial region R3 is a half of the size in the vertical direction of the partial region R2. In other words, the area of the partial region R3 is ¼ of the area of the partial region R2. In this example, a center position of the partial region R3 is the same as the center position of the partial region R2.

Figure 34:
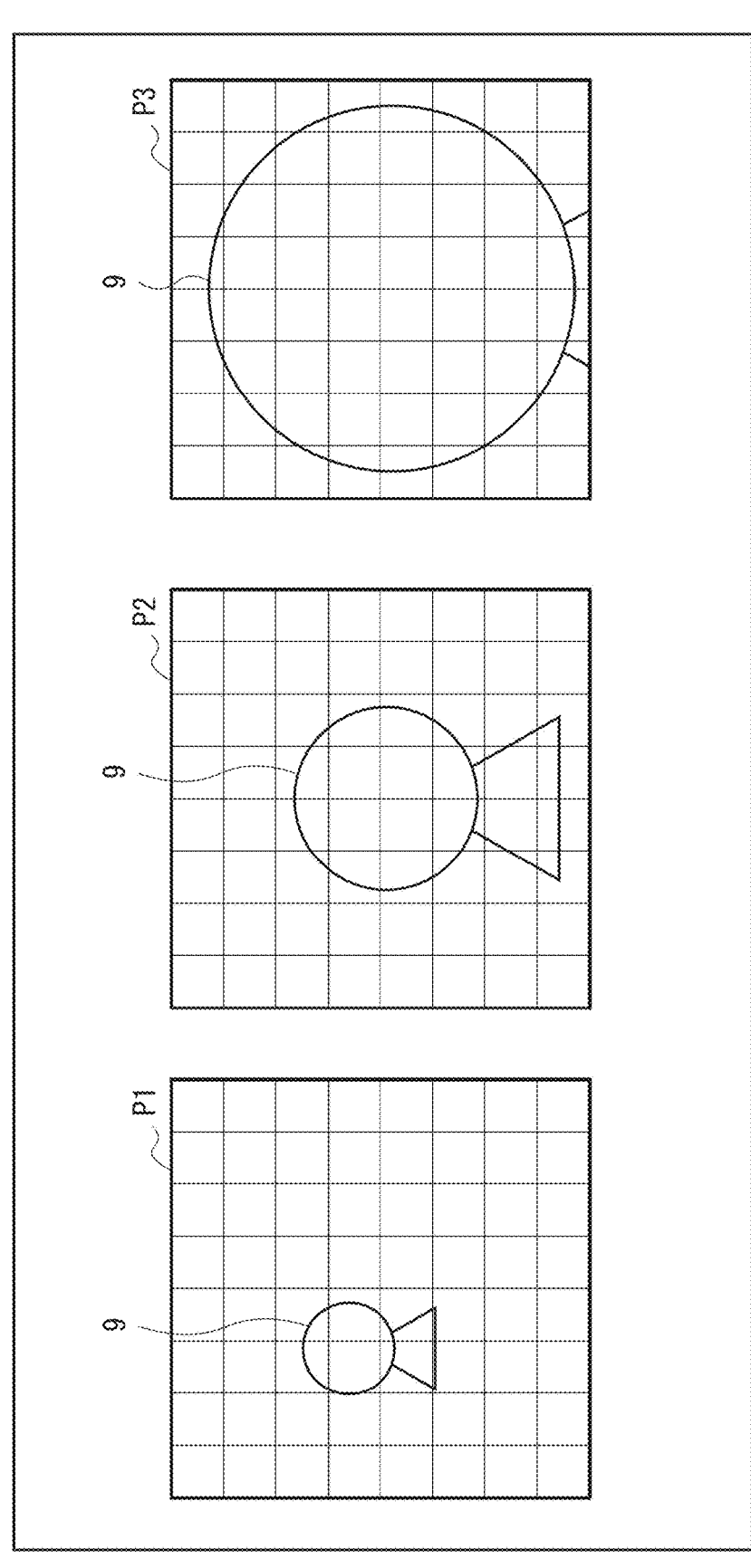
FIG. 34 is an explanatory diagram illustrating an example of an entire image and partial images generated by an image generation device according to another modification example.

FIG. 34 illustrates an example of the entire image P1 and the partial images P2 and P3 generated by the image generation circuit 11. The entire image P1 is an image having a low resolution of the entire region R1 (FIG. 33). The partial image P2 is an image having a medium resolution of the partial region R2. The partial image P3 is an image having a high resolution of the partial region R3. In this example, each pixel in the entire image P1 corresponds to sixteen pixels PIX in the head-mounted display 20. Each pixel in the partial image P2 corresponds to four pixels PIX in the head-mounted display 20. Each pixel in the partial image P3 corresponds to one pixel PIX in the head-mounted display 20. In this example, the number of pixels in the entire image P1, the number of pixels in the partial image P2, and the number of pixels in the partial image P3 are equal to each other.

Figure 35:
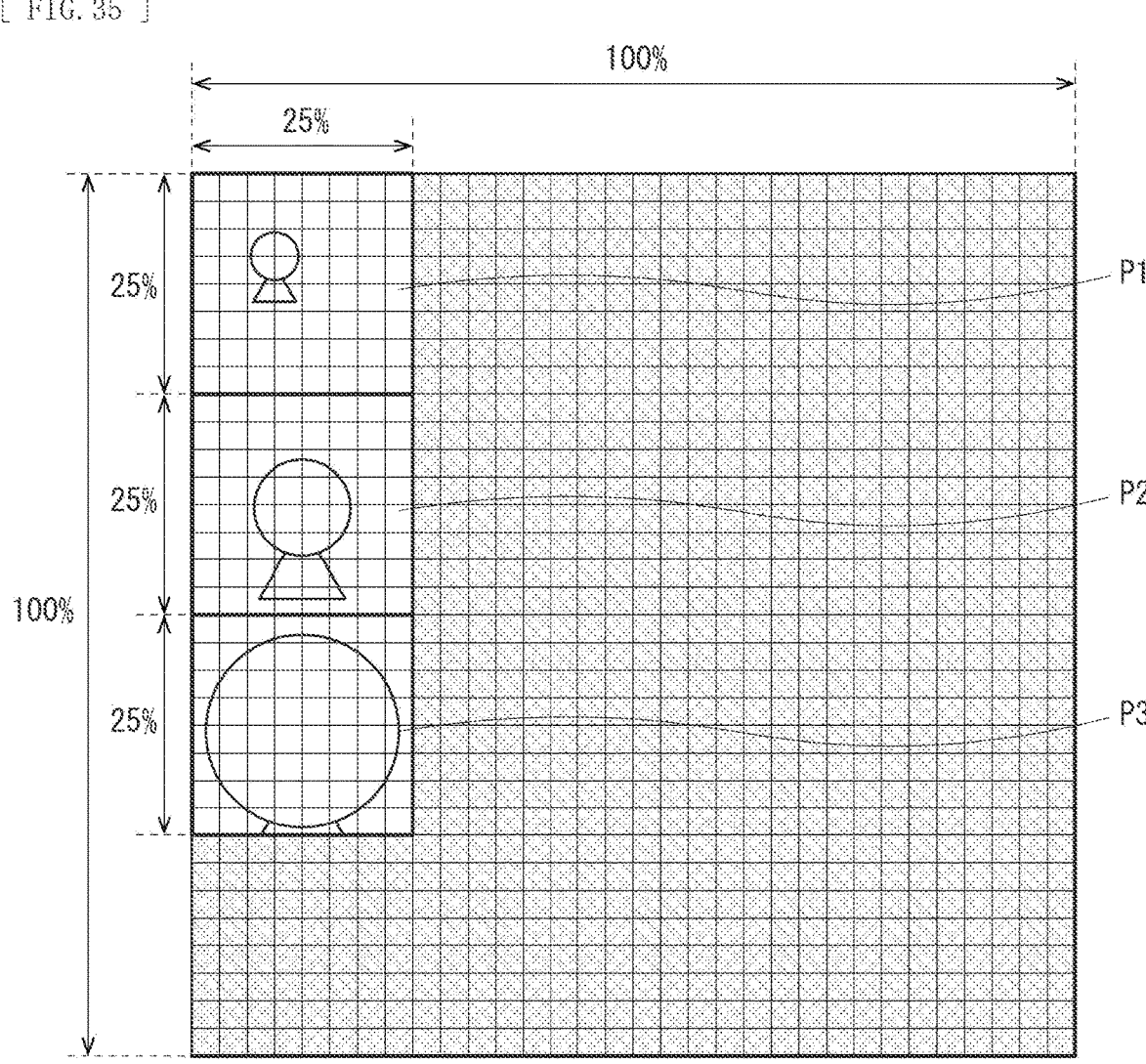
FIG. 35 is an explanatory diagram illustrating an example of pieces of image data of the entire image and the partial images according to another modification example.

FIG. 35 schematically illustrates pieces of image data of the entire image P1 and the partial images P2 and P3. A piece of image data representing the entirety in FIG. 35 indicates a piece of image data of an entire image having a high resolution usable in a case where each of a plurality of pixel values is written to a corresponding one of the plurality of pixels PIX in the head-mounted display 20.

The number of pixels in the horizontal direction (horizontal pixel number) of the entire image P1 is 25% of the horizontal pixel number of the entire image having a high resolution illustrated in FIG. 35, and the number of pixels in the vertical direction (vertical pixel number) of the entire image P1 is 25% of the vertical pixel number of the entire image having a high resolution. In other words, the horizontal pixel number ratio of the entire image P1 is 25%, and the vertical pixel number ratio of the entire image P1 is 25%.

The number of pixels in the horizontal direction (horizontal pixel number) of the partial image P2 is 25% of the horizontal pixel number of the entire image having a high resolution, and the number of pixels in the vertical direction (vertical pixel number) of the partial image P2 is 25% of the vertical pixel number of the entire image having a high resolution. In other words, the horizontal pixel number ratio of the partial image P2 is 25%, and the vertical pixel number ratio of the partial image P2 is 25%.

The number of pixels in the horizontal direction (horizontal pixel number) of the partial image P3 is 25% of the horizontal pixel number of the entire image having a high resolution, and the number of pixels in the vertical direction (vertical pixel number) of the partial image P3 is 25% of the vertical pixel number of the entire image having a high resolution. In other words, a horizontal pixel number ratio of the partial image P3 is 25% and a vertical pixel number ratio of the partial image P3 is 25%.

Thus, in this example, the horizontal pixel number ratios of the entire image P1 and the partial images P2 and P3 are equal to each other, and the vertical pixel number ratios of the entire image P1 and the partial images P2 and P3 are equal to each other. In addition, the total data amount of the entire image P1 and the partial images P2 and P3 is $\frac{3}{16}$ of the data amount of the entire image having a high resolution.

Figure 36:
FIG. 36 is an explanatory diagram illustrating an example of a display operation in a display system according to another modification example.

FIG. 36 illustrates an example of a display operation in the head-mounted display 20 according to the present modification example. The head-mounted display 20 cyclically receives the piece of image data DT1 representing the entire image P1, the piece of image data DT2 representing the partial image P2, and the piece of image data DT3 representing the partial image P3 in this order.

In a case where the head-mounted display 20 receives the piece of image data DT1, the display controller 26 performs control to drive the plurality of pixels PIX in the display panel 27 in units of sixteen pixels PIX on the basis of the piece of image data of the entire image P1 included in the piece of image data DT1. Thus, the display panel 27 displays the display image P21 including the entire image P1 having a low resolution.

In a case where the head-mounted display 20 receives the piece of image data DT2, the display controller 26 performs control to drive a plurality of pixels PIX disposed in the region corresponding to the partial image P2 of the plurality of pixels PIX in the display panel 27 in units of four pixels PIX on the basis of the piece of image data of the partial image P2 included in the piece of image data DT2 and the piece of data about the position of the partial image P2. On this occasion, a plurality of pixels PIX in a region other than the region corresponding to the partial image P2 of the plurality of pixels PIX in the display panel 27 maintains display. Thus, the display panel 27 displays the display image P22 including the partial image P2 having a medium resolution.

In a case where the head-mounted display 20 receives the piece of image data DT3, the display controller 26 performs control to drive a plurality of pixels PIX disposed in a region corresponding to the partial image P3 of the plurality of pixels PIX in the display panel 27 in units of one pixel PIX on the basis of a piece of image data of the partial image P3 included in the piece of image data DT3, and a piece of data about the position of the partial image P3. On this occasion, a plurality of pixels PIX in a region other than the region corresponding to the partial image P3 of the plurality of pixels PIX in the display panel 27 maintains display. Thus, the display panel 27 displays a display image P23 including the partial image P3 having a low resolution.

Figure 37:
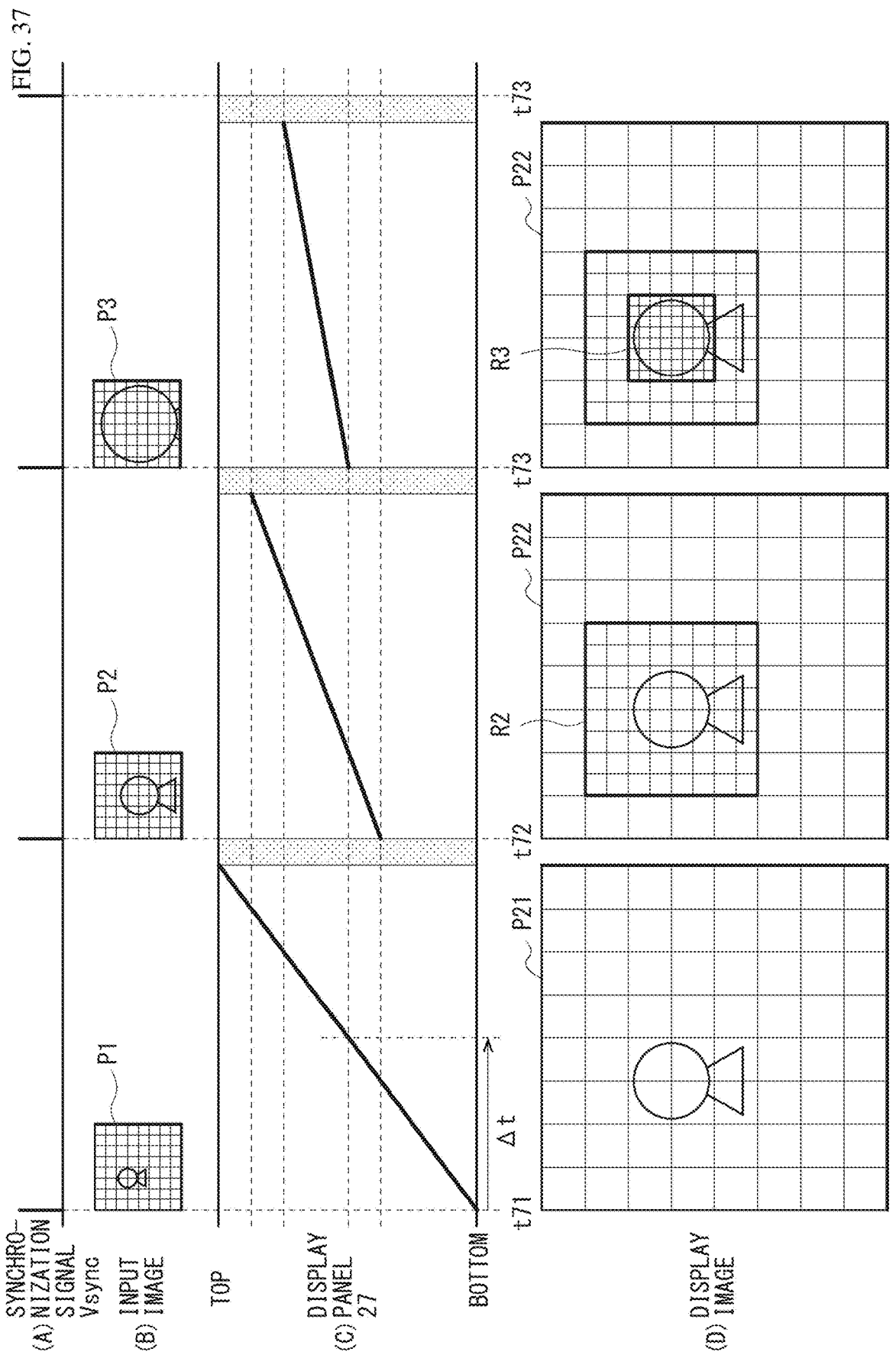
FIG. 37 is an explanatory diagram illustrating an example of a display operation in an head-mounted display according to another modification example.

FIG. 37 illustrates an example of a more specific display operation in the head-mounted display 20.

In a period from a timing t71 to a timing t72, the reception circuit 21 of the head-mounted display 20 receives the piece of image data DT1 representing the entire image P1 ((B) of FIG. 37). The input image is the entire image P1; therefore, the display controller 26 performs control to drive the plurality of pixels PIX in the display panel 27 in units of sixteen pixels PIX on the basis of the piece of image data of the entire image P1.

In the display panel 27, the scanning circuit 33 scans the plurality of pixels PIX in scanning units of four pixel lines L. In addition, the pixel signal generation circuit 32 applies the same pixel signal to four signal lines SGL. Accordingly, the same pixel signal is written to sixteen pixels PIX in selected four pixel lines L. Thus, the display panel 27 drives the plurality of pixels PIX in units of sixteen pixels PIX.

As indicated by a thick line in (C) of FIG. 37, the scanning circuit 33 sequentially performs scanning in scanning units of eight pixel lines L from the bottom to the top of the pixel array 31 in this example. Then, as indicated by a shaded portion in (C) of FIG. 37, at a timing at which the pixel signals are written to all the pixels PIX in the display panel 27, the plurality of pixels PIX emits light at the same timing over a predetermined period. Thus, the display panel 27 displays the display image P21 ((D) of FIG. 37).

Next, in a period from the timing t72 to a timing t73, the reception circuit 21 of the head-mounted display 20 receives the piece of image data DT2 representing the partial image P2 ((B) of FIG. 37). The input image is the partial image P2; therefore, the display controller 26 performs control to drive a plurality of pixels PIX disposed in the region corresponding to the partial image P2 of the plurality of pixels PIX in the display panel 27 in units of four pixels PIX on the basis of the piece of image data of the partial image P2 and the piece of data about the position of the partial image P2.

In the display panel 27, the scanning circuit 33 scans the plurality of pixels PIX in scanning units of two pixel lines L. In addition, the pixel signal generation circuit 32 applies the same pixel signal to two signal lines SGL of a plurality of signal lines SGL related to the region corresponding to the partial image P2 of the plurality of signal lines SGL. Accordingly, the same pixel signal is written to four pixels PIX in selected two pixel lines L. Thus, the display panel 27 drives the plurality of pixels PIX in units of four pixels PIX.

As indicated by a thick line in (C) of FIG. 37, the scanning circuit 33 sequentially performs scanning in the region corresponding to the partial image P2 of the pixel array 31 in scanning units of two pixel lines L. Then, as indicated by a shaded portion in (C) of FIG. 37, the plurality of pixels PIX emits light at the same timing over a predetermined period at a timing at which the pixel signals are written to all the pixels PIX in the display panel 27. Thus, the display panel 27 displays the display image P22 ((D) of FIG. 37).

Next, in a period from the timing t73 to a timing t74, the reception circuit 21 of the head-mounted display 20 receives the piece of image data DT3 representing the partial image P2 ((B) of FIG. 37). The input image is the partial image P3; therefore, the display controller 26 performs control to drive a plurality of pixels PIX disposed in the region corresponding to the partial image P2 of the plurality of pixels PIX in the display panel 27 in units of one pixel PIX on the basis of the piece of image data of the partial image P3 and the piece of data about the position of the partial image P3.

In the display panel 27, the scanning circuit 33 scans the plurality of pixels PIX in scanning units of one pixel line L. In addition, the pixel signal generation circuit 32 applies each of a plurality of pixel signals to a corresponding one of a plurality of signal lines SGL related to the region corresponding to the partial image P3 of the plurality of signal lines SGL. Thus, the display panel 27 drives the plurality of pixels PIX in units of one pixel PIX.

As indicated by a thick line in (C) of FIG. 37, the scanning circuit 33 sequentially performs scanning in the region corresponding to the partial image P3 of the pixel array 31 in scanning units of one pixel line L. Then, as indicated by a shaded portion in (C) of FIG. 37, at a timing at which the pixel signals are written to all the pixels PIX in the display panel 27, the plurality of pixels PIX emits light at the same timing over a predetermined period. Thus, the display panel 27 displays the display image P23 ((D) of FIG. 37).

FIG. 38 illustrates band usage rates in the display system 1 according to the embodiment described above and the display system 1 according to the present modification example. In a case where the number of sub-frames is two as with the embodiment described above, as illustrated in FIG. 4B, the total data amount of the entire image P1 and the partial image P2 is 50% of the data amount of the entire image having a high resolution; therefore, the band usage rate is 50%. Meanwhile, in a case where the number of sub-frames is three as with the present modification example, as illustrated in FIG. 35, the total data amount of the entire image P1 and the partial images P2 and P3 is $\frac{3}{16}$ of the data amount of the entire image having a high resolution; therefore, the band usage rate is 19%. Thus, in the present modification example, it is possible to reduce the band usage rate. In addition, it is possible to reduce an operation frequency, which makes it possible to reduce power consumption.

Modification Example 8

In the embodiment described above, the piece of image data of the entire image P1 and the piece of image data of the partial image P2 are transmitted without being compressed, but this is not limitative. For example, the piece of image data of the entire image P1 and the piece of image data of the partial image P2 may be compressed. A display system C1 according to the present modification example is described in detail below.

Figure 39:
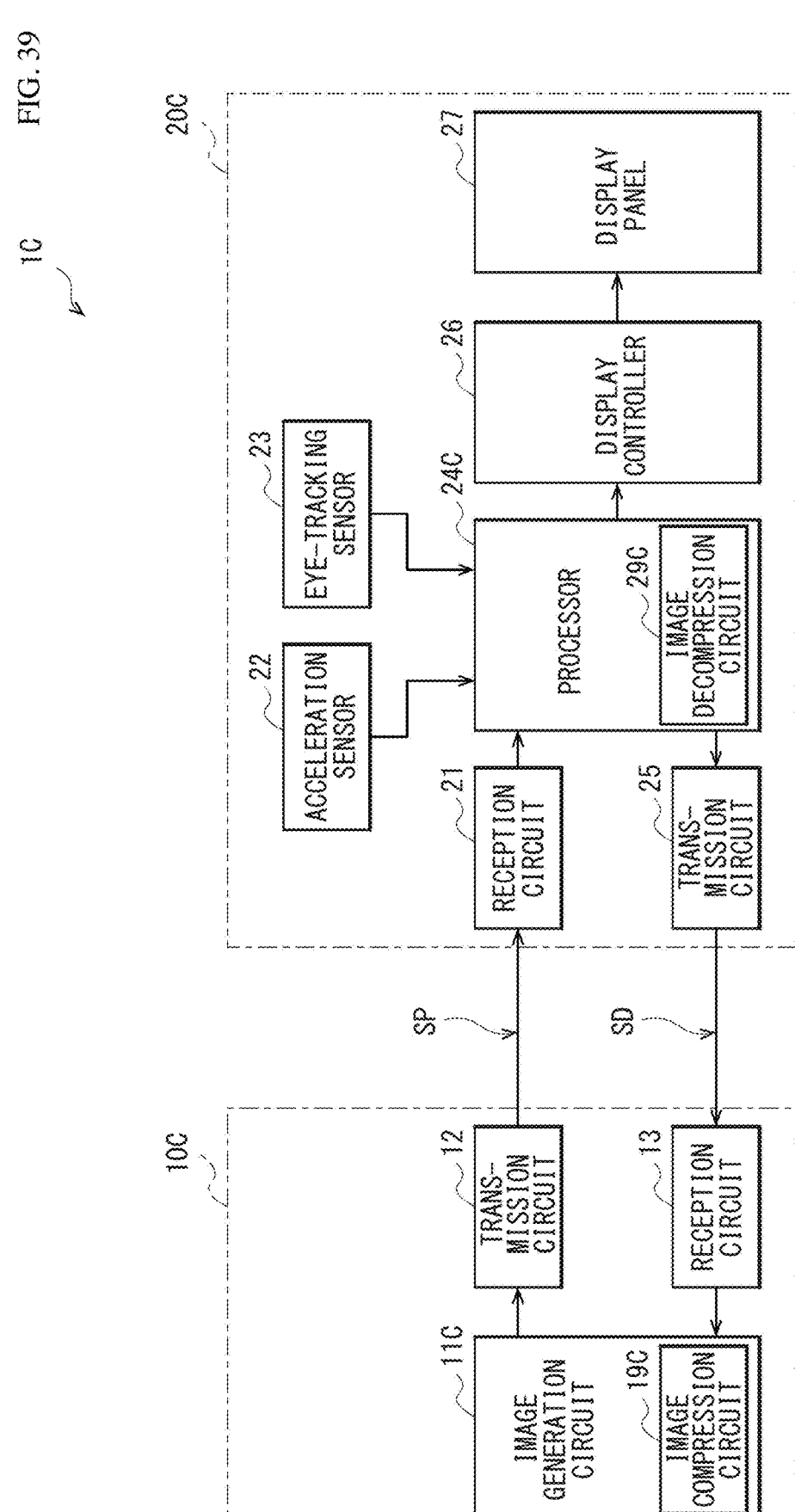
FIG. 39 is a block diagram illustrating a configuration example of a display system according to another modification example.

FIG. 39 illustrates a configuration example of the display system 1C. The display system 1C includes an image generation device 10C and a head-mounted display 20C.

The image generation device 10C includes an image generation circuit 11C. The image generation circuit 11C includes an image compression circuit 19C. The image compression circuit 19C is configured to compress, for example, one or both of the entire image P1 and the partial image P2. It is possible for the image compression circuit 19C to set whether or not to perform compression in sub-frame units. In addition, in a case where compression is performed, it is possible for the image compression circuit 19C to set a compression ratio in sub-frame units. For example, in a case where MIPI is used for communication, it is possible to use VESA (Video Electronics Standards Association)-DSC (Display Stream Compression) in the MIPI.

The head-mounted display 20C includes a processor 24C. The processor 24C includes an image decompression circuit 29C. The image decompression circuit 29C is configured to decompress an image compressed by the image compression circuit 19C.

Figure 40:
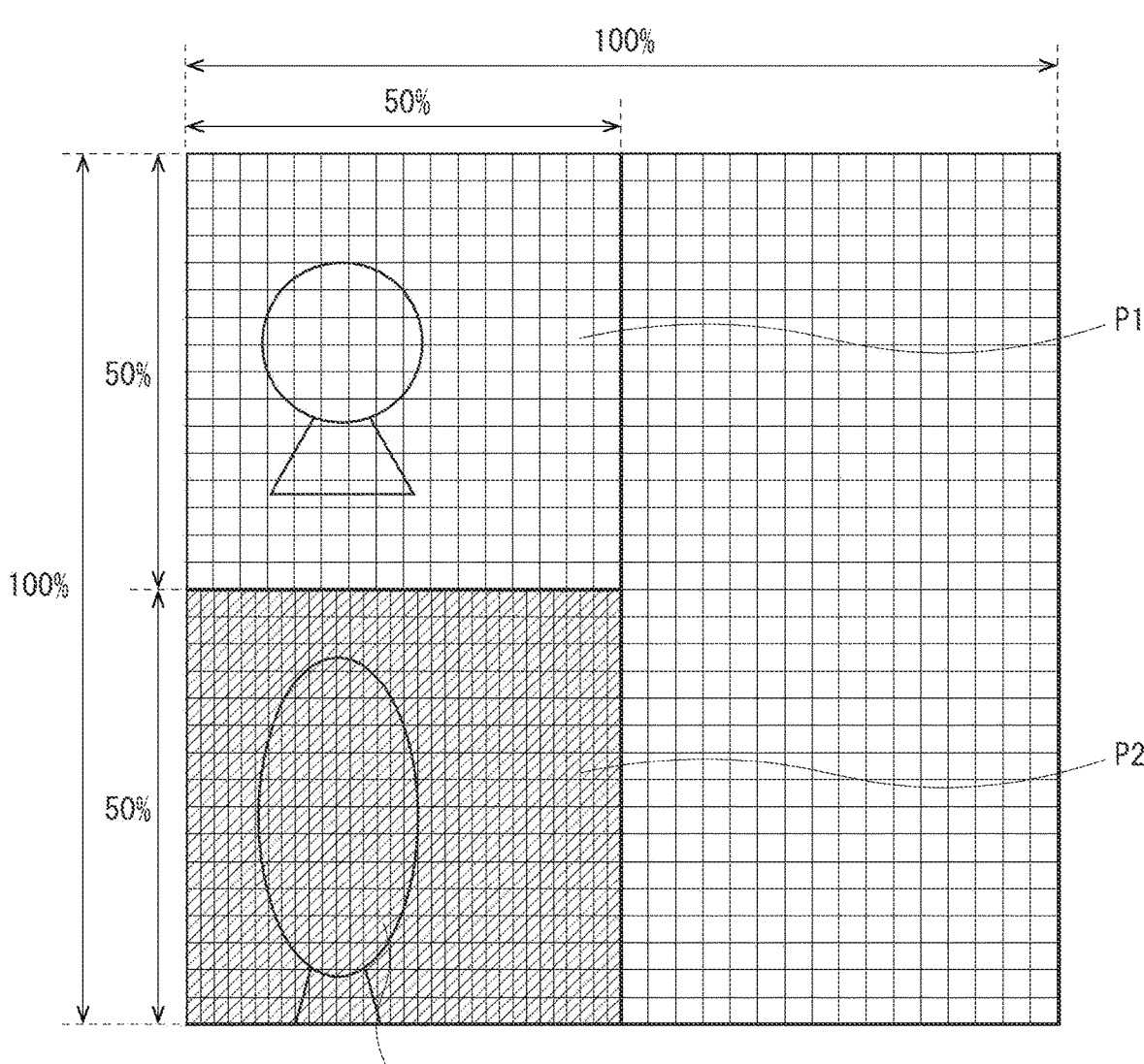
FIG. 40 is an explanatory diagram illustrating an example of pieces of image data of an entire image and a partial image according to another modification example.

For example, as illustrated in FIG. 20, in a case where the horizontal pixel number ratio of the partial image P2 is 100% and the vertical pixel number ratio is 50%, the data amount of the partial image P2 is larger than the data amount of the entire image P1. In this case, a waste occurs in the transmission band. Accordingly, in the display system 1C, the image compression circuit 19C compresses the partial image P2, which makes it possible to reduce the data amount of the piece of image data of the partial image P2 as compared with a case in FIG. 20, as illustrated in FIG. 40. In FIG. 40, a shaded portion indicates a compressed image. In this example, the image compression circuit 19C compresses the partial image P2 at a compression rate of 50%. As a result, it is possible to reduce the transmission band. The compressed partial image P2 is decompressed by the image decompression circuit 29C. The head-mounted display 20C displays an image similar to that in the case in FIG. 20 on the basis of the decompressed partial image P2.

Modification Example 8

Figure 41:
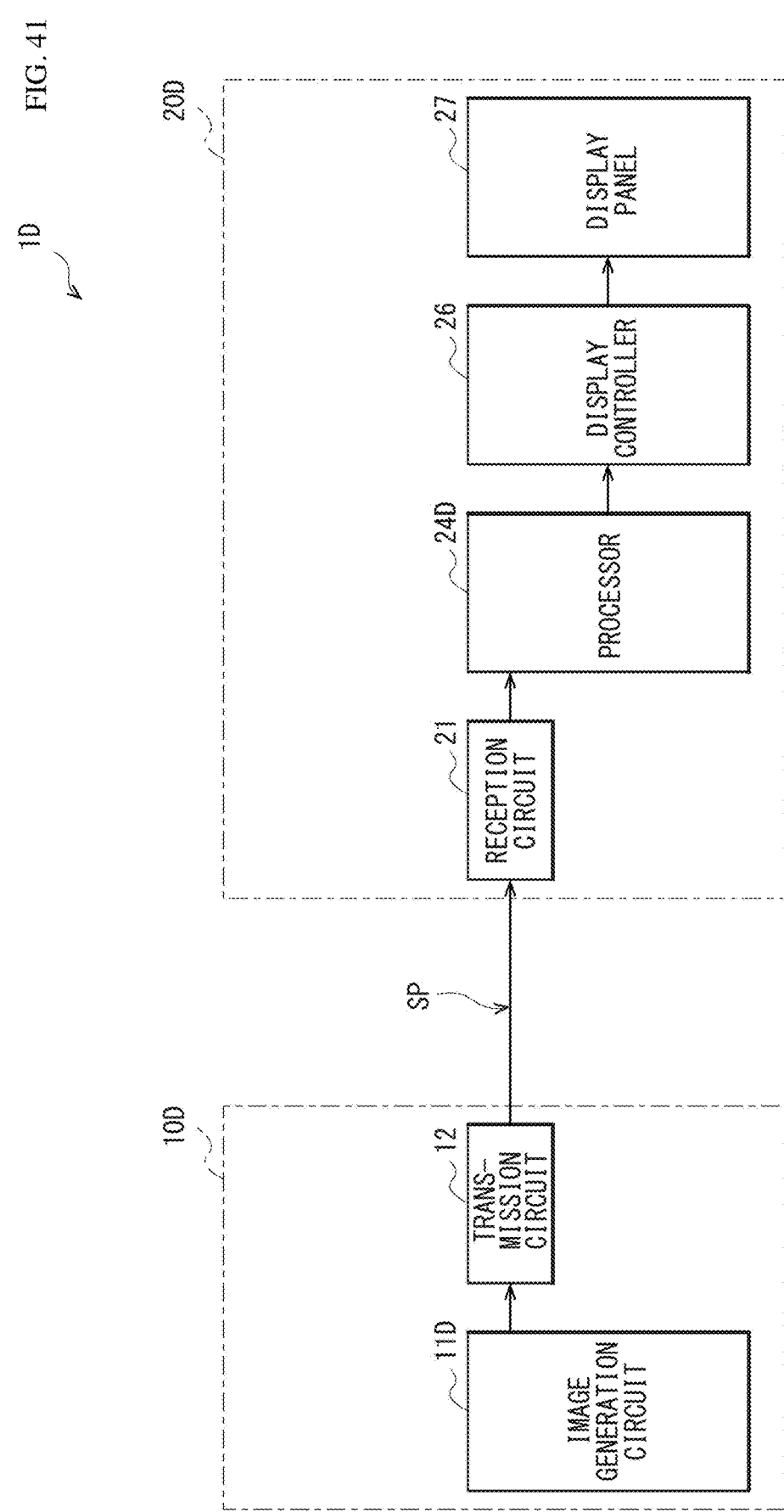
FIG. 41 is a block diagram illustrating a configuration example of a display system according to another modification example.

In the embodiment described above, the acceleration sensor 22 and the eye-tracking sensor 23 are provided in the head-mounted display 20C, but this is not limitative. For example, these sensor may not be provided as with a display system 1D illustrated in FIG. 41. The display system 1D includes an image generation device 10D and a head-mounted display 20D. The image generation device 10D includes an image generation circuit 11D. The image generation circuit 11D generates the entire image P1 to be displayed on the head-mounted display 20D. In addition, the image generation circuit 11D generates the partial image P2 including a portion where an image changes in the entire image P1. The head-mounted display 20D includes a processor 24D. The processor 24D performs, for example, predetermined image processing on the basis of the pieces of image data DT1 and DT2 supplied from the reception circuit 21, and supplies, to the display controller 26, the piece of image data of the entire image P1 included in the piece of image data DT1, the piece of image data of the partial image P2 included in the piece of image data DT2, and the piece of data about the position of the partial image P2 included in the piece of image data DT2.

Modification Example 9

The embodiment described above is applicable to various color systems as illustrated in FIGS. 42A to 42C.

For example, as illustrated in a case C1 (FIG. 42A), application may be made to a RGB system. In this example, a red image (R), a green image (G), and a blue image (B) of the entire image P1 are images having a low resolution. The display panel 27 performs a display driving operation related to the entire image P1 in units of four pixels PIX arranged in two rows and two columns on the basis of these images. In addition, a red image (R), a green image (G), and a blue image (B) of the partial image P2 are images having a high resolution. The display panel 27 performs a display driving operation related to the entire image P2 in units of one pixel PIX on the basis of these images. The band usage rate in this case is 50% as with the case of the embodiment described above (FIG. 4).

In addition, for example, as illustrated in cases C2 to C5, application may be made to a YUV system using a luminance signal a color difference signal.

For example, in an example illustrated in a case C2 (FIG. 42A), a luminance image (Y), a first color difference image (U), and a second color difference image (V) of the entire image P1 are images having a low resolution. The display controller 26 generates a red image (R), a green image (G), and a blue image (B) each having a low resolution on the basis of these images, and the display panel 27 performs a display driving operation related to the entire image P1 in units of four pixels PIX arranged in two rows and two columns on the basis of the generated images. In addition, a luminance image (Y), a first color difference image (U), and a second color difference image (V) of the partial image P2 are images having a high resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 50% as with the case of the embodiment described above (FIG. 4).

For example, in an example illustrated in a case C3 (FIG. 42B), a luminance image (Y), a first color difference image (U), and a second color difference image (V) of the entire image P1 are images having a low resolution. The display controller 26 generates a red image (R), a green image (G), and a blue image (B) each having a low resolution on the basis of these images, and the display panel 27 performs a display driving operation related to the entire image P1 in units of four pixels PIX arranged in two rows and two columns on the basis of the generated images. In addition, a luminance image (Y) of the partial image P2 is an image having a high resolution, and a first color difference image (U) and a second color difference image (V) are images having a low resolution. In other words, human visibility for luminance is high, but human visibility for a color difference is low; therefore, the luminance image has a high resolution, and the color difference images have a low resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 37.5%.

For example, in an example illustrated in a case C4 (FIG. 42B), a luminance image (Y) of the entire image P1 is an image having a low resolution, and a first color difference image (U) and a second color difference image (V) are images having a lower resolution. In this example, a pixel of each of the first color difference image (U) and the second color difference image (V) corresponds to eight (4×2) pixels PIX. The display controller 26 generates a red image (R), a green image (G), and a blue image (B) each having a low resolution on the basis of these images, and the display panel 27 performs a display driving operation related to the entire image P1 in units of four pixels PIX arranged in two rows and two columns on the basis of the generated images. In addition, a luminance image (Y) of the partial image P2 is an image having a high resolution, and a first color difference image (U) and a second color difference image (V) are images having a medium resolution. In this example, a pixel of each of the first color difference image (U) and the second color difference image (V) corresponds to two (2×1) pixels PIX. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 33.3%.

For example, in an example illustrated in a case C5 (FIG. 42C), a luminance image (Y) of the entire image P1 is an image having a low resolution, and a first color difference image (U) and a second color difference image (V) are images having a lower resolution. In this example, a pixel of each of the first color difference image (U) and the second color difference image (V) corresponds to sixteen (4×4) pixels PIX. The display controller 26 generates a red image (R), a green image (G), and a blue image (B) each having a low resolution on the basis of these images, and the display panel 27 performs a display driving operation related to the entire image P1 in units of four pixels PIX arranged in two rows and two columns on the basis of the generated images. In addition, a luminance image (Y) of the partial image P2 is an image having a high resolution, and a first color difference image (U) and a second color difference image (V) are images having a medium resolution. The display controller 26 generates a red image (R), a green image (G), and a blue image (B) each having a high resolution on the basis of these images, and the display panel 27 performs a display driving operation related to the partial image P2 in units of one pixel PIX on the basis of the generated images. The band usage rate in this case is 25%.

Modification Example 10

In the embodiment described above, the display panel 27 illustrated in FIG. 6 is used, but this is not limitative. A display panel 27E according to the present modification example is described in detail below.

FIG. 43 illustrates a configuration example of the display panel 27E. The display panel 27E includes a pixel array 31E, the pixel signal generation circuit 32, the scanning circuit 33, and a drive circuit 34E.

The pixel array 31E includes a plurality of signal lines SGL, a plurality of control lines CTL, a plurality of control lines WSEN, and a plurality of pixels PIX. The plurality of control lines WSEN extends in the vertical direction (the longitudinal direction in FIG. 43), and is provided side by side in the horizontal direction (the lateral direction in FIG. 43). The plurality of control lines WSEN each supplies a control signal generated by the drive circuit 34E to the pixels PIX.

The drive circuit 34E is configured to generate a control signal and apply the generated control signal to the plurality of control lines WSEN, thereby performing control on the pixels PIX to which the pixel signal generated by the pixel signal generation circuit 32 is to be written to determine which pixel PIX of the plurality of pixels PIX the pixel signal is to be written to.

FIG. 44 illustrates a configuration example of the pixel PIX. The pixel array including this pixel PIX includes a control line WSL. The control lines CTL illustrated in FIG. 43 include this control line WSL. The pixel PIX includes transistors MN01 to MN03, a capacitor C01, and a light-emitting element EL. The transistors MN01 to MN03 are N-type MOSFETs (Metal Oxide Semiconductor Field Effect Transistors). The transistor MN01 has a gate coupled to the control line WSEN, a drain coupled to the signal line SGL, and a source coupled to a drain of the transistor MN02. The transistor MN02 has a gate coupled to the control line WSL, the drain coupled to the source of the transistor MN01, and a source coupled to a gate of the transistor MN03 and the capacitor C01. The capacitor C01 has one end coupled to the source of the transistor MN02 and the gate of the transistor MN03, and another end coupled to a source of the transistor MN03 and an anode of the light-emitting element EL. The transistor MN03 has the gate coupled to the source of the transistor MN02 and the one end of the capacitor C01, a drain coupled to a power supply line VCCP, and the source coupled to the other end of the capacitor C01 and the anode of the light-emitting element EL. The light-emitting element EL is, for example, an organic EL light-emitting element, and has the anode coupled to the source of the transistor MN03 and the other end of the capacitor C01, and a cathode coupled to a power supply line Vcath.

With this configuration, in the pixel PIX, the transistors MN01 and MN02 are turned on to thereby set a voltage between both ends of the capacitor C01 on the basis of a pixel signal supplied from the signal line SGL. The transistor MN03 causes a current corresponding to the voltage between both ends of the capacitor C01 to flow into the light-emitting element EL. The light-emitting element EL emits light on the basis of the current supplied from the transistor MN03. Thus, the pixel PIX emits light with luminance corresponding to the pixel signal.

As illustrated in FIG. 8, in the period from the timing t11 to the timing t12, the reception circuit 21 of the head-mounted display 20 receives the piece of image data DT1 representing the entire image P1 ((B) of FIG. 8). The input image is the entire image P1; therefore, the display controller 26 performs control to drive the plurality of pixels PIX in the display panel 27E in units of four pixels PIX on the basis of the piece of image data of the entire image P1. As illustrated in FIG. 9, from the timing t11 to the timing t12, the scanning circuit 33 of the display panel 27 scans the plurality of pixels PIX in scanning units US of two pixel lines L. The drive circuit 34E sets all the control lines WSEN active (high level). The pixel signal generation circuit 32 applies the same pixel signal to two signal lines SGL adjacent to each other. Accordingly, the same pixel signal is written to four pixels PIX in selected two pixel lines L. Thus, the display panel 27E drives the plurality of pixels PIX in units UD of four pixels PIX.

In addition, as illustrated in FIG. 8, in the period from the timing t12 to the timing t13, the reception circuit 21 of the head-mounted display 20 receives the piece of image data DT2 representing the partial image P2 ((B) of FIG. 8). The input image is the partial image P2; therefore, the display controller 26 performs control to drive a plurality of pixels PIX disposed in a region corresponding to the partial image P2 of the plurality of pixels PIX in the display panel 27E in units of one pixel PIX on the basis of the piece of image data of the partial image P2 and the piece of data about the position of the partial image P2. As illustrated in FIG. 10, from the timing t12 to the timing t13, the scanning circuit 33 of the display panel 27E scans the plurality of pixels PIX in scanning units US of one pixel line L. The drive circuit 34E sets a plurality of control lines WSEN related to the region corresponding to the partial image P2 active (high level), and sets a plurality of other control lines WSEN inactive (low level). The pixel signal generation circuit 32 applies each of a plurality of pixel signals to a corresponding one of a plurality of signal lines SGL related to the region corresponding to the partial image P2 of the plurality of signal lines SGL. Accordingly, each of a plurality of pixel signals is written to a corresponding one of a plurality of pixels PIX related to the region corresponding to the partial image P2 in selected one pixel line L. Meanwhile, a pixel signal is not written to a plurality of pixels PIX related to a region other than the region corresponding to the partial image P2. Thus, the display panel 27E drives the plurality of pixels PIX in units UD of one pixel PIX.

The configuration of the pixel PIX is not limited to the example in FIG. 44. Some examples of the configuration of the pixel PIX are described below.

FIG. 45 illustrates another configuration example of the pixel PIX. The pixel array including this pixel PIX includes the control line WSL, a control line DSL, and a control line AZSL. The control lines CTL illustrated in FIG. 43 include the control lines WSL, DSL, and AZSL. This pixel PIX includes transistors MP11 and MP12, capacitors C11 and C12, transistors MP13 to MP15, and the light-emitting element EL. The transistors MP11 to MP15 are P-type MOSFETs. The transistor MP11 has a gate coupled to the control line WSEN, a source coupled to the signal line SGL, and a drain coupled to a source of the transistor MP12. The transistor MP12 has a gate coupled to the control line WSL, the source coupled to the drain of the transistor MP11, and a drain coupled to a gate of the transistor MP14 and the capacitor C12. The capacitor C11 has one end coupled to the power supply line VCCP, and another end coupled to the capacitor C12, a drain of the transistor MP13, and a source of the transistor MP14. The capacitor C12 has one end coupled to the other end of the capacitor C11, the drain of the transistor MP13, and the source of the transistor MP14, and another end coupled to the drain of the transistor MP12 and the gate of the transistor MP14. The transistor MP13 has a gate coupled to the control line DSL, a source coupled to the power supply line VCCP, and the drain coupled to the source of the transistor MP14, the other end of the capacitor C11, and the one end of the capacitor C12. The transistor MP14 has the gate coupled to the drain of the transistor MP12 and the other end of the capacitor C12, the source coupled to the drain of the transistor MP13, the other end of the capacitor C11, and the one end of the capacitor C12, and a drain coupled to the anode of the light-emitting element EL and a source of the transistor MP15. The transistor MP15 has a gate coupled to the control line AZSL, the source coupled to the drain of the transistor MP14 and the anode of the light-emitting element EL, and a drain coupled to a power supply line VSS.

With this configuration, in the pixel PIX, the transistors MP11 and MP12 are turned on to thereby set a voltage between both ends of the capacitor C12 on the basis of the pixel signal supplied from the signal line SGL. The transistor MP13 is turned on or off on the basis of a signal of the control line DSL. The transistor MP14 causes a current corresponding to the voltage between both ends of the capacitor C12 to flow into the light-emitting element EL in a period in which the transistor MP13 is turned on. Th light-emitting element EL emits light on the basis of the current supplied from the transistor MP14. Thus, the pixel PIX emits light with luminance corresponding to the pixel signal. The transistor MP15 is turned on or off on the basis of a signal of the control line AZSL. In a period in which the transistor MP15 is turned on, a voltage of the anode of the light-emitting element EL is set to a voltage of the power supply line VSS, thereby being initialized.

FIG. 46 illustrates another configuration example of the pixel PIX. The pixel array including this pixel PIX includes the control line WSL, the control line DSL, and the control line AZSL. The control lines CTL illustrated in FIG. 43 include the control lines WSL, DSL, and AZSL. This pixel PIX includes transistors MN21 and MN22, a capacitor C21, transistors MN23 to MN25, and the light-emitting element EL. The transistors MN21 to MN25 are N-type MOSFETs. The transistor MN21 has a gate coupled to the control line WSEN, a drain coupled to the signal line SGL, and a source coupled to a drain of the transistor MN22. The transistor MN22 has a gate coupled to the control line WSL, the drain coupled to the source of the transistor MN21, and a source coupled to a gate of the transistor MN24 and the capacitor C21. The capacitor C21 has one end coupled to the source of the transistor MN22 and the gate of the transistor MN24, and another end coupled to a source of the transistor MN24 and a drain of the transistor MN25, and the anode of the light-emitting element EL. The transistor MN23 has a gate coupled to the control line DSL, a drain coupled to the power supply line VCCP, and a source coupled to a drain of the transistor MN24. The transistor MN24 has the gate coupled to the source of the transistor MN22 and the one end of the capacitor C21, the drain coupled to the source of the transistor MN23, and the source coupled to the other end of the capacitor C21, the drain of the transistor MN25, and the anode of the light-emitting element EL. The transistor MN25 has a gate coupled to the control line AZSL, the drain coupled to the source of the transistor MN24, the other end of the capacitor C21, and the anode of the light-emitting element EL, and a source coupled to the power supply line VSS.

With this configuration, in the pixel PIX, the transistors MN21 and MN22 are turned on to thereby set a voltage between both ends of the capacitor C21 on the basis of the pixel signal supplied from the signal line SGL. The transistor MN23 is turned on or off on the basis of a signal of the control line DSL. The transistor MN24 causes a current corresponding to the voltage between both ends of the capacitor C21 to flow into the light-emitting element EL in a period in which the transistor MN23 is turned on. The light-emitting element EL emits light on the basis of the current supplied from the transistor MP24. Thus, the pixel PIX emits light with luminance corresponding to the pixel signal. The transistor MN25 is turned on or off on the basis of a signal of the control line AZSL. In a period in which the transistor MN25 is turned on, a voltage of the anode of the light-emitting element EL is set to a voltage of the power supply line VSS, thereby being initialized.

FIG. 47 illustrates another configuration example of the pixel PIX. The pixel array including this pixel PIX includes the control line WSL, the control line DSL, and control lines AZSL1 and AZSL2. The control lines CTL illustrated in FIG. 43 include the control lines WSL, DSL, AZSL1, and AZSL2. This pixel PIX includes transistors MP31 and MP32, a capacitor C31, transistors MP33 to MP36, and the light-emitting element EL. The transistors MP31 to MP36 are P-type MOSFETs. The transistor MP31 has a gate coupled to the control line WSEN, a source coupled to the signal line SGL, and a drain coupled to a source of the transistor MP32. The transistor MP32 has a gate coupled to the control line WSL, the source coupled to the drain of the transistor MP31, and a drain coupled to a gate of the transistor MP33, a source of the transistor MP34, and the capacitor C31. The capacitor C31 has one end coupled to the power supply line VCCP, and another end coupled to the drain of the transistor MP32, the gate of the transistor MP33, and the source of the transistor MP34. The transistor MP34 has a gate coupled to the control line AZSL1, the source coupled to the drain of the transistor MP32, the gate of the transistor MP33, and the other end of the capacitor C31, and a drain coupled to a drain of the transistor MP33 and a source of the transistor MP35. The transistor MP35 has a gate coupled to the control line DSL, the source coupled to the drains of the transistors MP33 and MP34, and a drain coupled to a source of the transistor MP36 and the anode of the light-emitting element EL. The transistor MP36 has a gate coupled to the control line AZSL2, the source coupled to the drain of the transistor MP35 and the anode of the light-emitting element EL, and a drain coupled to the power supply line VSS.

With this configuration, in the pixel PIX, the transistors MP31 and MP32 are turned on to thereby set a voltage between both ends of the capacitor C31 on the basis of the pixel signal supplied from the signal line SGL. The transistor MP35 is turned on or off on the basis of a signal of the control line DSL. The transistor MP33 causes a current corresponding to the voltage between both ends of the capacitor C31 to flow into the light-emitting element EL in a period in which the transistor MP35 is turned on. The light-emitting element EL emits light on the basis of the current supplied from the transistor MP33. Thus, the pixel PIX emits light with luminance corresponding to the pixel signal. The transistor MP34 is turned on or off on the basis of a signal of the control line AZSL1. In a period in which the transistor MP34 is turned on, the drain and the gate of the transistor MP33 are coupled to each other. The transistor MP36 is turned on or off on the basis of a signal of the control line AZSL2. In a period in which the transistor MP36 is turned on, a voltage of the anode of the light-emitting element EL is set to a voltage of the power supply line VSS, thereby being initialized.

FIG. 48 illustrates another configuration example of the pixel PIX. The pixel array including this pixel PIX includes control lines WSL1 and WSL2, the control line DSL, control lines AZSL1 and AZSL2, signal lines SGL1 and SGL2, capacitors C48 and C49, and a transistor MP49. The control lines CTL illustrated in FIG. 43 include the control lines WSL1, WSL2, DSL, AZSL1, and AZSL2. The signal lines SGL illustrated in FIG. 43 include the signal lines SGL1 and SGL2. The capacitor C48 has one end coupled to the signal line SGL1, and another end coupled to the power supply line VSS. The capacitor C49 has one end coupled to the signal line SGL1, and another end coupled to the signal line SGL2. The transistor MP49 is a P-type MOSFET, and has a gate coupled to the control line WSL2, a source coupled to the signal line SGL1, and a drain coupled to the signal line SGL2.

The pixel PIX includes transistors MP41 and MP42, a capacitor C41, transistors MP43 to MP46, and the light-emitting element EL. The transistors MP41 to MP46 are P-type MOSFETs. The transistor MP41 has a gate coupled to the control line WSEN, a source coupled to the signal line SGL2, and a drain coupled to a source of the transistor MP42. The transistor MP42 has a gate coupled to the control line WSL1, the source coupled to the drain of the transistor MP41, and a drain coupled to a gate of the transistor MP43 and the capacitor C41. The capacitor C41 has one end coupled to the power supply line VCCP, and another end coupled to the drain of the transistor MP42 and the gate of the transistor MP43. The transistor MP43 has the gate coupled to the drain of the transistor MP42 and the other end of the capacitor C41, a source coupled to the power supply line VCCP, and a drain coupled to sources of the transistors MP44 and MP45. The transistor MP44 has a gate coupled to the control line AZSL1, the source coupled to the drain of the transistor MP43 and the source of the transistor MP45, and a drain coupled to the signal line SGL2. The transistor MP45 has a gate coupled to the control line DSL, the source coupled to the drain of the transistor MP43 and the source of the transistor MP44, and a drain coupled to a source of the transistor MP46 and the anode of the light-emitting element EL. The transistor MP46 has a gate coupled to the control line AZSL2, the source coupled to the drain of the transistor MP45 and the anode of the light-emitting element EL, and a drain coupled to the power supply line VSS.

With this configuration, in the pixel PIX, the transistors MP41 and MP42 are turned on to thereby set a voltage between both ends of the capacitor C41 on the basis of the pixel signal supplied from the signal line SGL1 through the capacitor C49. The transistor MP45 is turned on or off on the basis of a signal of the control line DSL. The transistor MP43 causes a current corresponding to the voltage between both ends of the capacitor C41 to flow into the light-emitting element EL in a period in which the transistor MP45 is turned on. The light-emitting element EL emits light on the basis of the current supplied from the transistor MP43. Thus, the pixel PIX emits light with luminance corresponding to the pixel signal. The transistor MP44 is turned on or off on the basis of a signal of the control line AZSL1. In a period in which the transistor MP44 is turned on, the drain of the transistor MP43 and the signal line SGL2 are coupled to each other. The transistor MP46 is turned on or off on the basis of the control line AZSL2. In a period in which the transistor MP46 is turned on, a voltage of the anode of the light-emitting element EL is set to a voltage of the power supply line VSS, thereby being initialized.

FIG. 49 illustrates another configuration example of the pixel PIX. The pixel array including this pixel PIX includes the control line WSL, the control line DSL, and the control lines AZSL1 and AZSL2. The control lines CTL illustrated in FIG. 43 include the control lines WSL, DSL, AZSL1, and AZSL2. This pixel PIX includes transistors MP51 to MP54, a capacitor C51, transistors MP55 to MP60, and the light-emitting element EL. The transistors MP51 to MP60 are P-type MOSFETs. The transistor MP51 has a gate coupled to the control line WSEN, a source coupled to the signal line SGL, and a drain coupled to a source of the transistor MP52. The transistor MP52 has a gate coupled to the control line WSL, the source coupled to the drain of the transistor MP51, and a drain coupled to a drain of the transistor MP53 and a source of the transistor MP54. The transistor MP53 has a gate coupled to the control line DSL, a source coupled to the power supply line VCCP, and the drain coupled to the drain of the transistor MP52 and the source of the transistor MP54. The transistor MP54 has a gate coupled to a source of the transistor MP55, a drain of the transistor MP57, and the capacitor C51, the source coupled to the drains of the transistors MP52 and MP53, and a drain coupled to sources of the transistors MP58 and MP59. The capacitor C51 has one end coupled to the power supply line VCCP, and another end coupled to the gate of the transistor MP54, the source of the transistor MP55, and the drain of the transistor MP57. The capacitor C51 may include two capacitors coupled in parallel to each other. The transistor MP55 has a gate coupled to the control line AZSL1, the source coupled to the gate of the transistor MP54, the drain of the transistor MP57, and the other end of the capacitor C51, and a drain coupled to a source of the transistor MP56. The transistor MP56 has a gate coupled to the control line AZSL1, the source coupled to the drain of the transistor MP55, a drain coupled to the power supply line VSS. The transistor MP57 has a gate coupled to the control line WSL, the drain coupled to the gate of the transistor MP54, the source of the transistor MP55, and the other end of the capacitor C51, and a source coupled to a drain of the transistor MP58. The transistor MP58 has a gate coupled to the control line WSL, the drain coupled to the drain of the transistor MP57, and the source coupled to the drain of the transistor MP54 and the source of the transistor MP59. The transistor 59 has a gate coupled to the control line DSL, the source coupled to the drain of the transistor MP54 and the source of the transistor MP58, and a drain coupled to a source of the transistor MP60 and the anode of the light-emitting element EL. The transistor MP60 has a gate coupled to the control line AZSL2, the source coupled to the drain of the transistor MP59 and the anode of the light-emitting element EL, and a drain coupled to the power supply line VSS.

With this configuration, in the pixel PIX, the transistors MP51, MP52, MP54, MP58, and MP57 are turned on to thereby set a voltage between both ends of the capacitor C51 on the basis of the pixel signal supplied from the signal line SGL. The transistors MP53 and MP59 are turned on or off on the basis of a signal of the control line DSL. The transistor MP54 causes a current corresponding to the voltage between both ends of the capacitor C51 to flow into the light-emitting element EL in a period in which the transistors MP53 and MP59 are turned on. The light-emitting element EL emits light on the basis of the current supplied from the transistor MP54. Thus, the pixel PIX emits light with luminance corresponding to the pixel signal. The transistors MP55 and MP56 are turned on or off on the basis of a signal of the control line AZSL1. In a period in which the transistors MP55 and MP56 are turned on, a voltage of the gate of the transistor MP54 is set to a voltage of the power supply line VSS, thereby being initialized. The transistor MP60 is turned on or off on the basis of a signal of the control line AZSL2. In a period in which the transistor MP60 is turned on, a voltage of the anode of the light-emitting element EL is set to the voltage of the power supply line VSS, thereby being initialized.

FIG. 50 illustrates another configuration example of the pixel PIX. The pixel array including this pixel PIX includes control lines WSENN and WSENP, control lines WSNL and WSPL, the control line AZL, and the control line DSL. The control lines WSEN illustrated in FIG. 43 include the control lines WSENN and WSENP. The control lines CTL illustrated in FIG. 43 include the control lines WSNL, WSPL, AZL, and DSL. A signal of the control line WSENN and a signal of the control line WSENP are signals inverted from each other. A signal of the control line WSNL and a signal of the control line WSPL are signals inverted from each other.

The pixel PIX includes transistors MN61, MP62, MN63, and MP64, capacitors C61 and C62, transistors MN65 to MN67, and the light-emitting element EL. The transistors MN61, MN63, and MN65 to MN67 are N-type MOSFETs, and the transistors MP62 and MP64 are P-type MOSFETs. The transistor MN61 has a gate coupled to the control line WSENN, a drain coupled to the signal line SGL and a source of the transistor MP62, and a source coupled to a drain of the transistor MP62, a drain of the transistor MN63, a source of the transistor MP64. The transistor MP62 has a gate coupled to the control line WSENP, the source coupled to the signal line SGL and the drain of the transistor MN61, and the drain coupled to the source of the transistor MN61, the drain of the transistor MN63, and the source of the transistor MP64. The transistor MN63 has a gate coupled to the control line WSNL, the drain coupled to the source of the transistor MN61, the drain of the transistor MP62, and the source of the transistor MP64, and a source coupled to a drain of the transistor MP64, the capacitors C61 and C62, and a gate of the transistor MN65. The transistor MP64 has a gate coupled to the control line WSPL, the source coupled to the source of the transistor MN61, the drain of the transistor MP62, and the drain of the transistor MN63, and the drain coupled to the source of the transistor MN63, the capacitors C61 and C62, and the gate of the transistor MN65. The capacitor C61 is configured with use of, for example, a MOM (Metal Oxide Metal) capacitor, and has one end coupled to the source of the transistor MN63, the drain of the transistor MP64, the capacitor C62, and the gate of the transistor MN65, and another end coupled to a power supply line VSS2. It is to be noted that the capacitor C61 may be configured with use of, for example, a MOS capacitor or a MIM (Metal Insulator Metal) capacitor. The capacitor C62 is configured with use of, for example, a MOS capacitor, and has one end coupled to the source of the transistor MN63, the drain of the transistor MP64, the one end of the capacitor C61, and the gate of the transistor MN65, and another end coupled to the power supply line VSS2. It is to be noted that the capacitor C62 may be configured with use of, for example, a MOM capacitor or a MIM capacitor. The transistor MN65 has the gate coupled to the source of the transistor MN63, the drain of the transistor MP64, and the one ends of the capacitors C61 and C62, a drain coupled to the power supply line VCCP, and a source coupled to drains of the transistors MN66 and MN67. The transistor MN66 has a gate coupled to the control line AZL, the drain coupled to the source of the transistor MN65 and the drain of the transistor MN67, and a source coupled to a power supply line VSS1. The transistor MN67 has a gate coupled to the control line DSL, the drain coupled to the source of the transistor MN65 and the drain of the transistor MN66, and a source coupled to the anode of the light-emitting element EL.

With this configuration, in the pixel PIX, at least one of the transistors MN61 or MP62 is turned on, and at least one of the transistors MN63 or MP64 is turned on, thereby setting voltages between both ends of the capacitors C61 and the capacitor C62 on the basis of the pixel signal supplied from the signal line SGL. The transistor MN67 is turned on or off on the basis of a signal of the control line DSL. The transistor MN65 causes a current corresponding to the voltages between both ends of the capacitors C61 and C62 to flow into the light-emitting element EL in a period in which the transistor MN67 is turned on. The light-emitting element EL emits light on the basis of the current supplied from the transistor MP65. Thus, the pixel PIX emits light with luminance corresponding to the pixel signal. The transistor MN66 may be turned on or off on the basis of a signal of the control line AZL. In addition, the transistor MN66 may function as a resistor having a resistance value corresponding to a signal of the control line AZL. In this case, the transistor MN65 and the transistor MN66 configure a so-called source-follower circuit.

OTHER MODIFICATION EXAMPLES

In addition, two or more of these modification examples may be combined.

2. Application Examples

Next, description is given of application examples of the display systems described in the embodiment described above and the modification examples.

Application Example 1

FIG. 51 illustrates an example of an appearance of a head-mounted display 110. The head-mounted display 110 includes ear hook sections 112 for mounting on the head of a user on both sides of a glasses-shaped display section 111. The technology according to the embodiment described above and the like is applicable to such a head-mounted display 110.

Application Example 2

FIG. 52 illustrates an example of an appearance of another head-mounted display 120. The head-mounted display 120 is a see-through head-mounted display including a main body section 121, an arm section 122, and a barrel section 123. The head-mounted display 120 is mounted on glasses 128. The main body section 121 includes a control substrate for controlling an operation of the head-mounted display 120, and a display section. This display section outputs image light of a display image. The arm section 122 couples the main body section 121 and the barrel section 123 to each other, and supports the barrel section 123. The barrel section 123 projects the image light supplied from the main body section 121 through the arm section 122 toward a user's eye through a lens 129 of the glasses 128. The technology according to the embodiment described above and the like is applicable to such a head-mounted display 120.

It is to be noted that the head-mounted display 120 is a so-called light guide plate system head-mounted display, but is not limited thereto. For example, the head-mounted display 120 may be, for example, a so-called birdbath system head-mounted display. The birdbath system head-mounted display includes, for example, a beam splitter, and a partially transparent mirror. The beam splitter outputs light encoded with image information toward the mirror, and the mirror reflects the light toward the user's eye. Both of the beam splitter and the partially transparent mirror are partially transparent. This causes light from an ambient environment to reach the user's eye.

Application Example 3

FIGS. 53A and 53B illustrate an example of an appearance of a digital still camera 130. FIG. 53A illustrates a front view, and FIG. 53B illustrates a rear view. The digital still camera 130 is an interchangeable lens single-lens reflex type camera, and includes a camera main body section (camera body) 131, a photographing lens unit 132, a grip section 133, a monitor 134, and an electronic view finder 135. The photographing lens unit 312 is an interchangeable lens unit, and is provided almost in the vicinity of a middle of a front surface of the camera main body section 311. The grip section 133 is provided on left side of the front surface of the camera main body section 311, and a photographer grasps the grip section 133. The monitor 134 is provided on left side from almost a middle of a rear surface of the camera main body section 131. The electronic view finder 135 is provided above the monitor 14 on the rear surface of the camera main body section 131. The photographer looks into the electronic view finder 135, thereby making it possible to visually recognize a light image of a subject guided from the photographing lens unit 132 and determine a composition. The technology according to the embodiment described above and the like is applicable to the electronic view finder 135.

Application Example 4

FIG. 54 illustrates an example of an appearance of a television apparatus 140. The television apparatus 140 includes an image display screen section 141 including a front panel 142 and filter glass 143. The technology according to the embodiment described above and the like is applicable to the image display screen section 141.

Application Example 5

FIG. 55 illustrates an example of an appearance of a smartphone 150. The smartphone 150 includes a display section 151 that displays various types of information, and an operation section 152 including a button that receives operation input by a user, and the like. The technology according to the embodiment described above and the like is applicable to the display section 151.

Application Example 6

FIGS. 56A and 56B illustrate a configuration example of a vehicle to which the technology of the present disclosure is applied. FIG. 56A illustrates an example of a vehicle interior viewed from the rear of a vehicle 200, and FIG. 56B illustrates the vehicle interior viewed from the left rear of the vehicle 200.

The vehicle in FIGS. 56A and 56B includes a center display 201, a console display 202, a head-up display 203, a digital rearview mirror 204, a steering wheel display 205, and a rear entertainment display 106.

The center display 201 is provided at a location opposed to a driver seat 262 and a passenger seat 263 in a dashboard 261. FIG. 56A illustrates an example of the horizontally long central display 201 extending from side of the driver seat 262 to side of the passenger seat 263, but the screen size and installation location of the center display 201 is not limited thereto. The center display 201 is allowed to display information detected by various sensors. As a specific example, the center display 201 is allowed to display a shot image captured by an image sensor, a distance image to an obstacle in front of the vehicle or on a side of the vehicle measured by a ToF sensor, the temperature of an occupant detected by an infrared sensor, and the like. It is possible to use the center display 201 for displaying, for example, at least one of safety relevant information, operation relevant a information, lifelog, health relevant information, authentication/identification relevant information, or entertainment relevant information.

The safety relevant information includes information based on results of detection by sensors, such as drowsiness detection, looking-away detection, detection of tampering by a child in the vehicle, detection of whether or not a seat belt is fastened, and detection of a left-behind occupant. The operation relevant information includes information about a gesture related to an operation by an occupant detected with use of a sensor. The gesture may include operations of various facilities in the vehicle, and includes, for example, operations of an air-conditioning facility, a navigation device, an AV (Audio Visual) device, a lighting device, and the like. The lifelog includes lifelogs of all occupants. For example, the lifelog includes behavior recording of each occupant. Obtaining and storing the lifelog makes it possible to confirm the condition of the occupant at the time of occurrence of an accident. The health relevant information includes information about the temperature of an occupant detected with use of a temperature sensor, and a health condition of the occupant presumed on the basis of the detected temperature. Alternatively, information about the health condition of the occupant may be presumed on the basis of an image of the face of the occupant captured by an image sensor. In addition, the information about the health condition of the occupant may be presumed on the basis of answer contents of the occupant obtained by performing conversation with the occupant with use of automated voice. The authentication/identification relevant information includes information about a keyless entry function in which facial recognition is performed with use of a sensor, a function of automatedly adjusting the height and position of a seat by facial identification, and the like. The entertainment relevant information includes information about an operation of an AV device by an occupant detected by a sensor and information about contents to be displayed that are suitable for an occupant detected and recognized by a sensor.

It is possible to use the console display 202, for example, for displaying lifelog information. The console display 202 is disposed near a shift lever 265 in a center console 264 between the driver seat 262 and the passenger seat 263. The console display 202 is also allowed to display information detected by various sensors. In addition, the console display 202 may display an image around the vehicle captured by an image sensor, or may display a distance image to an obstacle around the vehicle.

The head-up display 203 is virtually displayed at the back of a windshield 266 in front of the driver seat 262. It is possible to use the head-up display 203 for displaying, for example, at least one of safety relevant information, operation relevant information, a lifelog, health relevant information, authentication/identification relevant information, or entertainment relevant information. The head-up display 203 is often virtually disposed in front of the driver seat 262, and is therefore suitable to display information directly related to an operation of the vehicle such as speed of the vehicle, a fuel level, and remaining battery life.

The digital rearview mirror 204 is allowed not only to display a rear side of the vehicle but also to display the state of an occupant on a backseat; therefore, it is possible to use the digital rearview mirror 204, for example, for displaying lifelog information about the occupant on the backseat.

The steering wheel display 205 is disposed around the center of a steering wheel 267 of the vehicle. It is possible to use the steering wheel display 205 for displaying, for example, at least one of safety relevant information, operation relevant information, a lifelog, health relevant information, authentication/identification relevant information, or entertainment relevant information. Specifically, the steering wheel display 205 is disposed near a driver's hand, and is therefore suitable to display lifelog information such as the temperature of the driver or to display information related to operations of an AV device, an air-conditioning facility, and the like.

The rear entertainment display 206 is mounted on rear surface side of the driver seat 262 or the passenger seat 263, and is for being watched by an occupant on a backseat. It is possible to use the rear entertainment display 206 for displaying, for example, at least one of safety relevant information, operation relevant information, a lifelog, health relevant information, authentication/identification relevant information, or entertainment relevant information. Specifically, the rear entertainment display 206 is disposed in front of the occupant on the backseat, and therefore displays information related to the occupant on the backseat. The rear entertainment display 206 may display, for example, information related to the operations of an AV device and an air-conditioning facility, or may display a result obtained by measuring the temperature or the like of the occupant on the backseat by a temperature sensor 5.

The technology according to the embodiment described above and the like is applicable to the center display 201, the console display 202, the head-up display 203, the digital rearview mirror 204, the steering wheel display 205, and the rear entertainment display 206.

The present technology has been described above with reference to the embodiment, the modification examples, and the application examples to electronic apparatuses, but the present technology is not limited to the embodiment and the like, and may be modified in a variety of ways.

In the embodiment described above and the like, the present technology is applied to the head-mounted display, but this is not limitative. For example, the present technology is applicable to various electronic apparatuses that make it possible to display an image, such as a monitor and a projector.

The present technology is applicable not only to a closed system described in the embodiment described above, but also to a video see-through system and a mixed reality system.

In addition, the present technology is applicable to various simulators such as a flight simulator, and applications for gaming, projection mapping, and the like.

It is to be noted that the effects described herein are merely illustrative and non-limiting, and other effects may be provided.

It is to be noted that the present technology may have the following configurations. According to the present technology having the following configurations, it is possible to enhance image quality.

(1)

A display device including:

a reception circuit that is configured to receive a piece of first image data and a piece of second image data, the piece of first image data representing an entire image having a first resolution, the piece of second image data representing a first partial image having a second resolution higher than the first resolution, and the first partial image corresponding to a portion of the entire image;

a display section including a plurality of pixels; and a display drive circuit that is configured to perform first driving and second driving, the first driving in which the plurality of pixels is driven in units of a first number of pixels on the basis of the piece of first image data, the second driving in which two or more pixels provided in a region corresponding to the first partial image of the plurality of pixels are driven in units of a second number of pixels on the basis of the piece of second image data, and the second number being smaller than the first number.

(2)

The display device according to (1), in which the reception circuit is configured to receive the piece of second image data after receiving the piece of first image data, and the display drive circuit is configured to perform the second driving after performing the first driving.

(3)

The display device according to (1) or (2), in which the display device further includes:

a first sensor that is configured to detect which portion in a display region of the display section a user is observing; and a transmission circuit that is configured to transmit a result of detection by the first sensor to an image generation device that is configured to generate the piece of first image data and the piece of second image data, and the first partial image includes an image corresponding to the result of detection by the first sensor.

(4)

The display device according to (1) or (2), in which the reception circuit is configured to receive a plurality of the pieces of second image data, and a plurality of the first partial images each represented by a corresponding one of the plurality of the pieces of second image data is different from each other.

(5)

The display device according to any one of (1) to (4), in which the reception circuit is configured to alternately receive the piece of first image data and one or a plurality of the pieces of second image data.

(6)

The display device according to any one of (1) to (4), in which the reception circuit is configured to alternately receive the piece of first image data and the piece of second image data in a first period, and is configured to continue to receive the piece of first image data of the piece of the first image data and the piece of second image data in a second period.

(7)

The display device according to (6), in which the display device further includes:

a second sensor that is configured to detect a change in posture of the display device; and a transmission circuit that is configured to transmit a result of detection by the second sensor to an image generation device that is configured to generate the piece of first image data and the piece of second image data, and the second period corresponds to a period in which the attitude of the display device is changing.

(8)

The display device according to any one of (1) to (7), in which the second number is one.

(9)

The display device according to any one of (1) to (7), in which the reception circuit is configured to further receive a piece of third image data representing a second partial image having a third resolution higher than the second resolution, the second partial image corresponding to a portion of the first partial image, and the display drive circuit is configured to perform third driving in which two or more pixels provided in a region corresponding to the second partial image of the plurality of images are driven in units of a third number of pixels on the basis of the piece of third image data, the third number being smaller than the second number.

(10)

The display device according to any one of (1) to (9), in which a data amount of the piece of the first image data and a data amount of the piece of second image data are equal to each other.

(11)

The display device according to any one of (1) to (10), further including a decompression circuit that is configured to decompose a piece of compressed image data of the piece of first image data and the piece of second image data, in which at least one of the piece of first image data or the piece of second image data is compressed.

(12)

The display device according to any one of (1) to (10), further including a decompression circuit that is configured to decompose a piece of compressed image data of the piece of first image data and the piece of second image data, in which both the piece of first image data and the piece of second image data are compressed, and a compression ratio of the piece of first image data and a compression ratio of the piece of second image data are different from each other.

(13)

A display system including:

an image generation device that is configured to transmit a piece of first image data and a piece of second image data, the piece of first image data representing an entire image having a first resolution, the piece of second image data representing a first partial image having a second resolution higher than the first resolution, and the first partial image corresponding to a portion of the entire image; and a display device, the display device including a reception circuit that is configured to receive the piece of first image data and the piece of second image data, a display section including a plurality of pixels, and a display drive circuit that is configured to perform first driving and second driving, the first driving in which the plurality of pixels is driven in units of a first number of pixels on the basis of the piece of first image data, the second driving in which two or more pixels provided in a region corresponding to the first partial image of the plurality of pixels are driven in units of a second number of pixels on the basis of the piece of second image data, the second number being smaller than the first number.

(14)

The display system according to (13), in which the display device further includes a first sensor that is configured to detect which portion in a display region of the display section a user is observing; and a transmission circuit that is configured to transmit a result of detection by the first sensor to the image generation device, in which the image generation device is configured to receive the result of detection by the first sensor transmitted from the transmission circuit, is configured to generate the first partial image on the basis of the result of detection by the first sensor, and is configured to generate the piece of second image data representing the first partial image.

(15)

The display system according to (13), in which the image generation device is configured to generate the first partial image by detecting a portion in which an image changes of the entire image, and is configured to generate the piece of second image data representing the first partial image.

(16)

The display system according to any one of (13) to (15), in which the display device further includes a second sensor that is configured to detect a change in posture of the display device, and a transmission circuit that is configured to transmit a result of detection by the second sensor to the image generation device, in which the image generation device is configured to receive the result of detection by the second sensor transmitted from the transmission circuit, and is configured to determine which one of the piece of first image data and the piece of second image data is to be transmitted, on the basis of the result of detection by the second sensor.

(17)

A display driving method including:

transmitting a piece of first image data and a piece of second image data, the piece of first image data representing an entire image having a first resolution, the piece of second image data representing a first partial image having a second resolution higher than the first resolution, the first partial image corresponding to a portion of the entire image;

receiving the piece of first image data and the piece of second image data;

performing first driving in which a plurality of pixels is driven in units of a first number of pixels on the basis of the piece of first image data; and performing second driving in which two or more pixels provided in a region corresponding to the first partial image of the plurality of pixels are driven in units of a second number of pixels on the basis of the piece of second image data, the second number being smaller than the first number.

This application claims the priority on the basis of Japanese Patent Application No. 2021-093716 filed on Jun. 3, 2021 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display device comprising:

a reception circuit that is configured to receive a piece of first image data and a piece of second image data, the piece of first image data representing an entire image having a first resolution, the piece of second image data representing a first partial image having a second resolution higher than the first resolution, and the first partial image corresponding to a portion of the entire image;

a display section including a plurality of pixels;

a display drive circuit that is configured to perform first driving and second driving, the first driving in which the plurality of pixels is driven in units of a first number of pixels on a basis of the piece of first image data, the second driving in which two or more pixels provided in a region corresponding to the first partial image of the plurality of pixels are driven in units of a second number of pixels on a basis of the piece of second image data, and the second number being smaller than the first number; and a decompression circuit that is configured to decompress a piece of compressed image data of the piece of first image data and the piece of second image data, wherein at least one of the piece of first image data or the piece of second image data is compressed.

2. The display device according to claim 1, wherein the reception circuit is configured to receive the piece of second image data after receiving the piece of first image data, and the display drive circuit is configured to perform the second driving after performing the first driving.

3. The display device according to claim 1, wherein the display device further comprises:

a first sensor that is configured to detect which portion in a display region of the display section a user is observing; and a transmission circuit that is configured to transmit a result of detection by the first sensor to an image generation device that is configured to generate the piece of first image data and the piece of second image data, and the first partial image comprises an image corresponding to the result of detection by the first sensor.

4. The display device according to claim 1, wherein the piece of second image data is one of a plurality of pieces of second image data, the reception circuit is configured to receive the plurality of pieces of second image data, the first partial image is one of a plurality of first partial images, and the plurality of first partial images each represented by a corresponding one of the plurality of pieces of second image data is different from each other.

5. The display device according to claim 1, wherein the reception circuit is configured to alternately receive the piece of first image data and the piece of second image data.

6. The display device according to claim 1, wherein the reception circuit is configured to alternately receive the piece of first image data and the piece of second image data in a first period, and is configured to continue to receive the piece of first image data of the piece of the first image data and the piece of second image data in a second period.

7. The display device according to claim 6, wherein the display device further comprises:

a second sensor, the second sensor being an acceleration sensor, the acceleration sensor being configured to detect an attitude of the display device; and a transmission circuit that is configured to transmit a result of detection by the second sensor to an image generation device that is configured to generate the piece of first image data and the piece of second image data, and the second period corresponds to a period in which the attitude of the display device is changing.

8. The display device according to claim 1, wherein the second number is one.

9. The display device according to claim 1, wherein the reception circuit is configured to further receive a piece of third image data representing a second partial image having a third resolution higher than the second resolution, the second partial image corresponding to a portion of the first partial image, and the display drive circuit is configured to perform third driving in which two or more pixels provided in a region corresponding to the second partial image of a plurality of images are driven in units of a third number of pixels on a basis of the piece of third image data, the third number being smaller than the second number.

10. The display device according to claim 1, wherein a data amount of the piece of the first image data and a data amount of the piece of second image data are equal to each other.

11. A display device comprising:

a reception circuit that is configured to receive a piece of first image data and a piece of second image data, the piece of first image data representing an entire image having a first resolution, the piece of second image data representing a first partial image having a second resolution higher than the first resolution, and the first partial image corresponding to a portion of the entire image;

a display section including a plurality of pixels;

a display drive circuit that is configured to perform first driving and second driving, the first driving in which the plurality of pixels is driven in units of a first number of pixels on a basis of the piece of first image data, the second driving in which two or more pixels provided in a region corresponding to the first partial image of the plurality of pixels are driven in units of a second number of pixels on a basis of the piece of second image data, and the second number being smaller than the first number; and a decompression circuit that is configured to decompress a piece of compressed image data of the piece of first image data and the piece of second image data, wherein both the piece of first image data and the piece of second image data are compressed, and a compression ratio of the piece of first image data and a compression ratio of the piece of second image data are different from each other.

12. The display device according to claim 11, wherein the reception circuit is configured to receive the piece of second image data after receiving the piece of first image data, and the display drive circuit is configured to perform the second driving after performing the first driving.

13. The display device according to claim 11, wherein the display device further comprises:

a first sensor that is configured to detect which portion in a display region of the display section a user is observing; and a transmission circuit that is configured to transmit a result of detection by the first sensor to an image generation device that is configured to generate the piece of first image data and the piece of second image data, and the first partial image comprises an image corresponding to the result of detection by the first sensor.

14. The display device according to claim 11, wherein the piece of second image data is one of a plurality of pieces of second image data, the reception circuit is configured to receive the plurality of pieces of second image data, the first partial image is one of a plurality of first partial images, and the plurality of first partial images each represented by a corresponding one of the plurality of pieces of second image data is different from each other.

15. The display device according to claim 11, wherein the reception circuit is configured to alternately receive the piece of first image data and the piece of second image data.

16. A display system comprising:

an image generation device that is configured to transmit a piece of first image data and a piece of second image data, the piece of first image data representing an entire image having a first resolution, the piece of second image data representing a first partial image having a second resolution higher than the first resolution, and the first partial image corresponding to a portion of the entire image; and a display device, the display device including a reception circuit that is configured to receive the piece of first image data and the piece of second image data, a display section including a plurality of pixels, a display drive circuit that is configured to perform first driving and second driving, the first driving in which the plurality of pixels is driven in units of a first number of pixels on a basis of the piece of first image data, the second driving in which two or more pixels provided in a region corresponding to the first partial image of the plurality of pixels are driven in units of a second number of pixels on a basis of the piece of second image data, the second number being smaller than the first number, and a decompression circuit that is configured to decompress a piece of compressed image data of the piece of first image data and the piece of second image data, wherein at least one of the piece of first image data or the piece of second image data is compressed.

17. The display system according to claim 16, wherein the display device further includes a first sensor that is configured to detect which portion in a display region of the display section a user is observing; and a transmission circuit that is configured to transmit a result of detection by the first sensor to the image generation device, wherein the image generation device is configured to receive the result of detection by the first sensor transmitted from the transmission circuit, is configured to generate the first partial image on a basis of the result of detection by the first sensor, and is configured to generate the piece of second image data representing the first partial image.

18. The display system according to claim 16, wherein the image generation device is configured to generate the first partial image by detecting a portion in which an image changes of the entire image, and is configured to generate the piece of second image data representing the first partial image.

19. The display system according to claim 16, wherein the display device further includes an acceleration sensor that is configured to detect a change in at attitude of the display device, and a transmission circuit that is configured to transmit a result of detection by the acceleration sensor to the image generation device, wherein the image generation device is configured to receive the result of detection by the acceleration sensor transmitted from the transmission circuit, and is configured to determine which one of the piece of first image data and the piece of second image data is to be transmitted, on a basis of the result of detection by the second sensor.

20. A display driving method comprising:

transmitting a piece of first image data and a piece of second image data, the piece of first image data representing an entire image having a first resolution, the piece of second image data representing a first partial image having a second resolution higher than the first resolution, the first partial image corresponding to a portion of the entire image;

receiving the piece of first image data and the piece of second image data;

performing first driving in which a plurality of pixels is driven in units of a first number of pixels on a basis of the piece of first image data; and performing second driving in which two or more pixels provided in a region corresponding to the first partial image of the plurality of pixels are driven in units of a second number of pixels on a basis of the piece of second image data, the second number being smaller than the first number; and decompressing a piece of compressed image data of the piece of first image data and the piece of second image data, wherein at least one of the piece of first image data or the piece of second image data is compressed.

* * * * *